US011613352B2

(12) United States Patent
Pierce

(10) Patent No.: US 11,613,352 B2
(45) Date of Patent: Mar. 28, 2023

(54) GROUND EFFECT CRAFT

(71) Applicant: PierceCraft IP Ltd., Grand Cayman (KY)

(72) Inventor: Richard David Pierce, Grand Cayman (KY)

(73) Assignee: PierceCraft IP Ltd., Grand Cayman (KY)

( * ) Notice: Subject to any disclaimer, the term of this patent is extended or adjusted under 35 U.S.C. 154(b) by 0 days.

(21) Appl. No.: 17/580,177

(22) Filed: Jan. 20, 2022

(65) Prior Publication Data

US 2022/0324559 A1 Oct. 13, 2022

Related U.S. Application Data

(63) Continuation of application No. 17/304,765, filed on Jun. 25, 2021, now Pat. No. 11,260,969, which is a (Continued)

(51) Int. Cl.
*B64C 35/00* (2006.01)
*B64C 25/00* (2006.01)
(Continued)

(52) U.S. Cl.
CPC .............. *B64C 35/00* (2013.01); *B64C 25/00* (2013.01); *B64C 35/001* (2013.01);
(Continued)

(58) Field of Classification Search
CPC ....... B64C 35/00; B64C 25/00; B64C 35/001; B64C 35/006; B64C 35/007;
(Continued)

(56) References Cited

U.S. PATENT DOCUMENTS 1,917,446 A 7/1933 Hitt
2,068,618 A 1/1937 Wilford
(Continued)

FOREIGN PATENT DOCUMENTS

EP 0285007 5/1988
EP 0450514 10/1991
(Continued)

OTHER PUBLICATIONS

Screen captures from YouTube video clip entitled "EKRANOPLAN—Ground effect russian aircrafts," 15 pages, uploaded on Sep. 22, 2008 by user "SAVOIE1970". Retrieved from Internet: <https://www.youtube.com/watch?v=su141UIHqOI>.
(Continued)

*Primary Examiner* — Justin M Benedik
(74) *Attorney, Agent, or Firm* — Finnegan, Henderson, Farabow, Garrett & Dunner LLP

(57) ABSTRACT

A ground effect craft having a ground effect wing, a plurality of sponsons, and a control system is disclosed. The ground effect wing may include a fore ground effect wing and an aft ground effect wing. The ground effect wing may generate a stabilizing moment on at least one sponson to stabilize the ground effect craft. The plurality of sponsons may be dynamically coupled to the body. The plurality of sponsons may be dynamically coupled to each other. The dynamic coupling may permit the sponsons to move relatively independent of the body and each other, thereby stabilizing the ground effect craft. The ground effect craft may include a stabilizing wing.

48 Claims, 27 Drawing Sheets

Related U.S. Application Data continuation of application No. 17/086,599, filed on Nov. 2, 2020, now Pat. No. 11,091,259.

(60) Provisional application No. 62/933,112, filed on Nov. 8, 2019.

(51) Int. Cl.
  *B60V 1/11* (2006.01)
  *B60V 1/22* (2006.01)
  *B63B 1/18* (2006.01)

(52) U.S. Cl.
  CPC .......... *B64C 35/006* (2013.01); *B64C 35/007* (2013.01); *B60V 1/115* (2013.01); *B60V 1/22* (2013.01); *B63B 2001/186* (2013.01)

(58) Field of Classification Search
  CPC ........... B64C 35/002; B64C 3/16; B64C 5/02; B64C 39/10; B64C 39/12; B60V 1/115; B60V 1/22; B60V 1/08; B63B 2001/186; B63B 2001/202; B63B 2001/145; B63B 1/14; B63B 1/322; B63B 1/36; B63H 2020/003; Y02T 50/10; Y02T 70/10
  See application file for complete search history.

(56) References Cited

U.S. PATENT DOCUMENTS

| | | | |
|---|---|---|---|
| 2,347,959 A | 5/1944 | Moore et al. | |
| 2,844,339 A | 7/1958 | Stroukoff | |
| 2,952,234 A | 9/1960 | Levinson | |
| 3,016,864 A | 1/1962 | Woodfield | |
| 3,124,096 A | 3/1964 | Graig | |
| 3,157,146 A * | 11/1964 | Billig | B63B 1/22 114/283 |
| 3,202,383 A | 8/1965 | Le et al. | |
| 3,221,831 A | 12/1965 | Weiland | |
| 3,390,655 A | 7/1968 | Quady | |
| 3,401,663 A | 9/1968 | Yost | |
| 3,517,632 A * | 6/1970 | Gray | B63B 1/14 114/283 |
| 3,522,785 A | 8/1970 | Thompson | |
| 3,614,032 A | 10/1971 | Purcell, Jr. | |
| 3,762,355 A | 10/1973 | Raynes | |
| 3,785,330 A | 1/1974 | Fox | |
| 3,908,783 A | 9/1975 | Joerg et al. | |
| 3,917,022 A | 11/1975 | Brook, Jr. | |
| 3,918,382 A | 11/1975 | Atin | |
| 3,998,176 A | 12/1976 | Stout et al. | |
| 4,080,922 A | 3/1978 | Brubaker | |
| 4,685,641 A | 8/1987 | Kirsch et al. | |
| 4,693,203 A | 9/1987 | Lewis | |
| 4,705,234 A | 11/1987 | Bourn | |
| 4,712,630 A | 12/1987 | Blum | |
| 4,763,594 A | 8/1988 | Zickermann | |
| 4,848,702 A | 7/1989 | Riggins | |
| 4,926,773 A | 5/1990 | Manor | |
| 5,082,198 A | 1/1992 | Patel | |
| 5,228,404 A | 7/1993 | Gibbs | |
| 5,265,550 A | 11/1993 | Harper, Jr. | |
| 5,329,870 A | 7/1994 | Cook | |
| 5,566,775 A | 10/1996 | Schoell | |
| 5,697,468 A | 12/1997 | Rsell et al. | |
| 5,860,620 A | 1/1999 | Wainfan et al. | |
| 5,913,493 A | 6/1999 | Labouchere | |
| 5,918,562 A | 7/1999 | Macchio | |
| 6,044,784 A | 4/2000 | Gee et al. | |
| 6,086,014 A | 7/2000 | Bragg, Jr. | |
| 6,325,011 B1 | 12/2001 | Klem | |
| 6,581,536 B1 * | 6/2003 | Belloso | B60V 1/08 440/37 |
| 6,732,672 B2 | 5/2004 | Shin et al. | |
| 6,874,439 B2 | 4/2005 | Conti | |
| 7,059,259 B2 | 6/2006 | Allen | |
| 7,188,580 B1 * | 3/2007 | Borman | B60V 1/08 114/283 |
| 7,318,388 B2 | 1/2008 | Scism et al. | |
| D618,591 S * | 6/2010 | Nagapetyan | D12/3 |
| 8,196,537 B2 | 6/2012 | Lee | |
| 8,640,640 B2 * | 2/2014 | Conti | B63B 1/14 114/61.15 |
| 9,073,604 B2 | 7/2015 | Mallette et al. | |
| 9,452,808 B1 | 9/2016 | Oklejas, Jr. | |
| 2004/0065246 A1 * | 4/2004 | Allen | B60V 1/08 114/274 |
| 2006/0144999 A1 * | 7/2006 | From | B64C 3/18 244/105 |
| 2007/0151495 A1 | 7/2007 | Maloney et al. | |
| 2008/0047476 A1 * | 2/2008 | Stevenson | B63B 1/14 114/61.16 |
| 2010/0043690 A1 | 2/2010 | Lee | |
| 2010/0044506 A1 | 2/2010 | Smith et al. | |
| 2010/0288174 A1 | 11/2010 | Conti et al. | |
| 2011/0168832 A1 | 7/2011 | Funck | |
| 2011/0266081 A1 | 11/2011 | Novikov-Kopp | |
| 2012/0024211 A1 * | 2/2012 | Wiltse | B63B 1/16 89/937 |
| 2013/0031931 A1 | 12/2013 | Harbin | |
| 2015/0136011 A1 | 5/2015 | Wilson | |
| 2015/0321757 A1 | 11/2015 | DiClemente et al. | |
| 2017/0313393 A1 * | 11/2017 | Monk | B63B 39/00 |

FOREIGN PATENT DOCUMENTS

| | | |
|---|---|---|
| EP | 0563909 | 10/1993 |
| FR | 943917 | 3/1949 |
| FR | 1080727 | 12/1954 |
| FR | 1199859 | 12/1959 |
| FR | 2450192 | 9/1980 |
| GB | 413472 | 7/1934 |
| GB | 492046 | 9/1938 |
| GB | 2200598 A | 8/1988 |
| GB | 2222555 A | 3/1990 |
| RU | 2099217 C1 | 12/1997 |
| RU | 2629463 C1 | 8/2017 |
| WO | WO 98/41442 A1 | 9/1998 |

OTHER PUBLICATIONS

Screen captures from YouTube video clip entitled "36 skater blowover slowmo," 5 pages, uploaded on Apr. 13, 2007 by user "Steve McCaffertee". Retrieved from Internet: <https://www.youtube.com/watch?v=NUVSEcePCr8>.

International Search Report in PCT International Application No. PCT/EP2020/080320 dated Apr. 20, 2021 (38 pages).

Partial International Search Report in PCT International Application No. PCT/EP2020/080320 dated Feb. 2, 2021 (15 pages).

\* cited by examiner

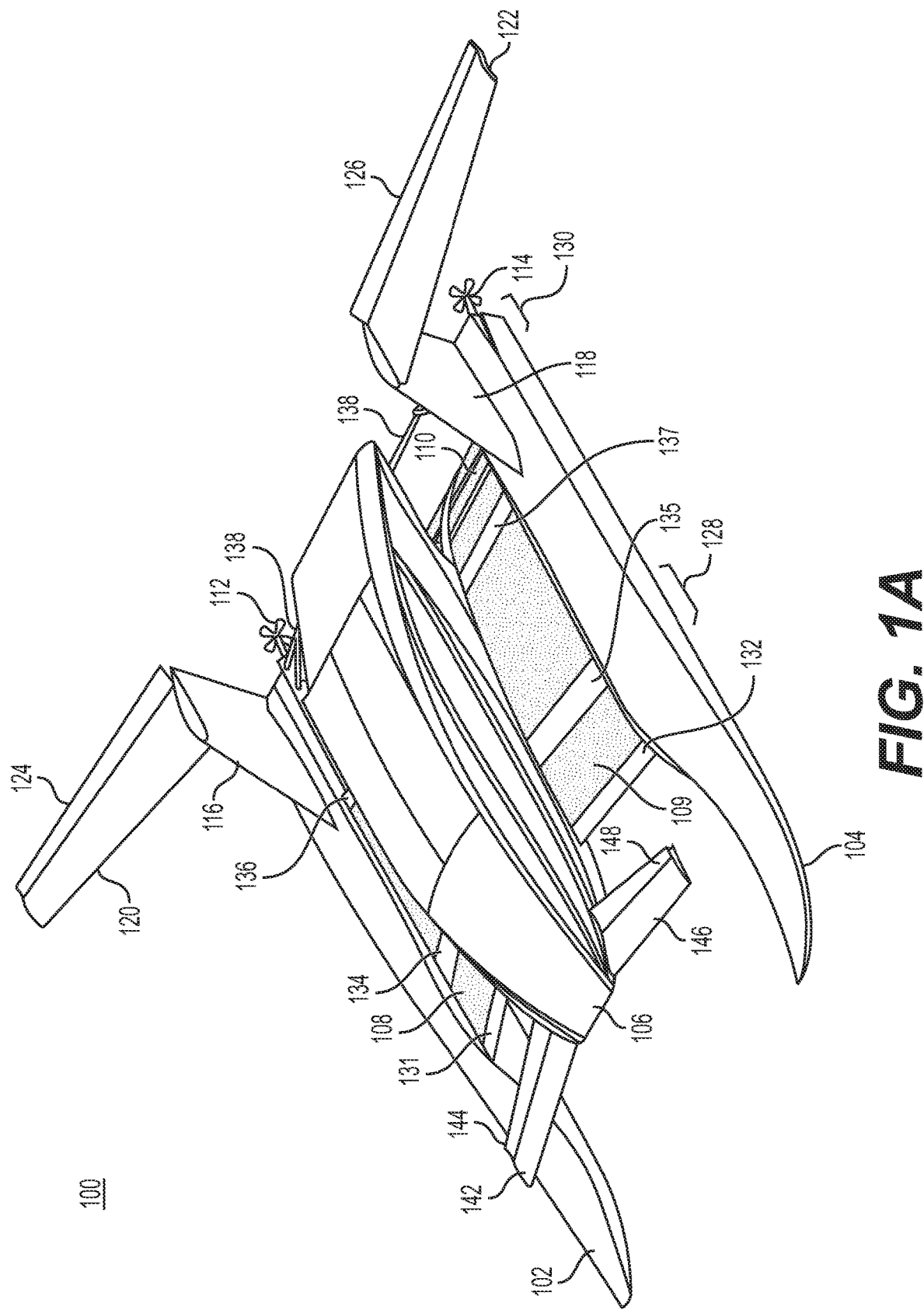

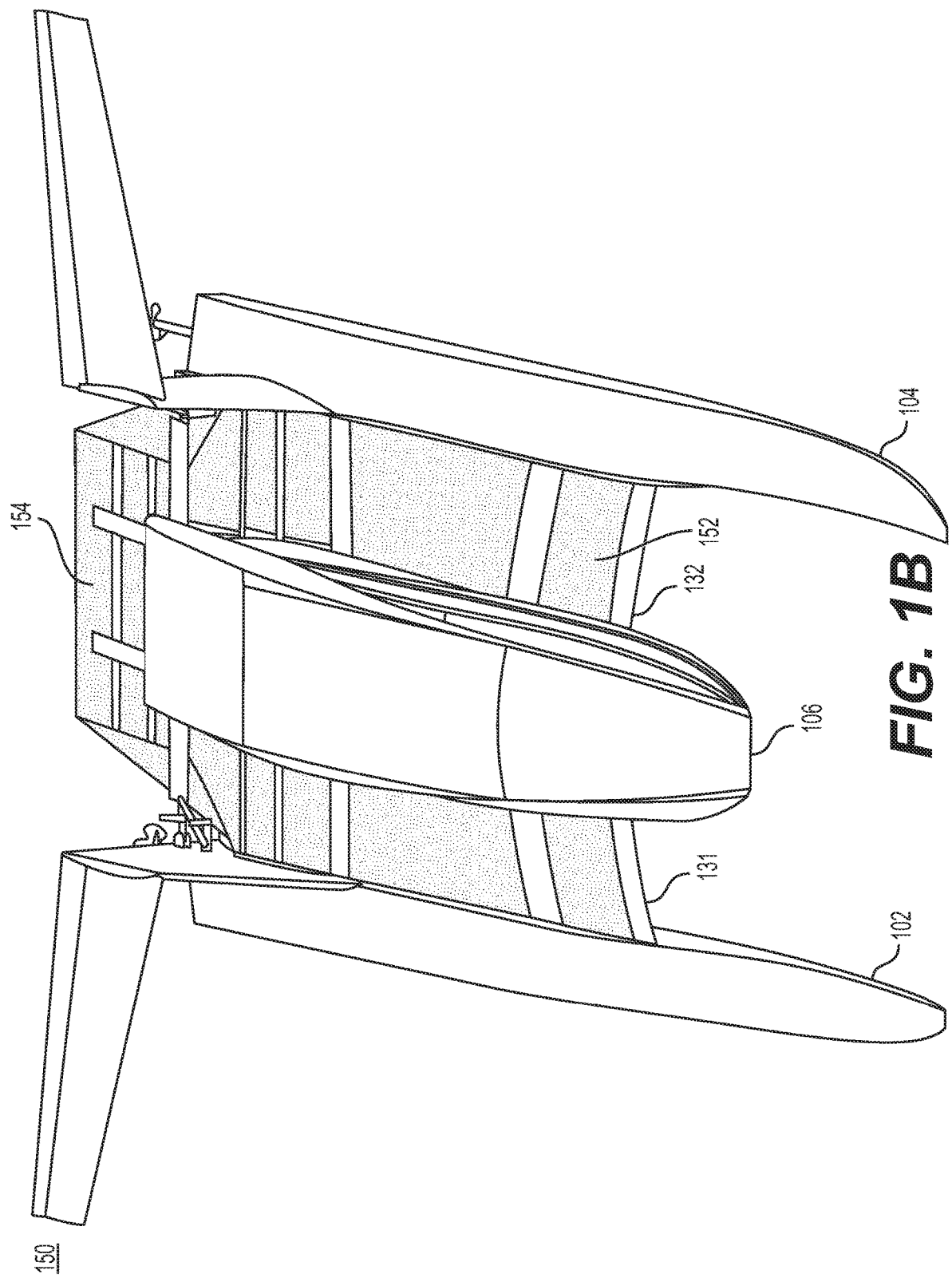

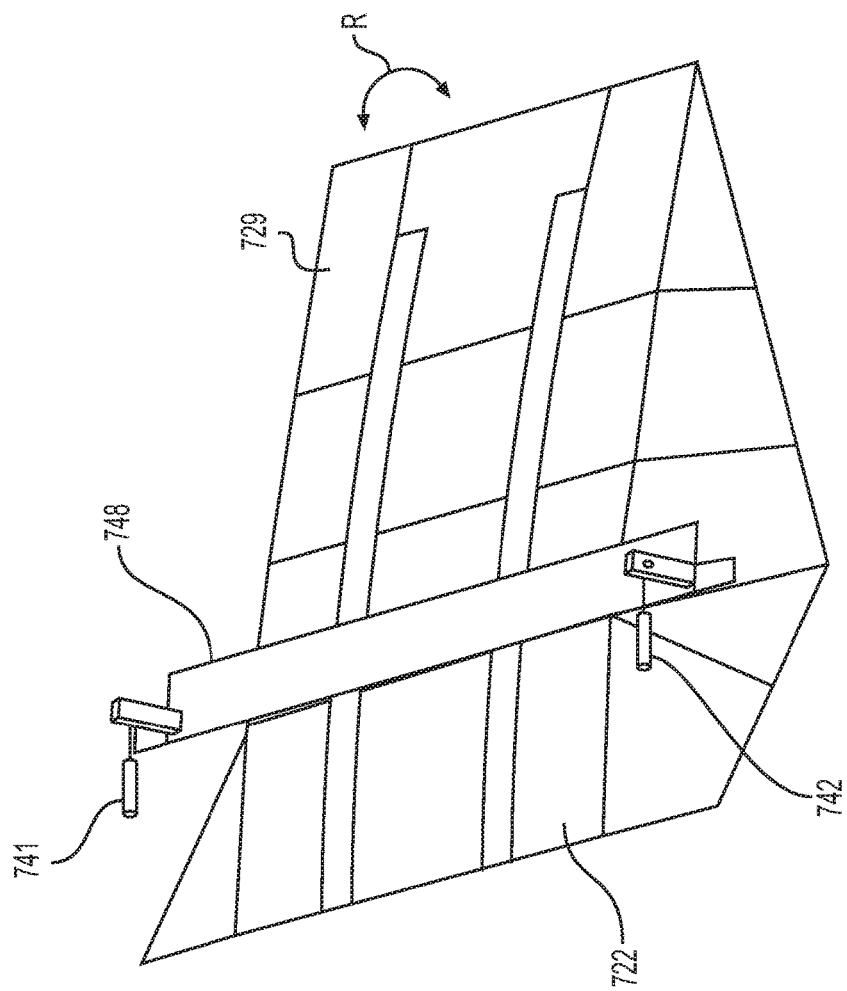

GROUND EFFECT CRAFT

RELATED APPLICATIONS

This application is a Continuation of U.S. application Ser. No. 17/304,765, filed Jun. 25, 2021, which is a Continuation of U.S. application Ser. No. 17/086,599, filed Nov. 2, 2020, issued as U.S. Pat. No. 11,091,259, which claims priority to U.S. Provisional Patent Application No. 62/933,112, filed on Nov. 8, 2019, which are hereby incorporated by reference in their entireties.

FIELD

The present disclosure relates generally to ground effect craft, including apparatus, systems, and methods for stabilizing such ground effect craft.

BACKGROUND

A ground effect craft traveling over a planetary surface, such as water, snow, ice, or land, generally uses air trapped beneath the wing to increase a lifting force on the craft, unlike traditional aircraft in free flight where the air underneath a wing away from the planetary surface is not bounded and therefore provides less lift. A ground effect wing takes advantage of a surface boundary below the wing that dampens wingtip vortices, thereby reducing the drag otherwise caused by the wingtip vortices when the aircraft is away from the planetary surface. As a result, the ground effect wing increases lift and reduces drag.

When ground effect craft move at high speeds along a planetary surface, such as water, an induced pitching moment on planing surfaces rigidly coupled to an aerodynamic surface will cause increased angles of attack. An increased angle of attack and increase in height will cause the force of the air under the wing to move towards the front of the craft. This forward movement of this center of aerodynamic pressure results in an unstable condition which can cause the craft to overturn in a dangerous and destructive failure mode known as a "blow over."

Environmental factors can also increase the instability of ground effect craft. Because of a ground effect craft's proximity to the planetary surface, any aerodynamic or planetary surface disturbance may cause different parts of the craft to contact the planetary surface with great force. Such contact may result in structural damage and may cause the ground effect craft to become unstable. One example of such environmental factors applying forces to a craft travelling over or upon a planetary surface are sea swells. A sea swell that contacts one part of the craft before the other can cause the craft to pitch upwards and also roll sideways, creating instability, which can lead to the craft turning over.

Instabilities of watercraft and ground effect craft cause numerous failures each year, endangering passengers and crew. Therefore, there is a need to improve stability of watercraft and ground effect craft.

SUMMARY

An exemplary aspect of this disclosure relates to a method of stabilizing a ground effect craft, the method including generating lift via a first lift surface connected to a body structure of a ground effect craft; stabilizing the ground effect craft via dynamic coupling a plurality of sponsons to the body structure; and stabilizing the ground effect craft via a stabilizing surface coupled to the body structure. According to some embodiments, the first lift surface may include a first ground effect wing.

According to some embodiments, the step of stabilizing the ground effect craft via dynamic coupling of a plurality of sponsons to the body structure may include connecting the ground effect wing to a sponson in the plurality of sponsons via a hinge, bearing, pivot, and/or joint (such as a ball joint) connection. According to some embodiments, the step of stabilizing the ground effect craft via dynamic coupling of the plurality of sponsons to the body structure may include connecting the body to a sponson in the plurality of sponsons via a control link and a hinge, bearing, pivot, and/or joint (such as a ball joint) connection. According to some embodiments, the step of stabilizing the ground effect craft via dynamic coupling of the plurality of sponsons to the body structure may include connecting the body to a sponson in the plurality of sponsons via a spring, a dampener, and/or a shock.

An aspect of this disclosure relates to a ground effect craft having a plurality of sponsons, wherein a first sponson and a second sponson in the plurality of sponsons are dynamically connected to each other; a body dynamically connected to the plurality of sponsons via a plurality of control links; and a first ground effect wing connected to the body.

According to some embodiments, the ground effect craft may further a first propulsion device connected to the first sponson and a second propulsion device connected to a second sponson.

According to some embodiments, the ground effect craft may include a dynamic seal, the dynamic seal configured to maintain a ground effect lifting force during movement of at least one of the first sponson and the second sponson. According to some embodiments, the ground effect craft may include the dynamic seal may include an endplate of the first ground effect wing substantially adjacent to a first surface of the first sponson and a second surface of the second sponson. According to some embodiments, the dynamic seal may include an extendable endplate of the first ground effect wing configured to extend to be substantially adjacent to at least one of the first sponson and the second sponson. According to some embodiments, the dynamic seal may include at least one of a pneumatically inflated seal and a preformed seal. According to some embodiments, the dynamic seal may include a membrane connected to the ground effect wing and a sponson in the plurality of sponsons.

According to some embodiments, the ground effect wing may include a flexible membrane and a spar, and wherein the membrane may be connected to the spar.

According to some embodiments, the ground effect craft may include a dynamic seal configured to allow movement of the first sponson relative to the body and generate a lifting force during movement of the first sponson.

According to some embodiments, the first ground effect wing may include a flap configured to move relative to the first ground effect wing and configured to control a ground effect lift force on the ground effect craft.

According to some embodiments, the ground effect craft may include longitudinal and lateral reinforcing members configured to restrain movement of a flap surface when the flap is deflected. According to some embodiments, the flap may be configured to deflect with aerodynamic pressure and/or hydrodynamic impacts.

According to some embodiments, the ground effect wing may include a mid-flap configured to extend from the ground effect wing between a leading edge and a trailing edge.

According to some embodiments, the ground effect craft may include a second ground effect wing dynamically connected to at least one sponson in the plurality of sponsons. According to some embodiments, the second ground effect wing may include a control arm connected to at least one sponson in the plurality of sponsons.

According to some embodiments, the ground effect craft may include a second ground effect wing dynamically sealed with at least one sponson in the plurality of sponsons. According to some embodiments, the second ground effect wing may include a plurality of overlapping segments configured to permit deflection of at least one segment of the overlapping segments without transmitting the movement to at least one other segment of the overlapping segments. According to some embodiments, the second ground effect wing may include the flap configured to move relative to the second ground effect wing and configured to control a ground effect lifting force on the sponsons.

According to some embodiments, the ground effect craft may include a stabilizing wing connected to the body. According to some embodiments, the stabilizing wing may include an anhedral wing.

According to some embodiments, the stabilizing wing may include a reverse delta wing. According to some embodiments, the stabilizing wing may include at least one of an elevator, a flap, an aileron, a rudder, an ailevator, an ailevon, a flaperon, a split flap, a spoiler, or a split spoiler.

According to some embodiments, the ground effect craft may include a linkage system configured to permit at least two sponsons in the plurality of sponsons to move substantially relative to each other and relative to the body. According to some embodiments, the linkage system may include a flexible beam spanning at least two sponsons in the plurality of sponsons and connected to the body. According to some embodiments, the linkage system may include a spar of the ground effect wing, wherein the spar dynamically connects two sponsons in the plurality of sponsons. According to some embodiments, the linkage system may include at least one control link including at least one ball joint at a point of connection. According to some embodiments, the linkage system may include a frame spanning at least two sponsons in the plurality of sponsons, the frame being dynamically connected to at least one sponson in the plurality of sponsons via a spring. According to some embodiments, the frame may be dynamically connected to at least one of the plurality of sponsons via a dampener.

According to another aspect of this disclosure, a ground effect craft may include a body; a sponson; a suspension system configured to dynamically couple the sponson to the body; a primary lift surface connected to the body and configured to generate a first ground effect lifting force; and a stabilizing surface coupled to the body.

According to some embodiments, the ground effect craft may include a secondary lift surface dynamically connected to the sponson and configured to generate a second ground effect lifting force.

According to another aspect of this disclosure, a ground effect craft may include a body section including a first ground effect wing, a second ground effect wing, a stabilizing wing, and a tail surface; wherein the first ground effect wing includes a first lift-generating surface and a first control surface; wherein the second ground effect wing includes a second lift-generating surface and a second control surface; a first sponson dynamically coupled to the body section via a first control link; a second sponson dynamically coupled to the body section via a second control link; a third control link dynamically coupling the first sponson to the second sponson; and a third ground effect wing dynamically coupled to the first sponson and the second sponson. According to some embodiments, the third ground effect wing being configured to generate a stabilizing moment on the sponsons when angle of attack of the body is increased. According to some embodiments, the first sponson and the second sponson are configured to move relative to the body, such that the movement of the first sponson may be substantially independent of the movement of the second sponson.

According to another aspect of this disclosure, a ground effect craft may include a fuselage including a first ground effect surface and a second ground effect surface, the first ground effect surface including a first ground effect wing, the second ground effect wing including a second wing surface; a first sponson dynamically coupled to the fuselage; a second sponson dynamically coupled to the fuselage; and a control link configured to dynamically couple the first sponson to the second sponson. According to some embodiments, the ground effect craft may include a third ground effect surface dynamically coupled to the control link. According to some embodiments, the fuselage further may include at least one stabilizing wing. According to some embodiments, the at least one stabilizing wing being statically coupled to the fuselage.

According to some embodiments, the dynamic coupling of the first sponson to the body and the second sponson to the body may be configured such that the first sponson and the second sponson move independently of the fuselage and each other. According to some embodiments, the first sponson may be dynamically coupled to the fuselage by a plurality of control arms and the second sponson may be dynamically coupled to the fuselage by a plurality of control arms. According to some embodiments, the control link may be dynamically coupled to the first sponson and the second sponson by a plurality of ball joints. According to some embodiments, the first sponson and the second sponson are configured to retract toward the fuselage. According to some embodiments, the first sponson may be dynamically connected to the first ground effect surface and the second sponson may be dynamically connected to the second ground effect surface.

According to some embodiments, the first ground effect wing may comprise a rigid or semi-rigid surface. According to some embodiments, the first ground effect wing may comprise a flexible or semi-flexible, elastic or non-elastic membrane surface. According to some embodiments, the membrane may act against a spar of the ground effect wing to generate lift. According to some embodiments, the first ground effect wing may comprise a combination of solid and membrane surfaces.

The stabilizing surface may be configured to counteract an unstable moment of the ground effect craft. The plurality of sponsons are configured to move relative to the body structure and each other, wherein the first lift surface creates lift independent of the movement of the plurality of sponsons. The body structure may be configured to be lifted by the first ground effect wing. According to some embodiments, the body structure may include canard wings configured to generate lift to and/or control body movement. The body structure may be configured to maintain course and direction independent of the movement of the plurality of sponsons in response to a variation in a planetary surface or forces acting on one or more of the sponsons.

According to some embodiments, the method may further include generating lift via a second lift surface dynamically coupled to the plurality of sponsons. According to some embodiments, the second lift surface may include a second ground effect wing. According to some embodiments, the second lift surface may be configured to provide lift to the plurality of sponsons and reduce hydrodynamic drag by lifting at least one sponson in the plurality of sponsons. According to some embodiments, the first lift surface may be configured to restrict or direct air toward the second lift surface.

According to some embodiments, the second ground effect wing may comprise a rigid or semi-rigid surface. According to some embodiments, the second ground effect wing may comprise a flexible or semi-flexible, elastic or non-elastic membrane surface. According to some embodiments, the membrane may act against a spar of the second ground effect wing to generate lift. According to some embodiments, the second ground effect wing may comprise a combination of solid and membrane surfaces.

An aspect of the disclosure relates to a method of stabilizing a ground effect craft, the method including dynamically coupling a plurality of sponsons to a body structure of the ground effect craft; generating a first lifting force via a first ground effect wing surface coupled to the body structure; stabilizing the body structure via a control system dynamically coupled between the plurality of sponsons; generating a second lifting force via the second ground effect wing surface; and deflecting a first sponson in the plurality of sponsons in response to a force imparted by a planetary surface, wherein the first sponson is configured to deflect independent of a second sponson in the plurality of sponsons in response to the force. The first lifting force may be configured to lift the body to reduce drag. The first lifting force may be configured to lift the body to stabilize the ground effect craft. In some embodiments, an angle of incidence of the first ground effect wing may be adjusted to change the center of pressure. The control link may be configured to rotate at a connection. The control link may be configured to control the movement of the first sponson relative to the movement of the second sponson and to the body structure. In some embodiments, the second ground effect wing surface may be substantially rearward of the first ground effect wing. In some embodiments, an angle of a second ground effect flap of the second ground effect wing may be adjusted for varying desired lift, obstacle clearance, docking, weight distribution, or weight transfer. The second ground effect wing may be configured to generate the second lifting force at a location aft of a center of gravity of the sponsons. The second ground effect wing may be configured to generate the second lifting force to adjust the pitch of the plurality of sponsons. The second lifting force may be configured to counteract an unstable moment of the ground effect craft. The second lifting force may be configured to lift the plurality of sponsons and reduce hydrodynamic drag.

Another aspect of the disclosure relates to a method of stabilizing a flying body including stabilizing the flying body via a control assembly dynamically coupled between a plurality of sponsons, generating lift via a ground effect wing connected to the body, wherein the control assembly includes a fore control link dynamically connected to the plurality of sponsons and the flying body and a rear control link dynamically connected to a first sponson in the plurality of sponsons and a second sponson in the plurality of sponsons. The first sponson and the second sponson may be configured to move independent of the flying body and each other when a surface variation affects a desired path of at least one sponson in the plurality of sponsons. In some embodiments, the plurality of sponsons may be configured to retract towards the flying body. The ground effect wing may be configured to lift the flying body when the flying body transitions between a takeoff mode and a flying mode. The plurality of sponsons may be configured to absorb a landing impact when the flying body transitions between the flying mode and a landing mode.

Another aspect relates to a ground effect craft configured to create an air cushion beneath the craft when the ground effect craft is substantially stationary. The ground effect craft may include a body, a ground effect wing, a stabilizing wing, and a plurality of planing surfaces. The air cushion may include a skirt configured to surround an air cushion when the craft is in motion. The skirt may be an inflatable skirt. The skirt may be configured to provide a seal configured to entrap air under the ground effect wing when the ground effect craft is in motion. The entrapped air may be pressurized to lift the ground effect craft. The ground effect wing may include a finger extending downwards from the ground effect wing to entrap air in an air chamber. The finger may include an inflation compartment. The air chamber may be enclosed or partially enclosed by a plurality of fingers that seal with each other, the ground effect wing, and/or the sponsons. In some embodiments, the ground effect craft may include a fan configured to increase the pressure within the air chamber between the inflatable fingers. The fingers may be configured to retract when the ground effect wing is at an airspeed sufficient to provide lift.

In some embodiments, a ground effect craft may include a plurality of sponsons, a body, and a ground effect wing. The ground effect craft may be configured to move along a planetary surface. The plurality of sponsons may include a first sponson and a second sponson. The first sponson and the second sponson may be dynamically connected to each other. The ground effect craft may be propelled by a propulsion device connected to a sponson in the plurality of sponsons. The plurality of sponsons may be dynamically connected to each other. The body may be dynamically connected to each sponson in the plurality of sponsons via a control system. The control system may include a plurality of control links. In some embodiments, the control links may flex, thereby acting as dampeners and/or springs. In some embodiments, the control links may include a flexible beam. A first end of the flexible beam may be connected to a first sponson in the plurality of sponsons. A second end of the flexible beam may be connected to the body. In some embodiments, the control links may be positioned forward of a center of gravity of the body.

The ground effect wing may be configured to be connected to the body. In some embodiments, the ground effect wing may be coupled in heave with the body. In some embodiments, the ground effect wing may be coupled in pitch with the body. In some embodiments, lift created by the ground effect wing may lift the weight of the body.

Another aspect of the disclosure relates to a ground effect craft including a first ground effect wing and a second ground effect wing. The ground effect craft may include a body, a plurality of sponsons, the first ground effect wing, and the second ground effect wing. In some embodiments, the ground effect craft may include a third ground effect wing. In some embodiments, the third ground effect wing may be substantially rearward of the first ground effect wing and the second ground effect wing. The first ground effect wing and the second ground effect wing may be configured to restrict or direct air to the third ground effect wing. In some embodiments, the third ground effect wing may be rearward of the center of gravity of the sponsons. The third ground effect wing may be configured to provide lift to an aft portion of the ground effect craft. The third ground effect wing may be configured to counteract an unstable moment on the first ground effect wing or the second ground effect wing. The third ground effect wing may be configured to produce additional lift from air directed towards the third ground effect wing when the first ground effect wing and/or the second ground effect wing pivot relative to at least one sponson. The third ground effect wing may be configured to produce additional lift from air directed towards the third ground effect wing when the flaps of the first ground effect wing and/or the second ground effect wing deflect either by actuator and/or increased aerodynamically induced pressure acting upon the flaps and/or flap reinforcing members. In some embodiments, one or more of the ground effect wings may be configured to generate a stabilizing moment on one or more sponsons when an angle of attack of the body is increased.

In some embodiments, the ground effect craft may have folding features. For example, a first ground effect wing may be substantially foldable about a first pivot point. In some embodiments, the first ground effect wing may fold about the first pivot point to narrow the width of the ground effect craft. In some embodiments, a second ground effect wing may be substantially foldable about a second pivot point. In some embodiments, the second ground effect wing may fold about the second pivot point to narrow the width of the of the ground effect craft. The stabilizing wing may be substantially foldable about a third pivot point. In some embodiments, plurality of sponsons may be configured to rotate underneath the body. In some embodiments, the plurality of sponsons may retract towards the body.

Another aspect relates to a body of a ground effect craft. The ground effect craft may include a body. In some embodiments, the body may include a cockpit, a fuselage, a storage space, a cabin, and/or cargo doors. The body may include a bow door configured to open forwardly. In some embodiments, the body may include a buoyant sponson or incorporate a sponson in a hull of the body. In some embodiments, the body may include an actuator configured to lift the body relative to the sponsons. In some embodiments, such actuators may be controlled by automatic control systems. In some embodiments, the body may include a fore ground effect wing. In some embodiments, the body may include a planing surface. In some embodiments, the body may include a resting surface configured to rest on an aft control link, for example, when the ground effect craft is stationary or moving at lower velocities. According to some embodiments, the resting surface may include one or more shock absorption materials or devices. In some embodiments, the shock absorption materials or devices may be configured to absorb forces imparted from the aft control link to the body or from the body to the aft control link.

Another aspect relates to a body, a stabilizing wing, and a plurality of sponsons. The stabilizing wing may include a surface configured to rest on a spar of the aft ground effect wing. The stabilizing wing may include a surface configured to rest on a control link. The sponsons may include a vertical stabilizing wing. The stabilizing wing may include a bottom surface configured to rest on a top of the vertical stabilizing wing. The resting surface of the stabilizing wing may include shock absorption materials or devices. An aft ground effect spar and/or a linkage and/or sponson vertical stabilizing wing may include shock absorption materials or devices. The stabilizing wing may be dynamically connected to the plurality of sponsons via the body by (for example) a spring system. The stabilizing wing may be dynamically connected to the plurality of sponsons via the body by (for example) a dampening system. The stabilizing wing may comprise a rigid, semi-rigid, flexible, or semi-flexible surface. In some embodiments, the stabilizing wing may comprise one or more membrane surfaces. The second ground effect wing may comprise a flexible or semi-flexible, elastic or non-elastic membrane surface. The membrane may act against a fixed or non-fixed spar system. In some embodiments, the stabilizing wing may comprise a combination of solid and membrane surfaces. According to some embodiments, a spar of the stabilizing wing may connect to the body via a ball joint and/or a spring joint thereby allowing the stabilizing wing to deflect rather than create a roll moment on the body. In some embodiments, the stabilizing wing may be configured to generate a stabilizing moment on one or more sponsons when an angle of attack of the body is increased.

Another aspect relates to a sponson of a ground effect craft. In some embodiments, the sponson may have a lateral profile that minimizes the fore lateral surface area and maximizes the aft lateral surface area, thereby providing the center of lateral resistance of the sponson is proximate to the center of gravity of the sponson. In some embodiments, the sponson may have variable deadrise. In some embodiments, the sponson may include a strake. In some embodiments, the sponson may include a transverse step. In some embodiments, the sponson may include a longitudinal step. In some embodiments, the sponson may include a chine. In some embodiments, the bottom of the sponson may include a planing surface or a semi-planing surface. In some embodiments, the bottom of the sponson may be a displacement surface. In some embodiments, the sponson may include hydrodynamic and/or aerodynamic stabilizing surfaces. In some embodiments, the sponson may include hydrodynamic and/or aerodynamic control surfaces.

Another aspect of the disclosure relates to a dynamic seal for a ground effect craft. The ground effect craft may include the dynamic seal between a first ground effect wing and one sponson of a plurality of sponsons. The dynamic seal may be configured to increase lift of the first ground effect wing by increasing pressure under the ground effect wing. The dynamic seal may include an endplate that is substantially adjacent to one sponson in the plurality of sponsons. In some embodiments, the dynamic seal may include an extendable endplate. In some embodiments, the extendable endplate may extend from the first ground effect wing. In some embodiments, the dynamic seal may include a pneumatic seal that is substantially adjacent to a sponson in the plurality of sponsons. In some embodiments, the dynamic seal may include a preformed seal that is substantially adjacent to a sponson in the plurality of sponsons. The preformed seal may include a Teflon, rubber, high density molecular plastic seal, or other suitable material. In some embodiments, the dynamic seal may include a flexible elastic or non-elastic membrane. In some embodiments, the membrane of the dynamic seal may connect to the body and a sponson of the plurality of sponsons. In some embodiments, the ground effect wing membrane may include the membrane of the dynamic seal. In some embodiments, the dynamic membrane may comprise a break-away connection, such as, for example hook and loop fasteners or break-away stitching, configured to detach the membrane from the sponson and/or ground effect wing at certain angles or rotations. Such detachment, for example, may prevent a pitched sponson from pitching the ground effect wing when the membrane seal is at the limits of travel and/or fully taut. In some embodiments, the dynamic seal may include a plurality of fingers. In some embodiments, the dynamic seal may include a plurality of overlapping and/or telescoping panels. In some embodiments, one or more flaps of the ground effect craft may include a dynamic seal configured to seal with the ground effect wing and a sponson of the plurality of sponsons.

Another aspect of the disclosure relates to a ground effect craft including a stabilizing wing. The stabilizing wing may include one or more control surfaces. In some embodiments, the one or more control surfaces may be actuated by one or more actuators. In some embodiments, the one or more control surfaces may be configured to operate in a coordinated manner. In some embodiments, one or more control surfaces may be actuated by automatic control systems, including, for example, an autopilot. In some embodiments, the stabilizing wing may include a horizontal stabilizer. In some embodiments, the stabilizing wing may include one or more vertical stabilizers. In some embodiments, the stabilizing wing may include one or more of an elevator, a flap, a flaperon, ailevon, spoiler, split spoiler, aerodynamic rudder or an ailevator. In some embodiments, the stabilizing wing may include an anhedral wing. In some embodiments, the stabilizing wing may include a reverse delta wing. In some embodiments, the stabilizing wing may include outrigger bodies with spoilers.

Another aspect of the disclosure relates to a linkage system between a plurality of sponsons of a ground effect craft. In some embodiments, the linkage system may include a connection between the plurality of sponsons. In some embodiments, the linkage system may include a control system that stiffens at least one connection between the body and the sponsons. In some embodiments, the linkage system may include a control system that dampens at least one connection between the body and the sponsons. In some embodiments, the linkage system may include a plurality of control links. The plurality of control links may dynamically connect the plurality of sponsons to the body of the ground effect craft. In some embodiments, the linkage system may include a flexible beam that spans between two sponsons in the plurality of sponsons and/or a sponson in the plurality of sponsons and the body. In some embodiments, the linkage system may include at least one of a spring and a dampener. In some embodiments, the linkage system may include a frame spanning two sponsons in the plurality of sponsons and/or a sponson in the plurality of sponsons and the body.

In some embodiments, the frame may be dynamically connected to the sponsons via a dampening device, such as, for example, a spring. In some embodiments, the linkage system may include at least one of a McPherson strut, a torsion bar, a trailing arm, a leaf spring, a single or double wishbone, a single or double hinge, a pantograph linkage system, or a Watts Linkage.

Another aspect of the disclosure relates to a flap of a ground effect wing. The ground effect wing may include the flap configured to move relative to the ground effect wing. In some embodiments, the flap may be configured to be reinforced by one or more transverse and/or longitudinal reinforcing members. In some embodiments the reinforcing members and/or the flap may be of a composite construction with a laminate schedule designed to provide a predetermined resistance to deflection at varying aerodynamic pressures. In some embodiments, the laminate schedule may include a dampening material. In some embodiments, the laminate may be configured to have an increased stiffness at an interior portion of the flap and a decreased stiffness at an edge portion of the flap. In some embodiments, the laminate may be configured to have an increased stiffness at an edge portion of the flap and a decreased stiffness at an interior portion of the flap. In some embodiments, a flap may be constructed of overlapping segments to permit deflection of at least one segment of the overlapping segments without transmitting the movement to at least one other segment of the overlapping segments.

In some embodiments, the ground effect wing may include a first flap configured to extend from an aft spar of the ground effect wing. The first flap may be configured to rotate substantially downwards to increase lift of the ground effect wing. In some embodiments, the first flap may include an actuator that moves the first flap, thereby changing a location of a center of pressure and/or adjusting a pressure underneath the ground effect wing. In some embodiments, the flap may be configured to actuate by a pneumatically pressurized membrane lobe. The flap may be configured to rotate substantially downwards or upwards to increase or decrease the lift of the ground effect wing.

In some embodiments, the ground effect wing may include a second flap proximate to the center of area of a ground effect wing. In some embodiments, the second flap may be located between a front spar and an aft spar of the ground effect wing. In some embodiments, the second flap may be configured to be extended or retracted, changing a location of a center of pressure and/or adjusting a pressure underneath the ground effect wing.

Another aspect of the disclosure relates to a propulsion system of a ground effect craft. In some embodiments, the propulsion system may include one or more motors connected to at least one sponson in the plurality of sponsons. The motors may include marine motors. In some embodiments, the marine motors may include at least one of an outboard motor and an inboard motor. The propulsion system may include pod drives, surface drives, jet drives, stern drives, inboard drives, folding surface shaft drive, and outboard drives. In some embodiments, the propulsion system may include a surface or shaft drive comprising hydropneumatic dampening of the vertical trim actuators. In some embodiments, the propulsion system may include at least one aerodynamic motor connected to a body, a sponson, and/or a stabilizing wing. In some embodiments, the propulsion system may include at least aerodynamic propulsion system connected to a body, a sponson, and/or a stabilizing wing. In some embodiments the aerodynamic motor or aerodynamic propulsion system may include a propeller and/or force-generating mechanism. In some embodiments, at least one wing surface of the ground effect craft may include solar cells to power electric motors or charge batteries.

It is to be understood that both the foregoing general description and the following detailed description are exemplary and explanatory only and are not restrictive of the invention. The accompanying drawings, which are incorporated in and constitute a part of this specification, illustrate several exemplary embodiments and together with the description, serve to outline principles of the exemplary embodiments.

BRIEF DESCRIPTION OF THE DRAWINGS

FIGS. 1A-1B illustrates an exemplary embodiment of a ground effect craft.

FIG. 7A-7D illustrate exemplary embodiments of aerodynamic structures of ground effect craft.

Figure 2:
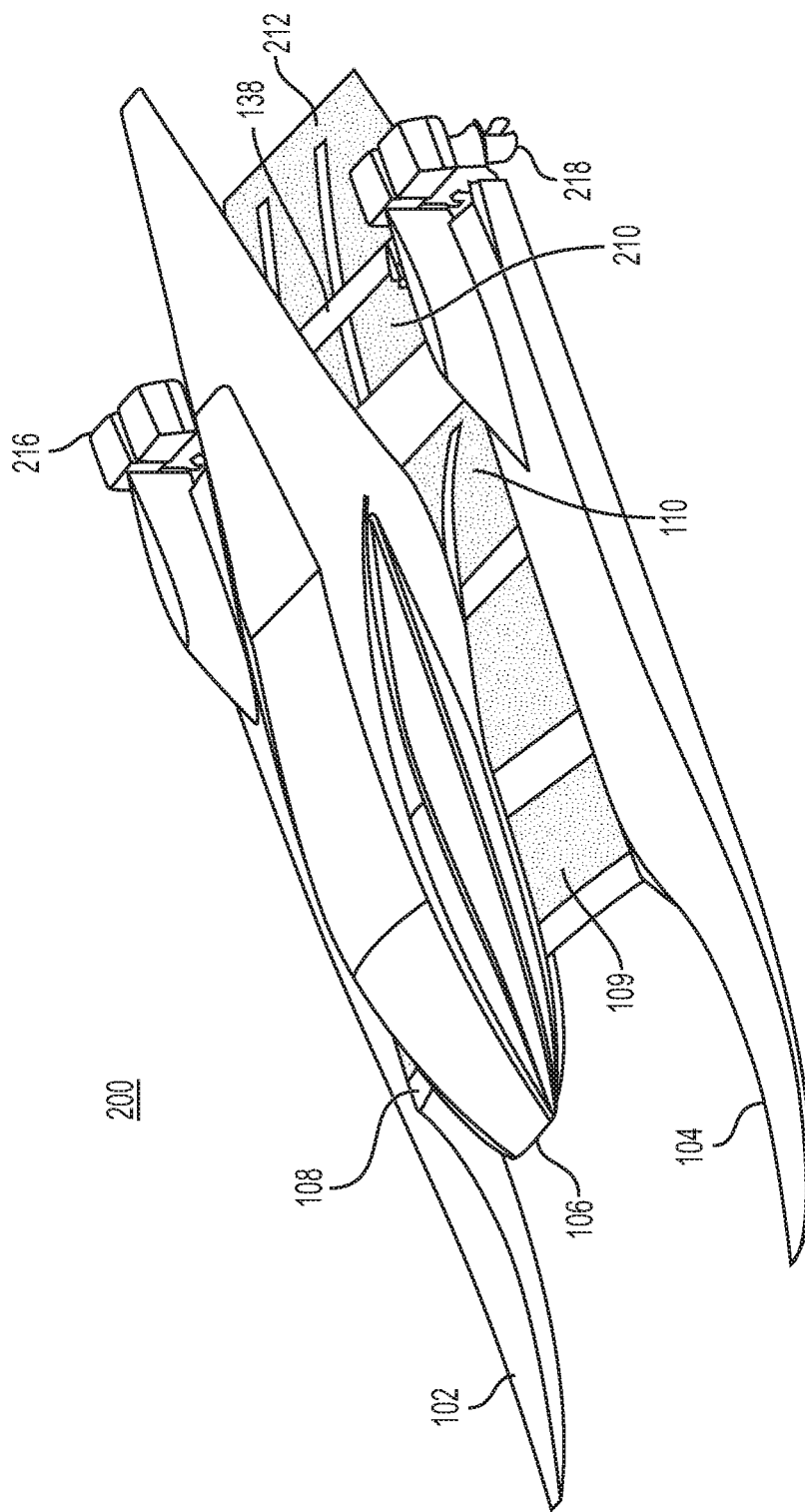
FIG. 2 illustrates another exemplary embodiment of a ground effect craft.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

Exemplary disclosed embodiments include apparatus, systems, and methods for stabilizing and generating lift for a ground effect craft. For example, in some embodiments, a ground effect craft may include a ground effect wing. The ground effect craft may include a plurality of sponsons, a body, and a control system. The ground effect craft may be used in a method for stabilizing the ground effect craft. The ground effect craft may be used in a method for generating lift for the ground effect craft. The disclosed embodiments increase stability and/or reduce instability associated with the ground effect craft when compared to traditional stabilizing methods by allowing the sponson to move relative to the body. Stability is further increased by allowing the sponsons to move relative to each other. The disclosed embodiments increase stability associated with the ground effect craft when compared to traditional stabilizing methods by generating lift for the body independent of the sponsons. Some embodiments may reduce a tendency for a ground effect craft to become unstable, for example, by reducing and/or mitigating forces associated with causing an unstable condition of the craft. Some embodiments may generate lift for the ground effect craft to increase efficiency. Some embodiments may reduce craft failures and increase efficiency as compared to previously known craft.

Some embodiments may be used to stabilize craft that generate lift for ground effect craft, such as watercraft, or aircraft. In some embodiments, the sponsons may include a first sponson and second sponson. In some embodiments, the ground effect craft may include a stabilizing wing. In some embodiments, the ground effect wing may include a fore ground effect wing and an aft ground effect wing.

Some embodiments may include methods for generating lift for a ground effect craft. Some embodiments may include methods for stabilizing a ground effect craft. Some embodiments stabilize the ground effect craft by reducing a tendency for a ground effect craft to become unstable, for example, by reducing and/or mitigating forces associated with causing an unstable condition of the craft. Some embodiments may also generate lift for the ground effect craft to increase efficiency. Thus, various embodiments, either alone or in combination, may increase stability and efficiency of a ground effect craft as compared to previously known, conventional methods.

FIGS. 1A-1B, 2, 3A-3B, 4A-4B, and 10 illustrate non-limiting examples of ground effect craft consistent with the present disclosure. Exemplary deflections of one or more sponsons of ground effect craft are described with reference to FIGS. 5A-5B. Exemplary control systems of ground effect craft are described with reference to FIGS. 6A-6B. Exemplary ground effect lift surfaces and stabilizing members are described with reference to FIGS. 7A-7D and 8A-8G. An exemplary sponson of ground effect craft is described with reference to FIGS. 9A-9D. An exemplary method of generating lift is described with reference to FIGS. 11A-11B. FIGS. 12A-12C describe an exemplary folding mechanism to reduce the footprint of the ground effect craft. FIGS. 13A-13G also describe exemplary folding mechanisms of a ground effect craft. It is understood that the examples and embodiments described represent simplified descriptions used to facilitate understanding of the principles and methods of this disclosure.

FIG. 1A shows an exemplary embodiment of ground effect craft 100. In some embodiments, ground effect craft 100 may include a first sponson 102, a second sponson 104, a body 106, a first ground effect wing 108, a second ground effect wing 109, a fore control system 128, and an aft control system 130. To facilitate understanding, ground effect wings 108, 109 are shown stippled in FIG. 1A.

Ground effect wings 108, 109 may operate to create a ground effect lifting force when the ground effect craft operates near a planetary surface. For example, ground effect wings 108,109 may create a lifting force as ground effect craft 100 travels over water. In some embodiments, ground effect wings 108, 109 may create an air cushion between a wing surface and a planetary surface. In some embodiments, first ground effect wing 108 may include a first leading edge 131, a first main spar 134, and/or a first aft spar 136. Second ground effect wing 109 may include a second leading edge 132, a second main spar 135, and/or a second aft spar 137. Ground effect wings 108, 109 may include a first shaped leading edge 131 and a second shaped leading edge 132 to direct air flow in a way that facilitates lift. In some embodiments, ground effect wings 108, 109 may include a rigid or semi-rigid structure to maintain an airfoil shape configured to generate lift. In some embodiments, ground effect wing 108, 109 may include a flexible or semi-flexible material to entrap air and/or generate lift. Such flexible or semi-flexible material may be elastic or non-elastic. In some embodiments, ground effect wings 108, 109 may be comprised of the rigid, semi-rigid, semi-flexible, or flexible material without one or more of main spars 134, 135 or aft spars 136, 137. In some embodiments, ground effect wings 108, 109 may include a plurality of aerodynamic surfaces or control surfaces connected to each other.

In some embodiments, ground effect wings 108, 109 may extend from leading edges 131, 132 to aft spars 136, 137, respectively. In some embodiments, such as shown in FIG. 1A and discussed in 1B and other figures herein, ground effect wings 108, 109 may also extend behind aft spars 136, 137 and may include various control surfaces configured to facilitate lift and/or control.

Ground effect wings 108, 109 may operate to generate a lifting force for body 106 as ground effect craft 100 moves along a planetary surface. In some embodiments, first and second ground effect wings 108, 109 may be connected to respective sides of body 106. In some embodiments, ground effect wings 108, 109 may be substantially continuous between first sponson 102 and second sponson 104, and may form a single wing.

Ground effect wings 108, 109 may be configured such that ground effect wings 108, 109 may move relative to sponsons 102, 104. Ground effect wings 108, 109 may generate lift regardless of the movement of sponsons 102, 104 relative for example, due to sponsons 102, 104 striking an obstacle or perturbation on a planetary surface, which may cause sponsons 102, 104 to pitch and/or heave.

In some embodiments, ground effect wings 108, 109 may be configured to substantially seal with sponsons 102, 104, respectively, to increase pressure underneath ground effect wings 108, 109 when ground effect craft 100 is in motion. As discussed further below in reference to the examples in FIGS. 8A-8G, ground effect wings 108, 109 and sponsons 102, 104 may be configured to allow movement of sponsons 102, 104 relative to ground effect wings 108, 109 while maintaining an air cushion beneath ground effect wings 108, 109. That is, in some embodiments, sponsons 102, 104 may be configured to deflect, for example, in pitch and/or heave, while ground effect wing remains relatively stable with respect to body 106.

In some embodiments ground effect wings 108,109 may comprise a solid surface. In some embodiments, ground effect wings 108,109 may comprise a semi-flexible, flexible, semi-elastic, or flexible elastic or non-elastic membrane surface. The membrane surface may be fixed to one or more spars 131, 132, 134, 135, 136, 137. The membrane surface may be configured to act against, but not be coupled to, one or more spars 131, 132, 134, 135, 136, 137. In such embodiments, one or more spars 131, 132, 134, 135, 136, 137 may control the deflection of the membrane to facilitate generating lift. In some embodiments, the membrane surface may connect to an endplate. In some embodiments, a membrane surface of ground effect wings 108, 109 may connect to or form a membrane seal. In some embodiments, ground effect wings 108, 109 may comprise a combination of solid and membrane surfaces. In some embodiments, the membrane surface may be a continuous membrane surface configured to extend from sponson 102 to sponson 104.

In some embodiments, the membrane may include or be connected to a break-away connection, such as, for example hook and loop fasteners or break-away stitching, configured to detach the membrane from a sponson, body, and/or other part of the ground effect craft at certain angles or rotations. Such detachment, for example, may prevent a pitched sponson from pitching the ground effect wing when the membrane seal is at the limits of travel and/or fully taut.

Fore control system 128 may be configured to dynamically connect sponsons 102, 104 to body 106 to allow sponsons 102, 104 to move in pitch and/or heave without transferring motion to body 106 and each other, while aft control system 130 is configured to connect first sponson 102 to second sponson 104 such that sponson 102, 104 move in pitch and/or heave without substantially transferring motion to each other.

In the embodiments of FIGS. 1A and 1B, portions of fore control system 128 are obscured by ground effect wings 108, 109, however, examples of fore control system 128 are discussed in further detail below with reference to other figures and examples.

Fore control system 128 and aft control system 130 are configured to allow generally vertical movement of the front of sponsons 102, 104 relative to one another and body 106, and allow relative movement of the rear of sponsons 102, 104 such that stability is improved when sponsons 102, 104 strike obstacles or perturbations of a planetary surface as ground effect wings 108, 109 generate lift for body 106, therefore body 106 and ground effect wings 108, 109 move substantially less or do not move in response to the pitch and/or heave of sponsons 102, 104.

Fore control system 128 and aft control system 130 may operate to allow sponsons 102,104 to move relative to body 106 when sponsons 102, 104 move in heave and pitch, as further discussed herein. In some embodiments, fore control system 128 may dynamically connect first sponson 102 to body 106 and second sponson 104 to body 106. Fore control system 128 may be configured to allow first sponson 102 to move relative to body 106 and second sponson 104. First sponson 102 may move relative to body 106 such that a force acting on first sponson 102 is at least partially isolated from and does not substantially transmit the force to body 106 to cause substantial movement of body 106. Fore control system 128 may be configured to allow second sponson 104 to move relative to body 106 and first sponson 102. Second sponson 104 may move relative to body 106 such that a force acting on second sponson 104 does not substantially transmit the force to body 106 in a way that causes substantial movement of body 106. First sponson 102 and second sponson 104 may also be configured such that a force acting on either first sponson 102 or second sponson 104 is at least partially isolated from and does not substantially transmit the force to the other sponson, thereby allowing relatively independent movement of sponsons 102 and 104 effected by a force. In other words, by dynamically coupling sponsons 102, 104 to body 106 and allowing relative movement of sponsons 102, 104 from body 106, sponsons 102, 104 may be at least partially decoupled in movement from body 106, thereby increasing stability and reducing instability of the ground effect craft when sponsons 102, 104 deflect in pitch and/or heave. This is because the relative movement of body 106 and/or ground effect wings 108, 109 is mitigated. Similarly, by allowing sponson 102, 104 to move relatively independent of each other, any instability caused by one sponson moving in pitch and/or heave is at least partially isolated from the other sponson and the body. Because instability of one sponson is at least partially isolated from the other sponson, stability of the ground effect craft is improved. Moreover, by dynamically coupling sponsons 102, 104 via aft control system 130, the rear portions of sponsons 102, 104, although able to move relative to one another, may be partially constrained, thereby reducing instability of the aft portion of ground effect craft 100.

In some embodiments, fore control system 128 may be positioned in front of a longitudinal center of gravity of body 106. In some embodiments, fore control system 128 may include a single control link (not shown). In some embodiments, fore control system 128 may include a plurality of control links. In some embodiments, fore control system 128 may include one or more flexible members, dynamic connections, and/or fixed connections. Fore control system 128 may include first and second main spars 134, 135. Fore control system 128 may include one or more rigid members and at least one dynamic connection such as, for example, to connect the rigid members to sponsons 102, 104 or body 106. A dynamic connection may include one or more hinges, pivots, bearings, joints (such as ball joints), springs, and/or dampeners, or any other connection configured to permit motion between the connected objects, such as, for example, between the rigid or flexible member and sponsons 102, 104 or body 106. Fore control system 128 may include at least one flexible member, which may act as a dampener and/or spring such as a thin-walled beam. Dynamic connections allow independent movement of, for example, sponson 102, 104, such that sponsons 102, 104 move relative to body 106 and each other without causing disruption to body 106, thereby increasing stability or reducing or mitigating an unstable condition of the overall craft, such as caused by pitching of one or both of sponsons 102, 104.

In some embodiments, fore control system 128 may include a rigid or semi-rigid member extending between first sponson 102 and body 106, the connection may include a hinge, bearing, pivot, or joint (such as a ball joint) configured to allow rotation of first sponson 102 relative to body 106. In some embodiments, fore control system 128 may include a first control link extending from first sponson 102 to body 106. In some embodiments, fore control system 128 may include a second control link extending from first sponson 102 to body 106. In some embodiments, the control links may assume the shape of an airfoil section to reduce aerodynamic drag. In some embodiments, the control links may include a super-cavitating leading edge to reduce hydrodynamic drag. In some embodiments, the control links may include a center of rotation forward of a planar center of area of the control link, thereby aligning along the airflow and/or hydrodynamic flow to reduce drag. The control links may include an inverse u-shape member that spans from body 106 to a first sponson 102 or a second sponson 104 to increase clearance from a planetary surface.

Aft control system 130 may dynamically connect first sponson 102 to second sponson 104. Aft control system 130 may be configured to allow first sponson 102 to move relative to second sponson 104. First sponson 102 may move relative to second sponson 104 such that a generally vertical force on first sponson 102 does not substantially transmit the force to second sponson 104 in a way that causes substantial movement of second sponson 104. In some embodiments, aft control system 130 may be positioned behind the longitudinal center of gravity of sponson 102, 104. Aft control system 130 may include one or more rigid or semi-rigid members, a dynamic connection, and/or a fixed connection. A dynamic connection may include one or more hinges, pivots, joints (such as ball joints), springs, and/or dampeners, or any other connection that permits motion between the connected objects. Aft control system 130 may include a flexible or semi-flexible member, such as a torsion bar. In some embodiments, aft control system 130 may include a single control arm, such as aft control link 138. In some embodiments, aft control system 130 may include a plurality of control arms. In some embodiments, aft control system 130 may include a plurality of aft control links or control arms (not shown). Such plurality of links or arms may be configured with a geometry, such as a parallelogram, trapezoidal, or triangular geometry, to reduce instability of ground effect craft 100 while permitting relative movement of at least one sponson. A parallelogram geometry, for example, may be configured to assist in maintaining sponsons 102, 104 substantially parallel to each other.

In some embodiments, aft control system 130 may include a rigid or semi-rigid member, such as aft control link 138, extending between first sponson 102 and second sponson 104, the connection having a hinge, bearing, pivot, or joint (such as a ball joint) to allow rotation or movement of first sponson 102 relative to second sponson 104. In some embodiments, aft control system 130 may include one or more flexible or semi-flexible members and fixed or dynamic connections. In some embodiments, aft control system 130 may include at least one flexible or semi-flexible member configured to act as a dampener and/or spring, such as a flexible beam, extending between first sponson 102 and second sponson 104. In some embodiments, body 106 may include a resting surface configured to rest on aft control link 138, for example, when the ground effect craft is stationary or moving at a low velocity. According to some embodiments, the resting surface may include shock absorption materials or devices, for example, to absorb forces imparted from aft control link 138 to body 106 or from body 106 to aft control link 138.

Ground effect wings 108, 109 and sponsons 102, 104 may form an air cushion beneath ground effect winds 108, 109 to create a lifting force on ground effect craft 100. The air cushion may, in some embodiments, stabilize ground effect craft 100. Ground effect wings 108, 109 may be substantially sealed with first and second sponsons 102, 104 to increase the pressure of the air cushion.

Ground effect wings 108, 109 may include one or more ground effect wing flaps 110. Ground effect wing flap 110 may move relative to a connection to ground effect wings 108, 109. Ground effect wing flap 110 may be configured to move relative to a planetary surface to increase or decrease lift. For example, ground effect wing flap 110 may be configured to move towards a planetary surface to increase lifting pressure of the air cushion, generating lift and/or causing body 106 to pitch downward. In some embodiments, ground effect wing flap 110 may be positioned behind the center of gravity of body 106 and/or sponsons 102, 104. Ground effect wing flap 110 may include a reinforcing structure configured to increase stiffness when the ground effect flap 110 moves upward due to, for example, air pressure created under ground effect wings 108, 109. This increased stiffness may result in a lifting force near the rear of ground effect wings 108, 109 thereby causing a nose-down moment on the front of ground effect craft 100. Ground effect wing flap 110 may include a dampening layer configured to mitigate and/or eliminate an impact force from a planetary surface transmitted to ground effect wings 108, 109. In some embodiments, each of ground effect wings 108, 109 may include a ground effect wing flap 110. In some embodiments, a single ground effect wing flap may connect ground effect wings 108, 109.

In some embodiments, the reinforcing members, the ground effect wings, and/or the flap may be of a composite construction with a laminate schedule configured to provide a predetermined resistance to deflection at varying aerodynamic and/or hydrodynamic pressures or impacts. In some embodiments, the laminate schedule may include a dampening material. In some embodiments, the laminate schedule may be configured to have an increased stiffness at an interior portion of the flap and a decreased stiffness at an edge portion of the flap. In some embodiments, the laminate schedule may be configured to have an increased stiffness at an edge portion of the flap and a decreased stiffness at an interior portion of the flap. Although discussed relative to reinforcing members, ground effect wings and flaps, it is understood that this discussion also applies to the sponsons, portions of the various wings, control surfaces, flaps, body, and other ground effect craft elements described herein.

In some embodiments, such as when ground effect craft 100 is a watercraft, a first marine surface drive 112 and a second marine surface drive 114 may be coupled to first sponson 102 and second sponson 104, respectively. Marine surface drives 112, 114 may include marine motors (not shown) installed in sponsons 102, 104. In some embodiments, one or more marine outboard motors may be fixed at the location of marine surface drives 112, 114. In some embodiments, one or more marine drives (not shown) may be coupled to body 106 instead of, or in addition to, surface marine drives 112, 114. Non-limiting examples of marine drives 112, 114 may include pod drives, surface drives, jet drives, stern drives, inboard drives, folding surface shaft drive, and outboard drives. Embodiments of some propulsion systems may include, for example, a surface or shaft drive comprising hydro-pneumatic dampening of the vertical trim actuators. In some embodiments, the drives may be configured to control the direction of ground effect craft 100. Non-limiting examples of marine motors may include inboard motors, and/or outboard motors and/or electric motors. In some embodiments, one or more aerodynamic motor may be coupled to one or both of the sponsons. It is also contemplated that propulsion systems may include at least one aerodynamic motor and/or aerodynamic propulsion system that may include, for example, a propeller, ramjet, and/or force-generating device connected to one or more of body 106, ground effect wings 108, 109, and/or sponsons 102, 104.

Sponsons of ground effect craft 100 may include aerodynamic surfaces configured to control the direction of ground effect craft 100. Aerodynamic surfaces of the sponsons of ground effect craft 100 may be configured to provide lift to and/or stabilize the sponsons. In some embodiments, first sponson 102 may include a first vertical stabilizing surface 116. First vertical stabilizing surface 116 may be configured to stabilize first sponson 102 when ground effect craft 100 is in motion. In some embodiments, first sponson 102 may include a first horizontal stabilizing surface 120 connected to first sponson 102 and/or first vertical stabilizing surface 116. First horizontal stabilizing surface 120 and/or first vertical stabilizing surface 116 may include a first stabilizing control surface 124. First stabilizing control surface 124 may stabilize first sponson 102 when ground effect craft 100 is in motion, such as when turning. For example, first stabilizing control surface 124 may change position to cause first sponson 102 to roll in a desired direction.

In some embodiments, second sponson 104 may include a second horizontal stabilizing surface 122 connected to second sponson 104 and/or second vertical stabilizing surface 118. Second vertical stabilizing surface 118 may be configured to stabilize second sponson 104 when ground effect craft 100 is in motion. Second horizontal stabilizing surface 122 and/or second vertical stabilizing surface 118 may include a second stabilizing control surface 126. Second vertical stabilizing surface 118 may be configured to stabilize second sponson 104 when ground effect craft 100 is in motion, such as when turning. In some embodiments, second sponson 104 may include a second horizontal stabilizing surface 126 connected to second sponson 104 and/or second vertical stabilizing surface 118. Second horizontal stabilizing surface 122 may include the second stabilizing control surface 126. For example, second stabilizing control surface 126 may change position to cause second sponson 104 to roll in a desired direction.

In some embodiments, horizontal stabilizing surfaces 120, 122 may be configured as anhedral, dihedral, partially dihedral, partially anhedral, gull-wing, or inverted gull-wing surfaces.

Stabilizing control surfaces 124, 126 may include, for example, at least one of an elevator, aileron a flap, a flaperon, spoiler, ailevon, split spoiler ailevon, or ailevator. Although discussed relative to control surfaces 124, 126, it is understood that this discussion applies to control surfaces of the various ground effect craft described herein, or otherwise encompassed by the principles disclosed herein. In some embodiments, one or more control surfaces may be actuated by automatic control systems including an autopilot.

In some embodiments, first and second stabilizing control surfaces 124, 126 may be configured to move first and second sponsons 102, 104, respectively, to control the direction of movement of ground effect craft 100.

A ground effect craft may include canard wings to improve lift and control of the craft. In some embodiments, body 106 may include a first canard surface 142 and a second canard surface 146. First and second canard surfaces 142, 146 may be configured to generate lift. First canard surface 142 may include a first canard control surface 144. Second canard surface 146 may include a second canard control surface 148. First and second canard surfaces 142, 146 may be wing surfaces positioned near the fore of body 106. In some embodiments, canard surfaces 142, 146 may be configured to control lift by moving relative to a connection to canard surfaces 142, 146. In some embodiments, canard surfaces 142, 146 may be configured to generate lift to and/or control a motion of body 106. In some embodiments, canard control surfaces 144, 148 may stabilize body 106 when ground effect craft 100 is turning. For example, first canard control surface 148 may move to cause body 106 to roll in a desired direction. As a further example, first canard control surface 148 may move together with control surface 144 to cause body 106 to pitch in a desired direction.

Body 106 may include a fuselage, which may include one or more of a cockpit, a passenger compartment, or a cargo bay. In some embodiments, body 106 may include a planing surface configured to reduce drag if a planetary surface is near or adjacent to body 106 while ground effect craft 100 is in motion. In some embodiments, body 106 may include a buoyant sponson or incorporate a sponson (not shown) within a hull of body 106. In some embodiments, body 106 may include at least one actuating mechanism configured to lift body 106 relative to the sponsons, for example, as described below. In some embodiments, such actuating mechanisms may be configured to be controlled by automatic control systems. In some embodiments, the body may be configured to float in water. In some embodiments, fore control system 128 solely controls free movement of body 106 with respect to sponsons 102, 104. In such embodiments, body 106 may be supported; hydrostatically by the displacement of the mass of body 106 by buoyancy when floating, hydrodynamically by body planing lift at lower velocities, and/or aerodynamically by ground effect wings 108, 109 at higher velocities. In some embodiments, body 106 may include an undercarriage shield or at least one planning surface configured to protect fore control system 128 from impact with a planetary surface and/or an obstacle.

A sponson, such as sponsons 102, 104, may have a hull with surface features along the length of the hull, such as laminar flow interrupters, transverse steps, longitudinal steps, and/or strakes. For example, both longitudinal and transverse steps may reduce drag and increase longitudinal stability. A chine step, for example, may be configured to operate as a spray rail. A longitudinal step may, for example, decrease drag and friction as compared to a conventional hull. Sponsons 102, 104 may also include other marine control surfaces that operate to change the direction of ground effect craft 100, such as, for example, trim tabs, interceptors, rudders, roll stabilizers.

Although certain embodiments described herein include two sponsons, it is also contemplated that ground effect craft 100 may include three or more sponsons.

FIG. 1B illustrates an exemplary embodiment of a ground effect craft 150. Certain features of ground effect craft 150 may be similar to those of exemplary ground effect craft 100 discussed with respect to FIG. 1A. The following description of ground effect craft 150 describes certain features of ground effect craft 150 that may vary from those of ground effect craft 100. Ground effect craft 150 includes a ground effect wing that extends along the length of body 106 length to increase the volume of the air cushion beneath the ground effect wing. In some embodiments, ground effect craft 150 may include a ground effect wing 152 that extends from a leading edge to a trailing edge that is behind sponsons 102, 104. In some embodiments, ground effect wing 152 may include an aft ground effect wing flap 154 configured to retain air pressure beneath ground effect wing 152. In some embodiments, ground effect wing flap 154 may operate similar to flap 110 described herein. In some embodiments, ground effect wing flap 154 may be configured to be raised, lowered, extended, and/or retracted to increase or decrease pressure and/or change the location of a center of pressure of ground effect wing 152. In some embodiments, ground effect wing 152 and ground effect wing flap 154 may be configured to form a dynamic seal with sponsons 102, 104. In some embodiments, the dynamic seal may be configured to allow pitch and heave moments of sponsons 102, 104 and/or body 106, thereby maintaining the pressure underneath ground effect wing 152. In some embodiments, the dynamic seal may be configured to generate lift for sponsons 102, 104 and/or body 106.

In some embodiments, a rear portion of ground effect wing 152 may have a reverse delta or trapezoidal planform. In some embodiments, the sides and/or endplates of ground effect wing 152 may be tapered inwardly towards the aft of ground effect craft 150. In some embodiments, the sides and/or endplates near the rear of ground effect wing 152 may be sloped inwardly towards the upper surface of ground effect wing 152.

In some embodiments, ground effect wing flap 154 may have a reverse delta or trapezoidal planform. In some embodiments, the sides and/or endplates of ground effect wing flap 154 may be tapered inwardly towards the aft of ground effect craft 150. In some embodiments, the sides and/or endplates of ground effect wing flap 154 may be sloped inwardly towards the upper surface of ground effect wing flap 154.

Ground effect craft 150 may be configured to create an air cushion underneath ground effect wing 152 during a transition between a stationary state and a moving state. In some embodiments, ground effect craft 150 may include fingers that may be inflatable (not shown) along leading edges 131, 132 of ground effect wing 152. In some embodiments, the fingers may retract after ground effect craft 150 transitions from a stopped state to a moving state to increase lift generating by ground effect wing 152. In some embodiments, ground effect craft 150 may include fans to generate pressure beneath ground effect wing 152 configured to lift ground effect craft 150.

FIG. 2 illustrates an exemplary embodiment of a ground effect craft 200. Certain features of ground effect craft 200 are not shown or discussed in these examples where such features may be similar to those discussed for other embodiments.

FIG. 2 shows an exemplary ground effect craft 200. In some embodiments, ground effect craft 200 may include a first sponson 102, a second sponson 104, a body 106, a first fore ground effect wing 108, a second fore ground effect wing 109, and an aft ground effect wing 210. Fore ground effect wings 108, 109 may include forward ground effect flap 110. Aft ground effect wing 210 may include aft ground effect flap 212. In some embodiments, aft ground effect wing 210 may be connected to sponsons 102, 104. In some embodiments, aft ground effect wing 210 may be positioned aft of sponsons 102, 104. In some embodiments, aft ground effect wing 210 may be coupled to one or more sponsons, such as sponsons 102, 104. In some embodiments, aft ground effect wing 210 may be connected to an aft control link (not shown), such as, for example, aft control link 138. In some embodiments, first sponson 102 may include first propulsion system 216 and second sponson 104 may include second propulsion system 218 or other propulsion systems discussed herein.

In some embodiments, aft ground effect flap 212 may have features similar to aft ground effect flap 154. In some embodiments, an angle of ground effect flaps 212, 214 may be adjusted for varying desired lift, obstacle clearance, docking, weight distribution, or weight transfer.

In some embodiments, aft ground effect wing 210 may have a reverse delta or trapezoidal planform. In some embodiments, the sides and/or endplates of aft ground effect wing 210 may be tapered inwardly towards the aft of ground effect craft 200. In some embodiments, the sides and/or endplates of aft ground effect wing 210 may be sloped inwardly towards the upper surface of aft ground effect wing 210.

In some embodiments, aft ground effect wing flap 212 may have a reverse delta or trapezoidal planform. In some embodiments, the sides and/or endplates of aft ground effect wing flap 212 may be tapered inwardly towards the aft of ground effect craft 200. In some embodiments, the sides and/or endplates of aft ground effect wing flap 212 may be sloped inwardly towards the upper surface of aft ground effect wing flap 212.

Aft ground effect wing 210 may be positioned substantially aft of fore ground effect wing 108, 109. Aft ground effect wing 210 may, for example, generate lift aft of the longitudinal center of gravity of sponsons 102,104 thereby creating a stabilizing downward pitching moment on the plurality of sponsons. For example, as the center of pressure of aft ground effect wing 210 may also be aft of both the longitudinal center of gravity and the center of pressure of the fore ground effect wings 108, 109 such that the downward pitching moment induced by aft ground effect wing 210 on the sponsons assists in stabilizing the ground effect craft. By creating a downward pitching moment on sponson 102, 104, aft ground effect wing 210 mitigates instability of ground effect craft caused when sponsons 102, 104 move in pitch and/or heave, such as when a force is imparted from a planetary surface. In some embodiments, aft ground effect wing 210 may be configured to generate a stabilizing moment on sponsons 102, 104 when an angle of attack of body 106 and/or pitch of sponsons 102/104 is increased.

Figure 3A:
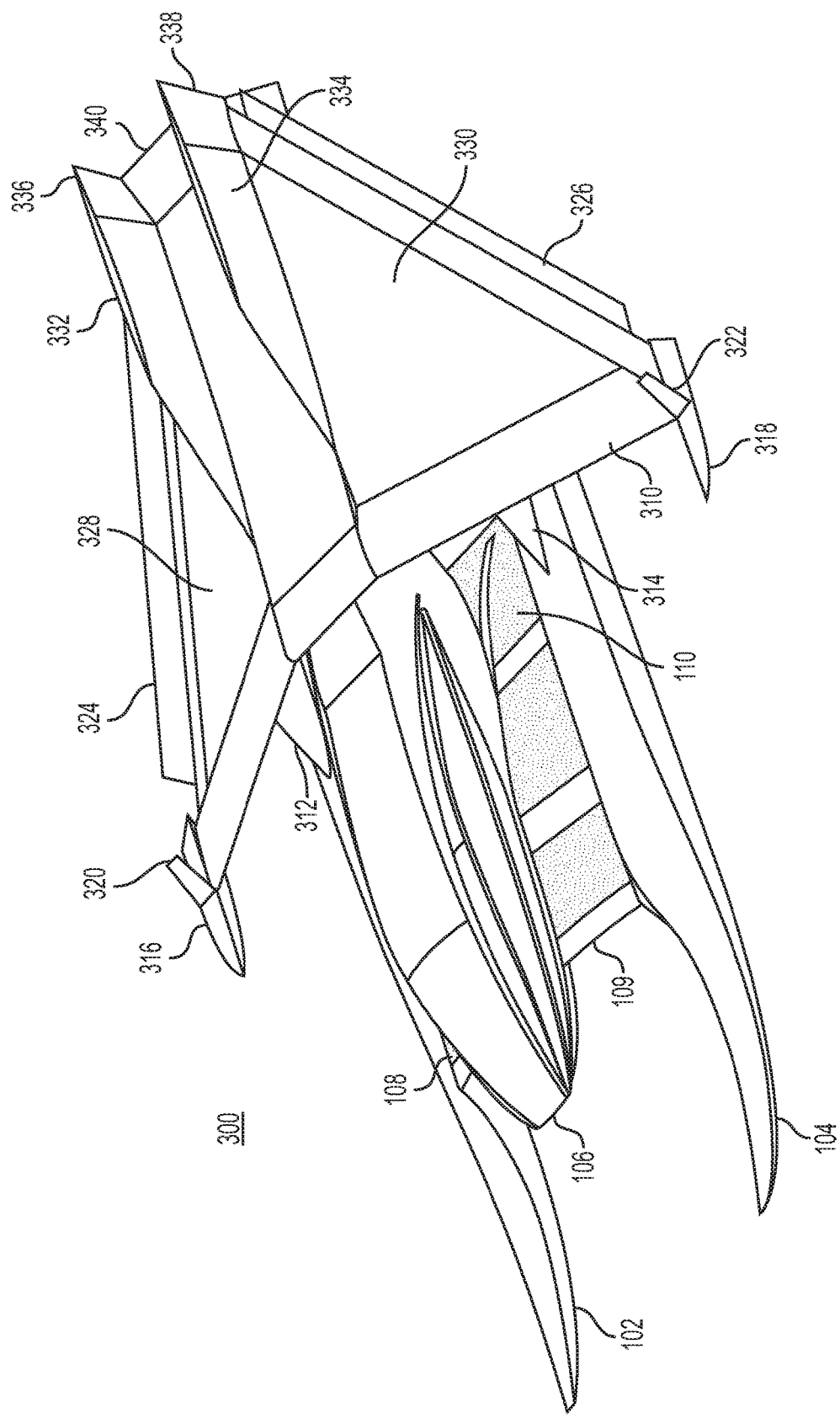
FIG. 3A-3B illustrate another exemplary embodiment of a ground effect craft.
Figure 3B:
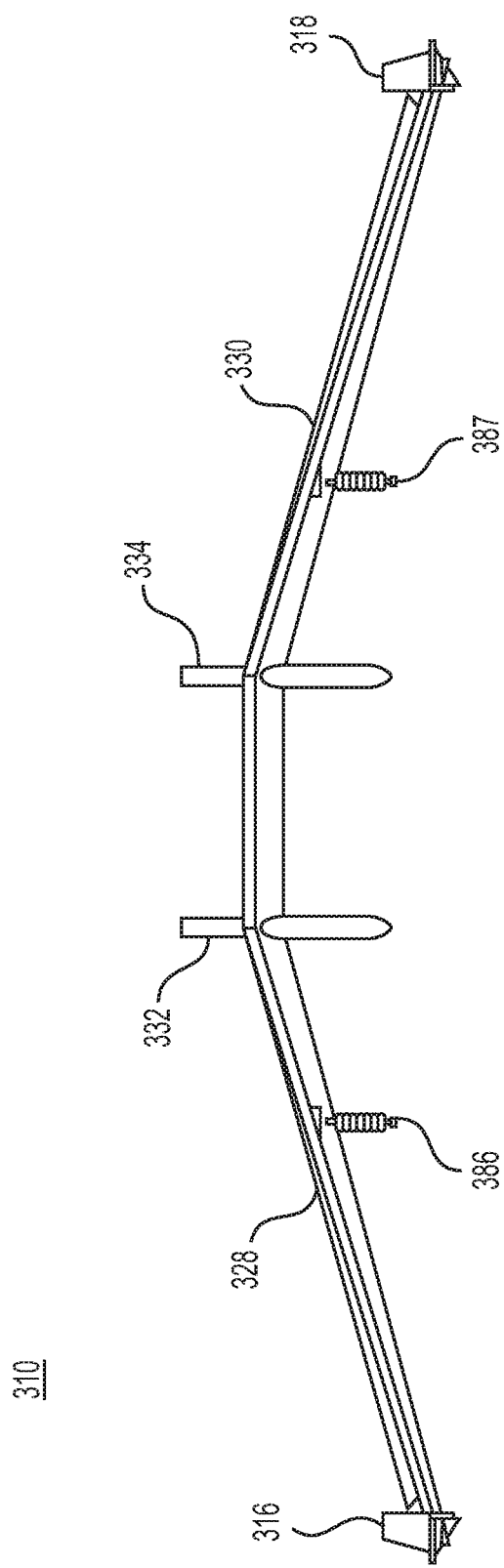

FIGS. 3A-3B illustrate exemplary embodiments of a ground effect craft 300. Certain features of ground effect craft 300 are not shown or discussed in these examples where such features may be similar to those discussed for other embodiments.

FIG. 3A shows an example embodiment of a ground effect craft 300. Ground effect craft 300 may include a stabilizing wing 310, which may be configured to provide stability and lift. In some embodiments, ground effect craft 300 may include a first sponson 102, a second sponson 104, a body 106, a one or more ground effect wings 108, 109, and stabilizing wing 310. In some embodiments, ground effect craft 300 may include an aft ground effect wing 210 (not shown).

In some embodiments, the center of pressure of stabilizing wing 310 may be aft of the longitudinal center of gravity of body 106. In some embodiments, stabilizing wing 310 may operate to counteract an unstable moment of ground effect craft 300. For example, stabilizing wing 310 may be configured to provide lift to an aft portion of body 106. In some embodiments, stabilizing wing 310 may be connected to body 106. In some embodiments, stabilizing wing 310 may be connected to one or more of sponsons 102, 104. In some embodiments, stabilizing wing 310 may operate to counteract forces, such as pitching moments, on body 106 by being positioned aft and/or above body 106. In some embodiments, stabilizing wing 310 may operate to counteract forces on body 106 by operating at a distance sufficient to increase a torque of a control surface of stabilizing wing 310 on body 106 and/or ground effect wings 108, 109. In some embodiments, stabilizing wing 310 may include a surface area greater than ground effect wings 108, 109, thereby allowing a control surface of stabilizing wing 310 to generate a moment greater than a moment of ground effect wings 108, 109. In some embodiments, stabilizing wing 310 may be configured to generate a stabilizing moment on body 106 and/or ground effect wings 108, 109 when an angle of attack of body 106 and/or ground effect wings 108, 109 is increased.

In some embodiments, the at least partial isolation pitch and/or heave of sponsons 102, 104 from each other and from body 106 mitigates a hydrodynamically-induced pitching moment on ground effect wings 108, 109 when sponsons 102, 104 pitch and/or heave. By mitigating the hydrodynamically-induced pitching of ground effect wings 108, 109, the at least partial isolation also mitigates or prevents blanketing of stabilizing wing 310 that may be caused by hydrodynamically-induced pitching of ground effect wings 108, 109. Mitigating or preventing blanketing of stabilizing wing 310 may reduce instability of the ground effect craft.

In some embodiments, stabilizing wing 310 may include a first wing 328 and a second wing 330. In some embodiments, wings 328, 330 may include roll and pitch stabilizing control surfaces 324, 326. In some embodiments, vertical surfaces 332, 334 may include yaw stabilizing control surfaces 336, 338. In some embodiments, stabilizing wing 310 may include a vertical surface that includes a first vertical surface 332 and a second vertical surface 334. Stabilizing wing 310 may include wingtip bodies 316, 318. Wingtip bodies 316, 318 may include wing tip spoilers 320, 322. In some embodiments, vertical control surfaces 332, 334 may be configured to operate with wingtip spoilers 320, 322. In some embodiments, stabilizing wing 310 may include one or more elevator control surfaces 340. Elevator control surfaces 340 may be configured to act with control surfaces 324, 326.

In some embodiments, control surfaces 320, 322, 324, 326, 336, 338, and 340 may operate to provide stability attitude and directional control for ground effect craft 300. For example, one or more control surfaces 320, 322, 324, 326, 336, 338, and 340 may operate in conjunction to facilitate a change of direction or stabilize ground effect craft 300. In some embodiments, the horizontal center of stabilizing wing 310 may be positioned substantially higher than ground effect wings 108, 109. In some embodiments, stabilizing wing 310 may generate lift for a rear portion of body 106. In some embodiments, stabilizing wing 310 may improve stability of ground effect craft 300 by lifting the rear portion of body 106 and/or by operating to move control surfaces 320, 322, 324, 326, 336, 338, and 340 as various forces, such as an impact force from a planetary surface, affect the motion of sponsons 102, 104 and/or body 106.

In some embodiments, wings 328, 330 may include an anhedral wing. In some embodiments, wings 328, 330 may include a dihedral, partially dihedral, partially anhedral, gull-wing, or inverted gull-wing. In some embodiments, stabilizing wing 310 may have a reverse delta configuration. In some embodiments, stabilizing wing 310 may comprise one or more transverse wings. It is also contemplated that propulsion systems may include at least one aerodynamic motor and/or aerodynamic propulsion system that may include, for example, a propeller, ramjet, and/or force-generating device connected to stabilizing wing 310.

In some embodiments, wings 328, 330 may comprise a solid surface. In some embodiments, wings 328, 330 may comprise a semi-flexible, flexible, semi-elastic, or flexible elastic or non-elastic membrane surface.

Sponsons 102, 104 of ground effect craft 300 may be configured to support weight of stabilizing wing 310 and partial weight of the body 106 when ground effect craft 300, such as when ground effect craft 300 is substantially stationary. In some embodiments, sponsons 102, 104 may include structural vertical stabilizers 312, 314. that may support the weight of stabilizing wing 310 and/or partial weight rear portion of body 106. In some embodiments, structural vertical stabilizers 312, 314 may include a dampening mechanism 386, 387 of FIG. 3B, such as one or more springs, shock absorbers, and/or dampeners, to absorb the impact energy when stabilizing wing 310 makes contact with structural vertical stabilizers 312, 314.

FIG. 3B illustrates a cross-section of an exemplary stabilizing wing 310. Some embodiments of the ground effect craft may include an anhedral wing configured to counter a lack of aerodynamic roll with sideslip. Stabilizing wing 310 may, for example, include an anhedral wing in some embodiments.

As discussed above, stabilizing wing 310 may be connected to a body and may move relative to one or more sponsons. In some embodiments, when stationary or at low velocities the stabilizing wing 310 of ground effect craft 300 may rest on the vertical stabilizer structures (not shown) of one or more sponsons, such as sponsons 102, 104. In some embodiments, shocks 386, 387 may be integrated into stabilizing wing 310 or the vertical stabilizer structures of the sponsons. In some embodiments, shocks 386, 387 may absorb forces imparted from sponson 102, 104 to stabilizing wing 310 and provide support for the weight of stabilizing wing 310 when the ground effect craft is not in motion.

In some embodiments, at least one wing surface of a ground effect craft may comprise solar cells or panels. Such solar cells or panels may be configured to power electric motors or charge batteries of the ground effect craft.

Figure 4A:
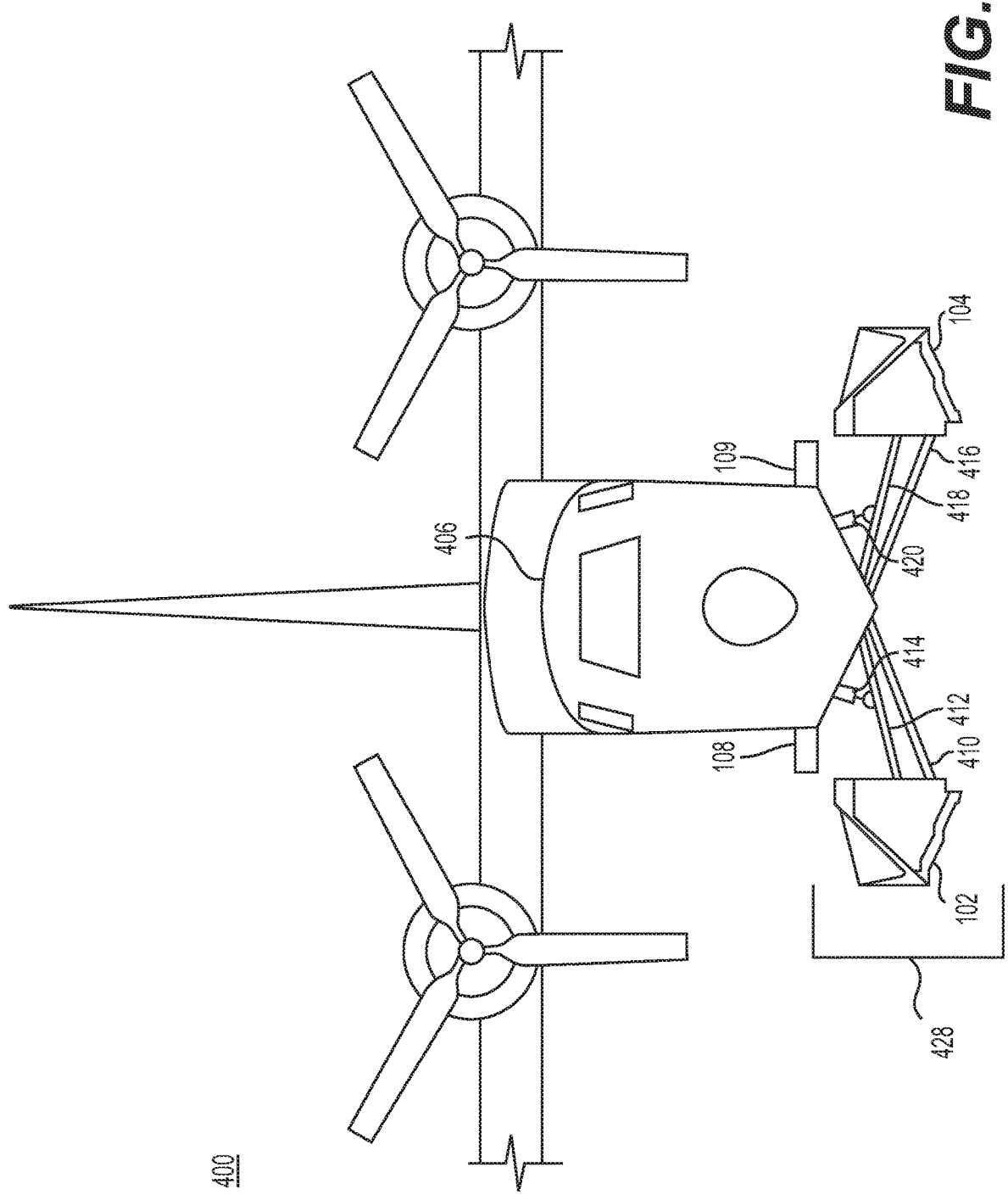
FIGS. 4A-4B illustrates another exemplary embodiment of a ground effect craft.
Figure 4B:
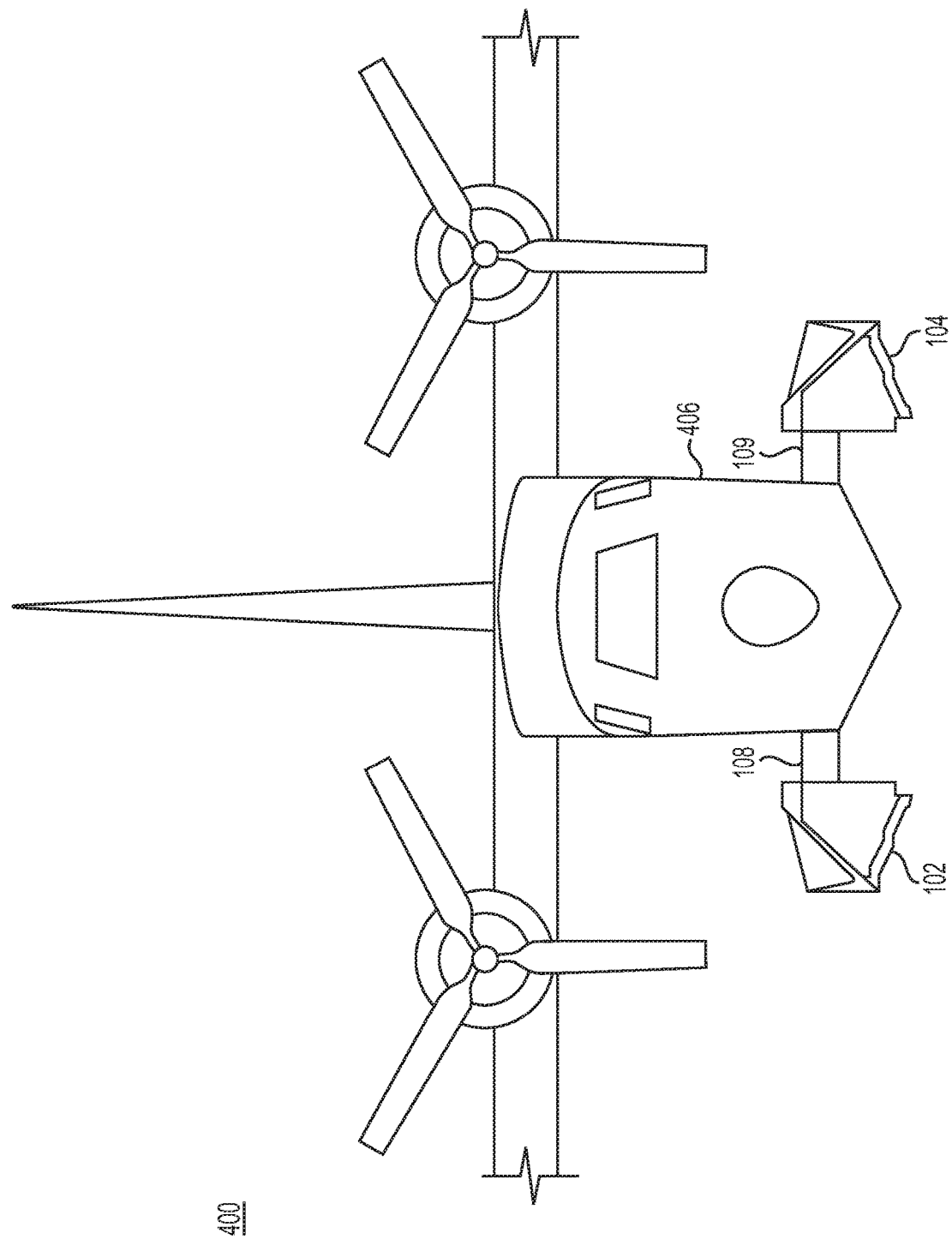

FIGS. 4A and 4B illustrate exemplary embodiments and configurations of an aircraft 400. Some features of aircraft 400 are not shown or discussed in these examples where such features may be similar to those discussed for other embodiments.

Aircraft 400 may include a first sponson 102 and a second sponson 104 that move relative to body 406 and each other. Body 406 may include ground effect wings 108, 109. For example, first sponson 102 may encounter a surface causing first sponson 102 to pitch and/or heave relative to body 406 and second sponson 104.

Ground effect wings 108, 109 may generate lift for aircraft 400. In some embodiments, ground effect wings 108, 109 may be substantially sealed with sponsons 102, 104, respectively, to form an air cushion underneath ground effect wings 108, 109, such as the sealing methods described herein In some embodiments, ground effect wings 108, 109 may be configured to generate lift as aircraft 400 transitions between a takeoff mode and a flying mode. In some embodiments, the takeoff mode may be a configuration of aircraft 400 while stopped, taxiing, or increasing speed to generate enough lift to enter a flying mode on a planetary surface, such as snow, ice, water, or land. In some embodiments, sponsons 102, 104 may be configured to retract or deflect on impact, thereby absorbing a landing impact when aircraft 400 transitions between the flying mode and a landing mode.

As illustrated in FIG. 4A, an exemplary fore control system 428 may include first and second lower control links 410, 416, first and second upper control links 412, 418, and/or first and second actuators 414, 420. An aft control system, not shown, may dynamically connect first sponson 102 to second sponson 104. A variety of control systems 428 are contemplated to allow movement of one or more sponsons relative to a body of a ground effect craft, such as a control system similar to fore control system 128 an/or aft control system 130.

In some embodiments, first and second actuators 414, 420 may be configured to support the resting mass of aircraft 400, absorb an impact from a planetary surface, and/or extend or retract sponsons 102, 104, for example, on takeoff and landing. In some embodiments, first and second actuators 414, 420 may be configured to permit deflection of sponsons 102, 104 in response to a strong force applied to sponsons 102, 104, such as striking an obstacle or striking a wave or other perturbation in a planetary surface.

FIG. 4B illustrates exemplary embodiment of aircraft 400 during flight in which sponsons 102, 104 are retracted toward body 406 to improve the aerodynamic profile, such as by reducing drag. In some embodiments, sponsons 102, 104 may retract near, within, or substantially within body 406. In some embodiments, actuators 414, 420 may be configured to retract or extend sponsons 102, 104. In some embodiments, ground effect wings 108, 109 may retract near, within, or substantially within body 406. Aircraft 400 may also include flap, linkage, seal and actuator embodiments contemplated herein.

Figure 5A:
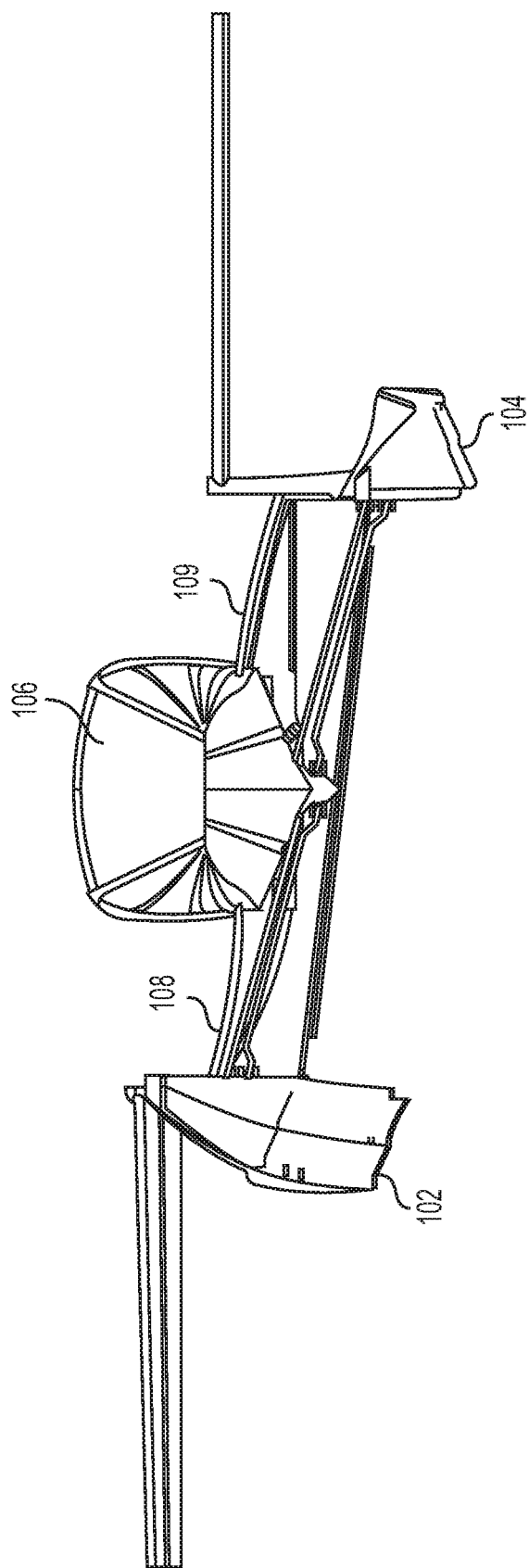
FIGS. 5A-5B illustrate another exemplary arrangements of a ground effect craft.
Figure 5B:
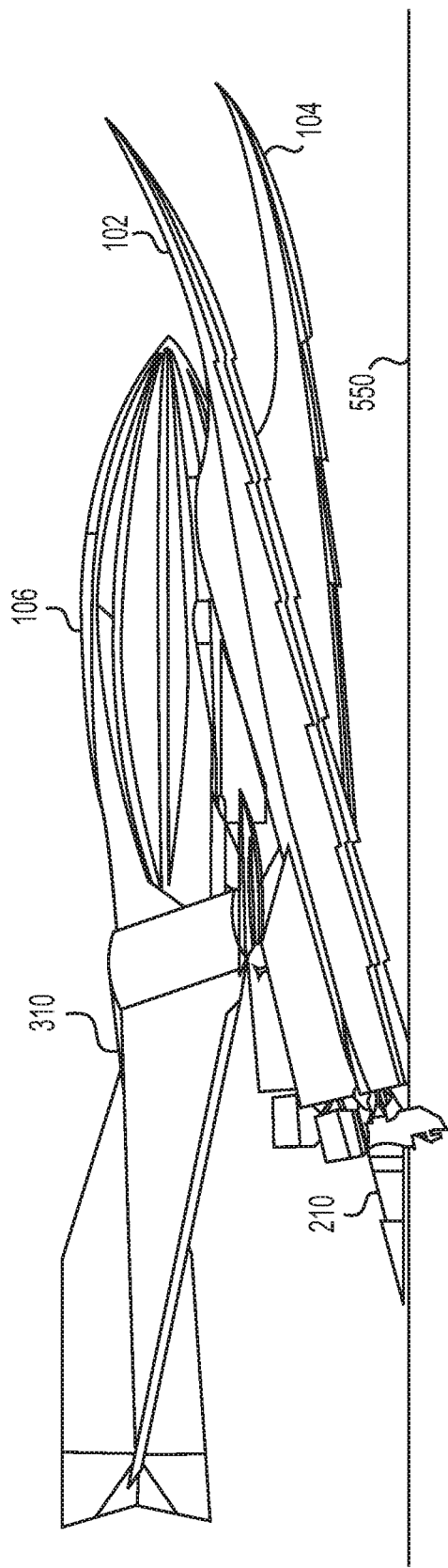

FIGS. 5A and 5B illustrate exemplary relative motions of sponsons 102, 104 of exemplary ground effect craft. Although discussed relative to sponsons 102, 104, it is understood that this discussion applies to sponsons of the various ground effect craft described herein, or otherwise encompassed by the principles disclosed herein. Some features of the exemplary ground effect craft are not shown or discussed in these examples where such features may be similar to those discussed for other embodiments.

FIG. 5A illustrates an example embodiments and principles of at least partial isolation of body 106 from pitching, heaving, or other movement moments of sponsons 102, 104. FIG. 5A also illustrates the effect of an obstacle, perturbation of a planetary surface, or other force causing sponson 102 to pitch and heave upward relative to body 106 and second sponson 104. FIG. 5A illustrates sponson 104 heaved downward relative to body 106 and first sponson 102.

It is understood that sponsons 102, 104 may not be completely isolated in movement from body 106 and each other because of the connection between them; however, the dynamic coupling and movement isolation is sufficient to avoid transferring a substantial amount of movement between sponson 102, sponson 104, and body 106, thereby stabilizing (and reducing instability) of the ground effect craft when one or both of sponsons 102, 104 move in pitch, heave, and/or other motions imparted by forces, such as impact with a planetary surface.

As discussed herein and further shown in FIG. 5A, first and second sponsons 102, 104 may be configured to move relative to body 106 without substantially transferring the movement to body 106 or each other. In some embodiments, ground effect wings 108, 109 may be configured to flex when sponson 102 and/or 104 move relative to body 106 and make contact with ground effect wings 108, 109. In such embodiments, ground effect wings 108, 109 may be configured to flex with one or more of first and second main spars 134, 135, as result of movement of sponsons 102, 104 which makes contact with ground effect wings 108, 109.

FIG. 5B shows an exemplary side view of sponsons 102, 104 of an exemplary ground effect craft where sponsons 102, 104 move in pitch in response to, for example, a perturbation or obstacle (not shown) of a planetary surface 550. FIG. 5B shows first sponson 102 pitching relative to body 106. FIG. 5B also shows second sponson 104 moving in pitch and heave relative to body 106. Sponson 102 may rotate such that it pitches upwards or downward relative to body 106 and sponson 104. The relatively independent pitch and heave movement of sponson 102 relative to sponson 104 (not shown) and body 106 is facilitated by control a control system, such as, for example, control systems 128 and/or 130 (not shown) dynamically coupling sponsons 102, 104 to body 106, and/or sponson 102 to sponson 104. Such dynamic coupling permits pitch and/or heave of one sponson while increasing stability or mitigating or eliminating instability FIG. 5B also shows the movement of aft ground effect wing 210 relative to body 106. In some embodiments, aft ground effect wing 210 may be configured to move relative to body 106 and sponsons 102, 104, such as when contacting planetary surface 550, thereby reducing craft failure.

Figure 6A:
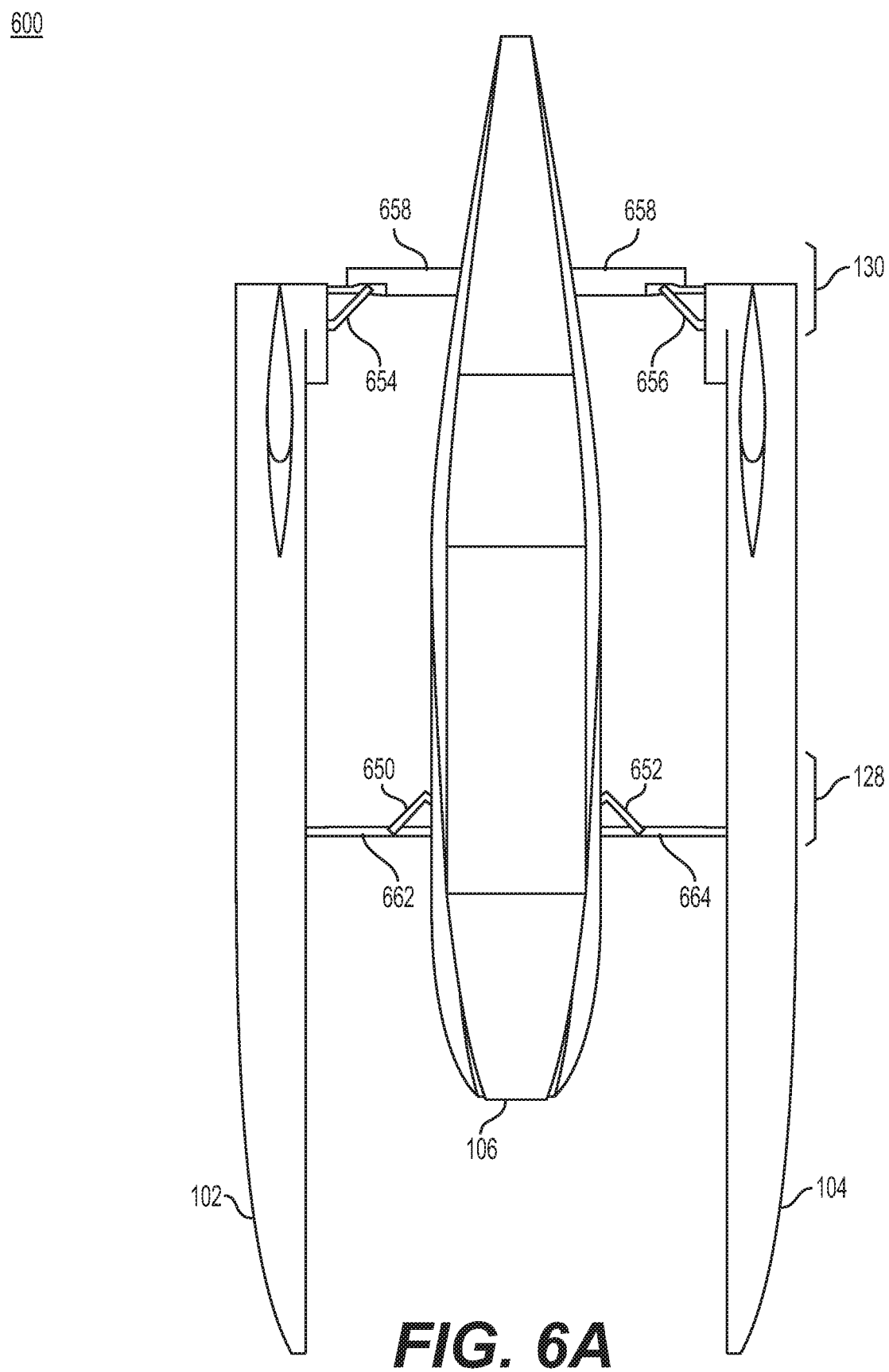
FIGS. 6A-6B illustrates exemplary embodiments of control systems of a ground effect craft.
Figure 6B:
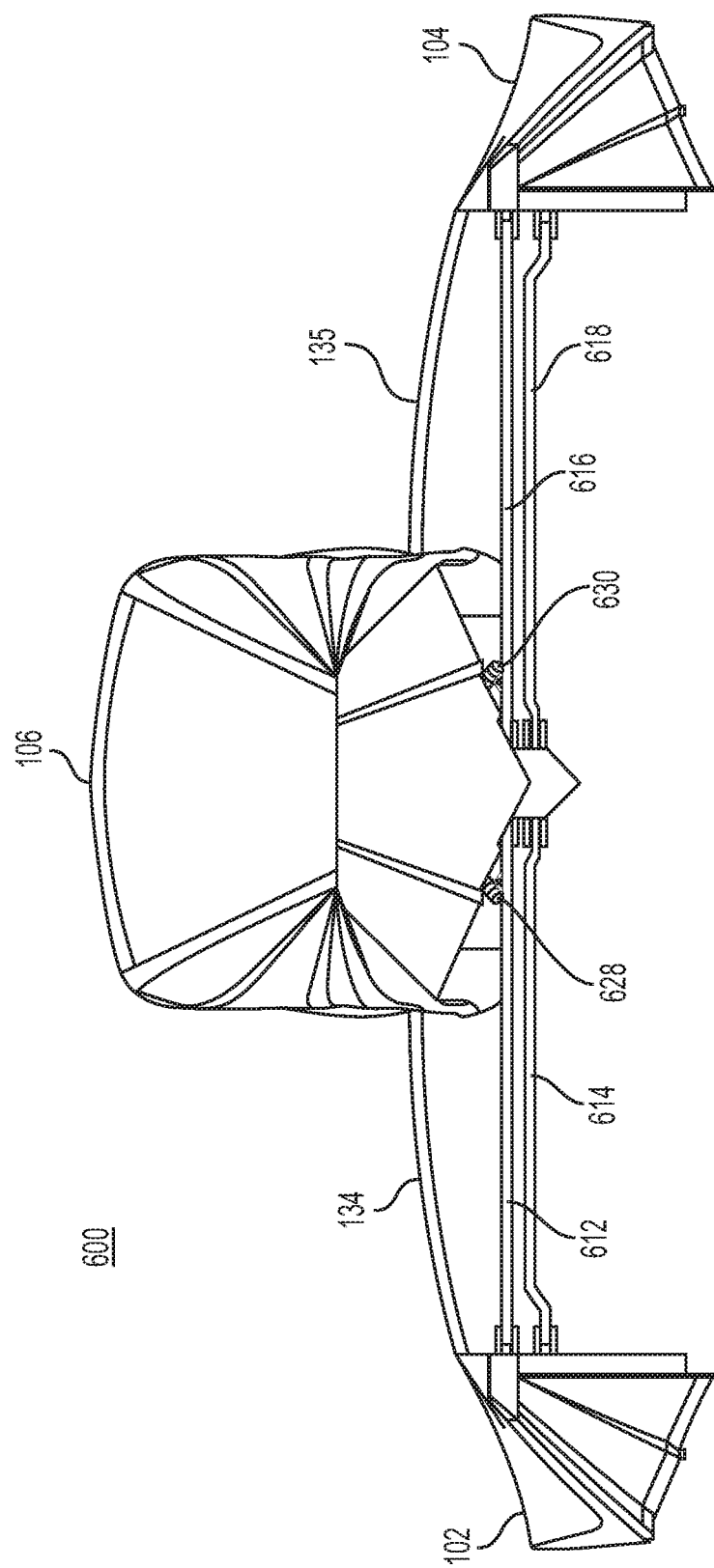

FIGS. 6A and 6B illustrate exemplary embodiments of ground effect craft 600. Certain features of ground effect craft 600 are not shown or discussed in these examples where such features may be similar to those discussed for other embodiments.

Ground effect craft 600 may be configured to allow at least partially isolated movement of sponsons 102, 104 relative to body 106 and each other in a way that does not substantially transfer the motion of one or both of sponsons 102, 104 to body 106 or the other sponson. As shown in FIG. 6A, ground effect craft 600 may include fore control system 128 and aft control system 130. In some embodiments, fore control system 128 may include a first fore control link 662 dynamically connecting first sponson 102 to body 106 and a second fore control link 664 dynamically connecting second sponson 104 to body 106. In some embodiments, aft control system 130 may include an aft control link 658 dynamically connecting first sponson 102 to second sponson 104. First fore control link 662 may also include first fore supporting member 650 coupled to body 106. Second fore control link 664 may include second fore supporting member 652 coupled to body 106. As shown in FIG. 6A, aft control link 658 may include first aft supporting member 654 and second aft supporting member 656 connected to sponsons 102, 104. First and second fore supporting members 650, 652 and first and second aft supporting members 654, 656 may be configured to provide yaw control by coupling of the body 106 with sponsons 102,104 when acting with control links 658, 662. In some embodiments, fore supporting members 650, 652 and fore control links 662, 664 are positioned in substantially the same plane with each other and with actuators 628, 630 (shown in FIG. 6B). In some embodiments, supporting members 650, 652, 654, 656 may be positioned in substantially the same plane as control links 662, 664, 658. It is also contemplated that one or more supporting members 650, 652, 654, 656 may be at a plane different from control links 658, 662, 664. In some embodiments, supporting members 654, 656 and control link 658 are in substantially the same plane as each other and with aft flap actuators (such as actuators 741, 742 of FIG. 7C). It is further contemplated that supporting members 650, 652, 654, 656 may connect to control links 662, 664, 658 anywhere along the length of the control link. In some embodiments, control links 658, 662, 664, and supporting members 650, 652, 654, 646 may be rigid, semi-rigid, flexible, or semi-flexible.

In some embodiments, aft control link 658 is configured to connect first sponson 102 and second sponson 104. Aft control link 658 may substantially span the distance between first sponson 102 and second sponson 104. Aft control link 658 may be dynamically connected to first sponson 102 and second sponson 104 via a plurality of ball joints. At least one ball joint in the plurality of ball joints may allow movement of first sponson 102 relative to second sponson 104. Although it is contemplated that ball joints may be used in this example, other methods of dynamically connecting aft control link 658 to first and second sponsons 102, 104 are known to those of skill in the art and contemplated herein, and may be use in addition to or in the alternative of ball joints. Such connections include, but are not limiting to hinges, pivots, joints (such as ball joints), springs, and/or dampeners.

In some embodiments, aft control link 658 may include a flexible or semi-flexible beam that is fixedly connected to first and second sponson 102, 104, such that the flexibility of aft control link 658 permits sponsons 102, 104 to move relative to each other without substantially transferring motion from one sponson to the other. In some embodiments, aft control link 658 may include a rigid or semi-rigid beam. In some embodiments, control link 658 may include a plurality of links so as to collectively act as a parallelogram with sponsons 102, 104. In some embodiments, a single fore link or spar connection from the body 106 to sponsons 102, 104 is contemplated.

FIG. 6B illustrates aspects of ground effect craft 600. FIG. 6B shows a non-limiting embodiment of a fore control system, such as fore control system 128. Ground effect craft 600 may include a first main spar 134 dynamically connecting body 106 to first sponson 102 and a second main spar 135 dynamically connecting body 106 to second sponson 104 to allow deflecting movement of sponsons 102, 104 relative to body 106 and each other. Main spars 134, 135 may allow movement of first sponson 102 and second sponson 104 relative to body 106 and each other. Main spars 134, 135 may be configured to dampen or absorb forces, such as created by pitch and/or heave, imparted on sponsons 102, 104 so that the force transmitted to body 106 is reduced and/or relatively isolated by main spars 134, 135 from body 106. In some embodiments, body 106 may be at least partially isolated in heave and/or pitch from sponsons 102, 104 by flexing of spars 134, 135. In some embodiments, body 106 may be at least partially decoupled in pitch from sponsons 102, 104 by one or more hinges, bearings, pivots, or joints (such as a ball joint) connecting spars 134, 135 to sponsons 102,104. In some embodiments, one or more hinges, bearings, pivots, or joints (such as a ball joint) may connect to an end plate (not shown) fixed to main spars 134, 135 to sponsons 102, 104.

In some embodiments, main spars 134, 135 may be configured to contact with one or more sponsons 102, 104 to support the mass of body 106 at rest or until aerodynamic lift is sufficient to support body 106. In some embodiments, such support may be provided by end plates (not shown) fixed to main spars 134, 135. In some embodiments, main spars 134, 135 may be configured to increase load bearing strength, for example, by having a substantially concave shape facing downward of ground effect craft 600.

In some embodiments, a fore control system may include a rigid frame and a dampening system. In such an embodiment, the rigid frame may span or substantially span the distance between first sponson 102 and second sponson 104. The rigid frame may be connected to first sponson 102 and second sponson 104 by a plurality of dampeners. The plurality of dampeners may reduce and/or eliminate the force transmitted from, for example, first sponson 102 to body 106. The plurality of dampeners may include one or more of a plurality of springs, pneumatic cylinders, and/or dynamically or statically pressurized air bags. The plurality of dampeners may facilitate movement of first sponson 102 relative to body 106 and second sponson 104. The plurality of springs may allow movement of second sponson 104 relative to body 106 and first sponson 102. In some embodiments, the dampeners may be mounted substantially near body 106. In some embodiments, the dampeners may be mounted substantially near sponsons 102, 104.

Control links 612, 614, 616, and 618 may be configured to allow first sponson 102 and/or second sponson 104 to travel relative to body 106. Control links 612, 614, 616, 618 may be rigid or flexible. In some embodiments, control links 612, 614, 616, and 618 may be of a length such that the travel of sponson 102, 104 relative to body 106 is large for a small angle of deflection from one position of control links 612, 614, 616, and 618 to another position. In some embodiments, main spars 134, 135 may be configured to rest on top control links 612, 616.

Control links 612, 614, 616, 618 and supporting links 650, 652 may be dynamically connected to first sponson 102, second sponson 104, and/or body 106 via one or more movable connections, such as, for example, one or more hinges, bearings, pivots, or joints (such as a ball joint). At least one connection in the plurality of movable connections may allow movement of sponsons 102, 104 relative to body 106. It is contemplated that other movable connections may be used to dynamically connect control links 612, 614, 616, 618 and supporting links 650, 652 to first and second sponsons 102, 104.

Ground effect craft 600 may include first actuator 628 and second actuator 630. In some embodiments, first and second actuators 628, 630 may be connected to top control links 612, 616. In some embodiments, first and second actuators 628, 630 may be connected to bottom control links 614, 618. In some embodiments, first and second actuators 628, 630 may be configured to move body 106 relative to top control links 612, 616. In some embodiments, first and second actuators 628, 630 may be configured to move body 106 relative to first and second sponsons 102, 104 to raise body 106 above a planetary surface. In some embodiments, first and second actuators 628, 630 may be configured to increase the stiffness of one or more control links such that surface clearance, dampening, and/or springing rates of such links may be increased to match passenger and/or cargo loading of ground effect craft 600.

FIGS. 7A-7D illustrate exemplary embodiments of aerodynamic surfaces of a ground effect craft, such as described herein. Certain features of the ground effect craft are not shown or discussed in these examples where such features may be similar to those discussed for other embodiments, such as, for example, those discussed herein regarding ground effect wings, control systems, and flaps.

Figure 7A:
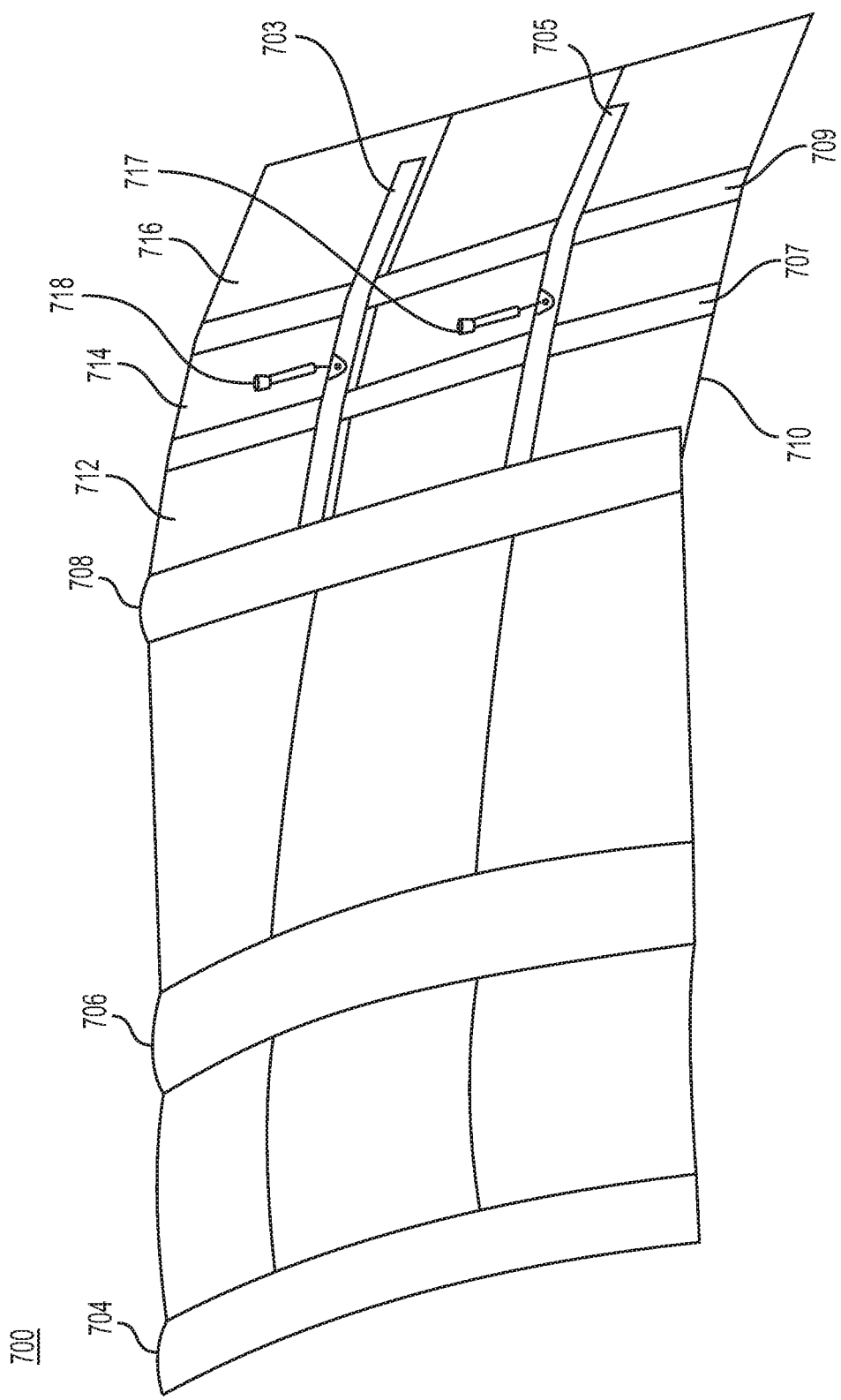

FIG. 7A illustrates exemplary ground effect wing 700. In some embodiments, ground effect wing 700 may include a leading edge spar 704 and/or a main spar 706. In some embodiments, main spar 706 may include portions of fore control system 128. Alternatively, main spar 706 may be positioned above or below fore control system 128. In some embodiments, ground effect wing 700 may include a trailing edge spar 708. In some embodiments, ground effect wing 700 may include ground effect flap 710. In some embodiments, ground effect flap 710 may be extendable from a position proximate trailing edge spar 708.

Although a single ground effect wing 700 is shown in FIG. 7A, it is contemplated that a ground effect wing me be positioned on either side of body 106 such as ground effect wings 108, 109 in FIG. 1A. In such cases, a single ground effect flap 710 may be coupled to both ground effect wings, or, in some embodiments, each ground effect wing may include a separate ground effect flap 710.

In some embodiments, ground effect flap 710 may include longitudinal battens 703, 705, and transverse battens 707, 709.

In some embodiments, ground effect flap 710 may be composed of a single panel. In some embodiments, ground effect flap 710 may be composed of a plurality of overlapping panels, such as panels 712, 714, 716. In some embodiments, overlapping panels may be configured to permit localized deflection when one or more panels contacts a planetary surface and the other panels may not. In some embodiments, this may isolate a local deflection and prevent a loss of pressure of an air cushion pressure. In some embodiments, overlapping panels may be configured to increase resistance of ground effect flap 710 as it deflects upwards.

In some embodiments, ground effect wing 700 may include ground effect flap 710 configured to rotate around a connection to increase lift and/or change the center of pitch of ground effect wing 700. For example, ground effect wing 700 may include a first flap actuator 718. Ground effect wing 700 may also include a second flap actuator 717. In some embodiments, ground effect wing flap 710 may include one or more longitudinal battens, such as a first longitudinal batten 703 and a second longitudinal batten 705. In some embodiments, flap actuators 717, 718, may be configured to move against first and second battens 703, 705, respectively, to move ground effect flap 710. In some embodiments, flap actuators 717, 718 may include one or more electromechanical actuators, hydraulic actuators, or pneumatic actuators. In some embodiments, the wing flap 710 may be actuated by at least one pneumatically pressurized membrane lobe.

Figure 7B:
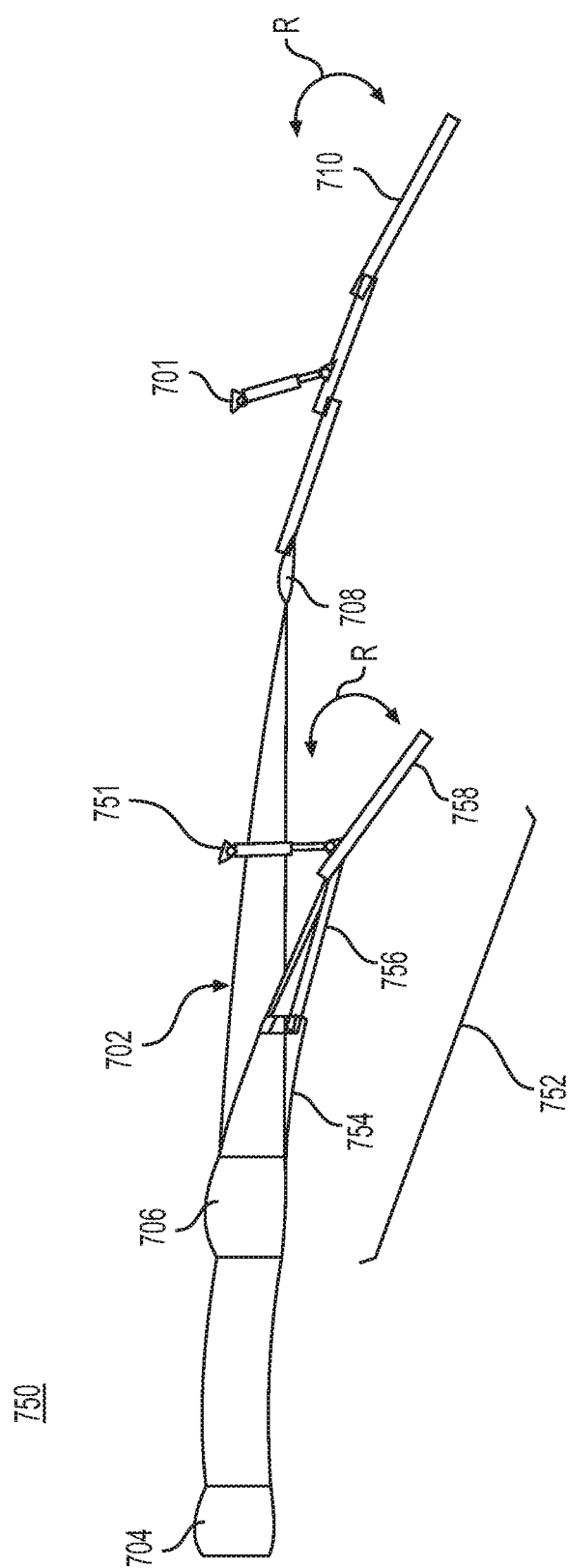

FIG. 7B illustrates an exemplary cross-section of an exemplary ground effect wing 750. Ground effect wing 750 may include a primary ground effect wing 702. In some embodiments, ground effect wing 750 may include a mid-flap 752. In some embodiments, mid-flap 752 may be configured to extend from ground effect wing 750 at a location between a leading edge and a trailing edge of ground effect wing 750. Mid-flap 752 may, in some embodiments, be configured to rotate about a connection (not shown) to ground effect wing 750 forward of aft spar 708. Mid-flap 752 may, in some embodiments, be configured to rotate about a connection to ground effect wing 750 at main spar 706. In some embodiments, mid-flap 752 may include a plurality of overlapping panels, such as overlapping panels 754, 756, 758, that may operate as described herein for overlapping panels 712, 714, 716 of ground effect flap 710.

In some embodiments mid-flap 752 may be configured to alter the position of the center of pressure of the ground effect craft wing 750. For example, at a slower speed, mid-flap 752 may operate to rotate downward and/or upward in the direction of rotation R, relative to ground effect wing 702 to move the center of pressure of the ground effect craft substantially forward and/or to control the pitch of the bow of body 106 relative to a planetary surface. At a faster speed, for example, mid-flap 752 may be configured to operate to rotate upward towards a ground effect wing to move the center of pressure substantially aft on a ground effect craft and/or to reduce drag, such as hydrodynamic drag. Ground effect wing 750 may, in some embodiments, include a middle flap actuator 751 configured to move mid-flap 752 relative to primary ground effect wing 702. In some embodiments, mid-flap 752 may be configured to operate in conjunction with ground effect wing flap 710 to change the center of pressure and/or pitch of ground effect wing 750. In some embodiments, the mid-flap actuator 751 may be controlled by automatic control systems including an autopilot which actuates relative to cushion pressure.

FIG. 7C illustrates an exemplary embodiment of aft ground effect wing 740. FIG. 7C shows a non-limiting example of aft ground effect wing 210. Aft ground effect wing 740 may include an aft ground effect wing flap 729. Aft ground effect wing flap 729 may rotate around a connection to aft ground effect wing 740. In some embodiments, aft ground effect wing 740 may include a plurality of overlapping panels, similar to the overlapping panels 712, 714, 716 of ground effect flap 710 to, for example, permit localized deflection when one or more panels contacts a planetary surface, when other panels do not. In some embodiments, aft ground effect wing 740 may include lateral and longitudinal battens. In some embodiments, aft ground effect wing 740 may include endplates to entrap air beneath aft ground effect wing 740 and/or to increase stiffness. In some embodiments, the endplates may be of a reverse delta planform to provide clearance from disturbances, such as marine drive propwash. For example, the endplates may be tapered inward towards the rear of aft ground effect wing 740 when viewed from above, creating a trapezoidal or substantially triangular profile of the aft ground effect wing. In some embodiments, the sides or endplates (not numbered) may be tapered inwardly towards the top surface of aft ground effect wing 740.

In some embodiments, such as shown in FIG. 7C, aft ground effect wing 722 may include a rotating member 748. In some embodiments, rotating member 748 may include aft control link, such as aft control link 658 as discussed in reference to FIG. 6A. In some embodiments, rotating member 748 may connect to actuators 741, 742 configured to rotate aft ground effect wing flap 729 upward or downward, such as in a direction illustrated by rotation R, to control a lift generated by aft ground effect wing 740. In some embodiments, rotating member 748 may connect to actuators 741, 742 configured to rotate aft ground effect wing 740 upward or downward, such as in a direction illustrated by rotation R, to control a lift generated by aft ground effect wing 740.

Figure 7D:
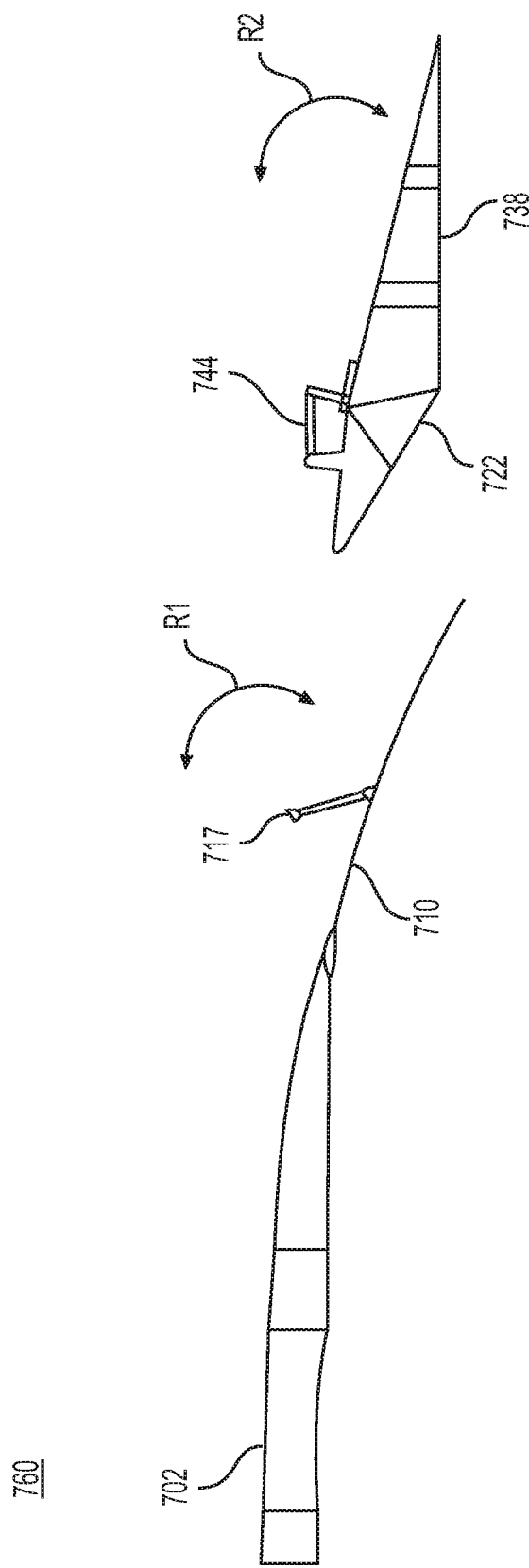

FIG. 7D illustrates an exemplary cross-section of an exemplary configuration 760 of fore ground effect wing 702 and aft ground effect wing 722. Aft ground effect wing 722 may include aft ground effect flap 738. In some embodiments, aft ground effect wing 722 may connect to one or more of actuators 741, 742, 744 configured to move aft ground effect wing flap 738 in a direction indicated by R2.

A ground effect craft may include a flap to increase control of the center of pressure of the ground effect wing 760. In some embodiments, at a slower speed, a fore ground effect flap 710 may operate to rotate, such as in a direction illustrated by rotation R1, away from the ground effect wing to move the center of pressure substantially forward on a ground effect craft and/or to raise the front of a body (not shown) relative to a planetary surface. In some embodiments, at a higher speed, fore ground effect flap 710 may operate to rotate towards a ground effect wing and away from the planetary surface to move the center of pressure aft on the ground effect craft and/or reduce hydrodynamic drag. In some embodiments, fore ground effect wing 702 may include a fore ground effect actuator 717 to move fore ground effect flap 710 around a connection to fore ground effect wing 702. In some embodiments, fore ground effect flap 710 may operate in conjunction with aft ground effect wing flap 738 to change the center of pitch of the ground effect craft, increase lift, and/or reduce drag. In some embodiments, fore ground effect flap 710 may be configured to be deflected by aerodynamic pressure and/or a mechanism, such as an actuating mechanism. In some embodiments, fore ground effect flap 710 may be configured to direct and/or restrict airflow towards aft ground effect wing 722. For example, the movement of fore ground effect wing 702, such as fore ground effect flap 710, may direct air towards aft ground effect wing 722 when, for example, a trailing edge of fore ground effect wing 702/flap 710 increases in height above the planetary surface. This increase in height may cause the air at fore ground effect wing 702 to pass to aft ground effect wing 722 and increase a lift of aft ground effect wing 722, thereby stabilizing the ground effect craft and/or generating lift. In some embodiments, deflection of the flap may be controlled by a flexural modulus or laminate modulus of the ground effect wing and/or ground effect flap 710.

In some embodiments, aft ground effect wing 722 may be configured to generate lift when at least a portion of fore ground effect wing 702, such as fore ground effect flap 710, moves to a height above a planetary surface. For example, as a portion of fore ground effect wing 702, such as a trailing edge of the wing or fore ground effect flap 710, lifts above the planetary surface airflow passes from fore ground effect wing 702 to aft ground effect wing 722, which generates lift at aft ground effect wing 722. The generation of lift at aft ground effect wing 722 causes sponsons 102, 104 to pitch downward, thereby mitigating destabilization and stabilizing sponsons 102, 104 and the ground effect craft.

In some embodiments, the portion of fore ground effect wing 702, such as fore ground effect wing flap 710, may be configured to move to a height above the planetary surface via a mechanism, flexure of the wing and/or flap, increased aerodynamically induced pressure, and/or an attitude of a ground effect craft. For example, in some embodiments, a modulus of the portion of fore ground effect wing 702 may be such that the portion of the wing automatically deflects when a certain air pressure is reached at fore ground effect wing 702. In some embodiments, the modulus is determined by a materials property of portion of the wing. In some embodiments, the materials property may result from a composite or laminate schedule determining the modulus. The modulus may be varied for different applications or specifications for a desired deflection point.

In some embodiments, flexure modulus or materials property may be designed to provide a predetermined resistance to deflection at varying aerodynamic pressures. In some embodiments, the modulus or property may be defined by a composite or laminate schedule. In some embodiments, the composite or laminate may be configured to have an increased stiffness at an interior portion of the wing or flap portion and a decreased stiffness at an edge portion of the wing or flap portion. In some embodiments, the laminate may be configured to have an increased stiffness at an edge portion of the wing or flap portion and a decreased stiffness at an interior portion of the wing or flap portion.

In some embodiments, the deflection of at least a portion of fore ground effect wing 702 may be controlled by a mechanism, such as an actuating mechanism, resistive mechanism, or reinforcing members. The mechanism may be configured to control the deflection at certain pressures to permit air to flow to aft ground effect wing 722. In some embodiments, a compression or dampening mechanism, or flexure resistance of the resistive mechanism or reinforcing members, may control the deflection of at least a portion of fore ground effect wing 702. In some embodiments, a pneumatic mechanism may be configured to compress as pressure on fore ground effect wing 702 increases, such that at a certain pressure the resistance of the compression or dampening mechanism is overcome, thereby deflecting the portion of fore ground effect wing 702 above the planetary surface and directing airflow to aft ground effect wing 722. Similarly, as pressure on fore ground effect wing 702 increases, the increased pressure may overcome a flexure resistance of the resistive or reinforcing members, causing them to flex and permit deflecting the portion of fore ground effect wing 702 above the planetary surface and directing airflow to aft ground effect wing 722. In some embodiments, a combination of modulus or materials properties of the wing and a mechanism may be used. Such embodiments may be configured to permit the portion of fore ground effect wing 702 to automatically direct airflow to aft ground effect wing 722, for example without an electronic control system. In some embodiments, the deflection may be controlled by an electronic control system.

In some embodiments, at least one of; flap 710, flap segments 712, 714, 716, mid-flap 752, mid-flap segments 754, 756, 758 and aft ground effect wing 722 may include a dynamic seal. In some embodiments, the dynamic seal may include one or more seals, such as, for example, discussed herein, to dynamically seal with sponsons 102, 104.

FIGS. 8A-8G illustrate exemplary embodiments of seals configurations between ground effect wing 806 and sponsons 802,804. Certain features of the ground effect craft herein are not shown or discussed in these examples where such features may be similar to those discussed for other embodiments. For example, in some embodiments, ground effect wing 806 may contain one or more of the grounds effect wing features discussed herein. In some embodiments, the seal configurations of ground effect wing 806 and sponsons 802 or 804, may be used to seal the various flap embodiments discussed herein. Ground effect wing 806 may be similar to the disclosure of ground effect wings 108, 109, or any other ground effect wing disclosed herein. The seal may be configured to allow for movement of sponsons 802, 804 relative to ground effect wing 108 and/or 109, thereby maintaining the seal to entrap air and generate lift when sponsons 802, 804 deflect relative to the ground effect wing. It is contemplated that sealing examples in FIGS. 8A-8G may be used in combination with one another or alone in various embodiments described herein. In some embodiments, the seal may include a preformed seal. In some embodiments, the seal may comprise Teflon, rubber, high density molecular plastic seal, and/or other suitable material.

Figure 8A:
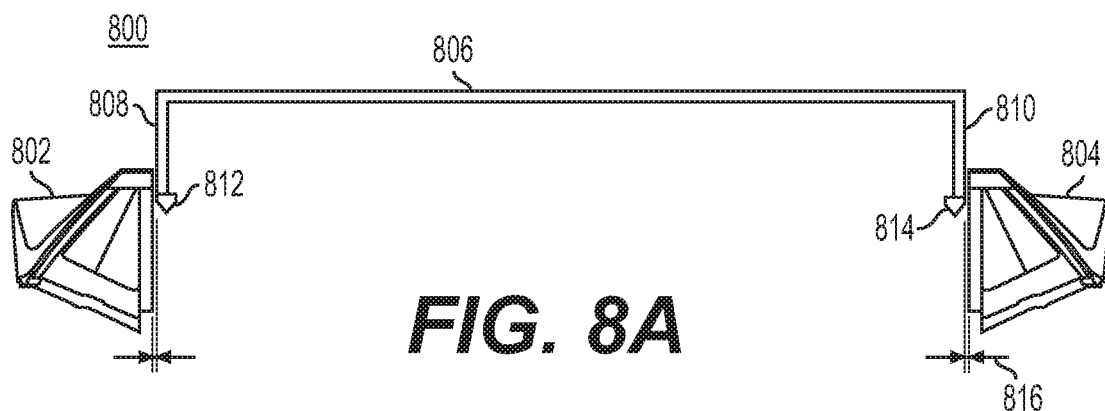
FIGS. 8A-8G illustrate exemplary embodiments of a dynamic seal.

FIG. 8A illustrates an exemplary sealing configuration 800. In some embodiments, ground effect wing 806 may include first endplate 808 and second endplate 810. Endplates 808, 810 may be configured to entrap air beneath ground effect wing 806 while the ground effect craft is in motion, thereby producing lift. Endplates 808, 810 may be configured to extend downward to be substantially adjacent to a portion of sponsons 802, 804 when sponsons 802, 804 move relative to ground effect wing 806, such as in pitch and/or heave. In some embodiments, first endplate 808 may include a first planing surface 812. In some embodiments, second endplate 810 may include a second planing surface 814. Planing surfaces 812, 814 may reduce drag if the planing surfaces touch a planetary surface, such as water.

Figure 8B:
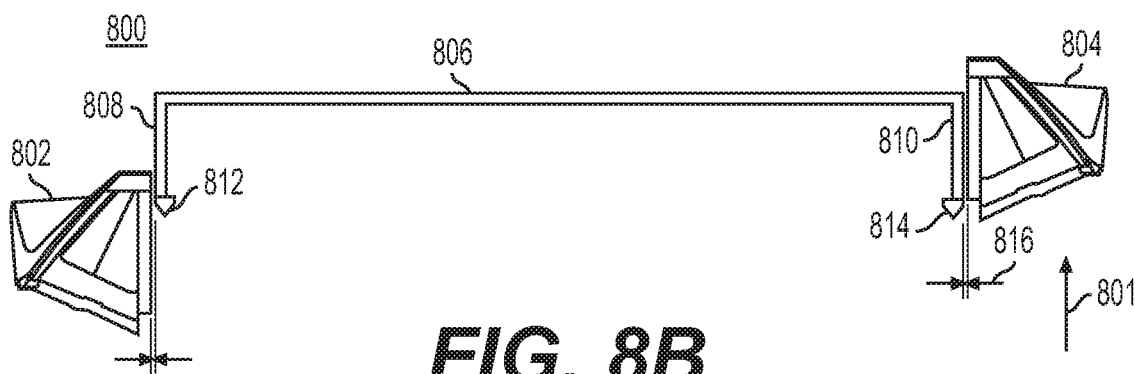

As shown in FIGS. 8A and 8B, first endplate 808 may be separated a separation distance 816 from first sponson 802, and second endplate 810 may be separated a separation distance 816 from second sponson 804. Separation distance 816 may be sufficient to allow sponsons 802, 804 to move relative to ground effect wing 806 without contacting ground effect wing 806. In some embodiments, separation distance 816 may be sufficiently small to maintain an air cushion beneath ground effect wing 806 even though some air may pass through separation distance 816. In some embodiments, at least one overlapping and/or telescoping sliding plate (not shown) may extend from endplates 808, 810 to increase the sealed travel of ground effect wing 806 with respect to the dynamic movement of sponsons 802, 804 while maintaining the air cushion. Such sliding plates may be configured to slide on the inside of endplates 808, 810, thereby the pressure of the air cushion acts to maintain the seal.

In some embodiments, sponsons 802, 804 may include substantially flat surfaces facing endplate 808, 810 to provide a surface to seal air beneath ground effect wing 806. In some embodiments, sponsons 802, 804 may include interior surfaces that are configured to form a surface along which endplates 808, 810 may move while mitigating cushion pressure loss from underneath ground effect wing 806. Such interior surfaces may include, for example, an inner surface of the sponson vertical stabilizers.

FIG. 8B illustrates exemplary movement of second sponson 804 relative to ground effect wing 806 and first sponson 802 in FIG. 8A when second sponson 804 moves in heave direction 801. For example, FIG. 8B illustrates second sponson 804 displaced upwards relative to ground effect wing 806 and first sponson 802 while separation distance 816 remains substantially small and/or negligible so as to entrap air and generate lift.

Figure 8C:
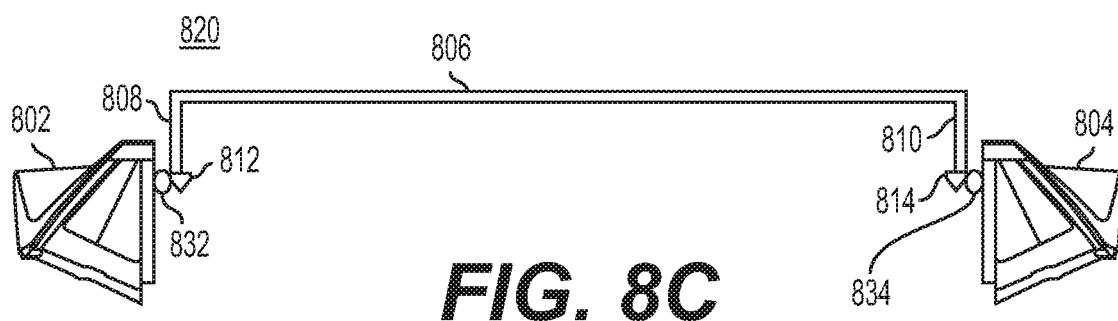

FIG. 8C illustrates another exemplary sealing configuration 820. Configuration 820 may include a first seal 832 and a second seal 834. Ground effect wing 806, first endplate 808, first seal 832, second endplate 810, and second seal 834 may be configured to entrap air beneath ground effect wing 806. For example, second seal 834 may extend from an inside surface of sponson 804 to a surface of second endplate 810. First and second seals 832, 834 may be configured to eliminate and/or reduce airflow from an area below ground effect wing 806 to an area above ground effect wing 806.

Figure 8D:
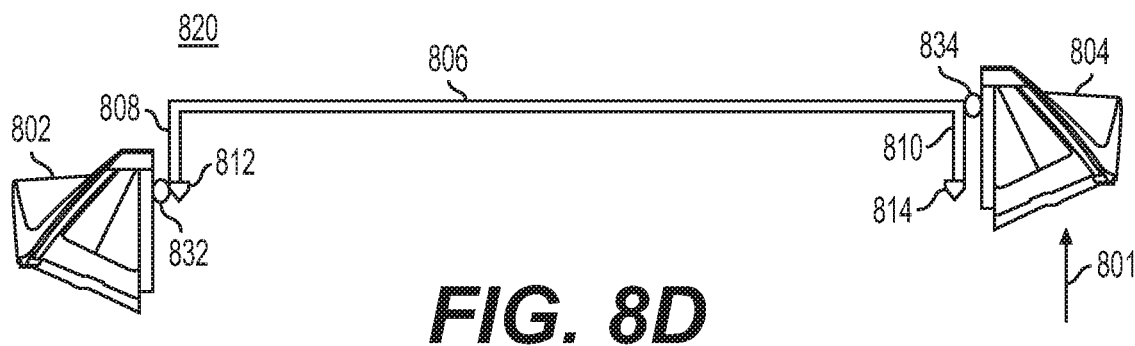

FIG. 8D shows another exemplary sealing configuration 820 relative to ground effect wing 806 and first sponson 802 in FIG. 8C when second sponson 804 moves in heave direction 801. For example, FIG. 8D illustrates second sponson 804 displaced upwards relative to ground effect wing 806 and first sponson 802 in direction 801. First seal 832 may be connected to first sponson 802. Second seal 834 may be connected to second sponson 804. First and second seals 832, 834 may be movable, such that seals 832, 834 may be configured to move with first and second sponsons 802, 804, respectively, when sponsons 802, 804 move relative to ground effect wing 806, such as shown in FIG. 8D. For example, second seal 834 may move relative to ground effect wing 806 when second sponson 804 moves in heave and/or, as shown in FIG. 8D.

Figure 8E:
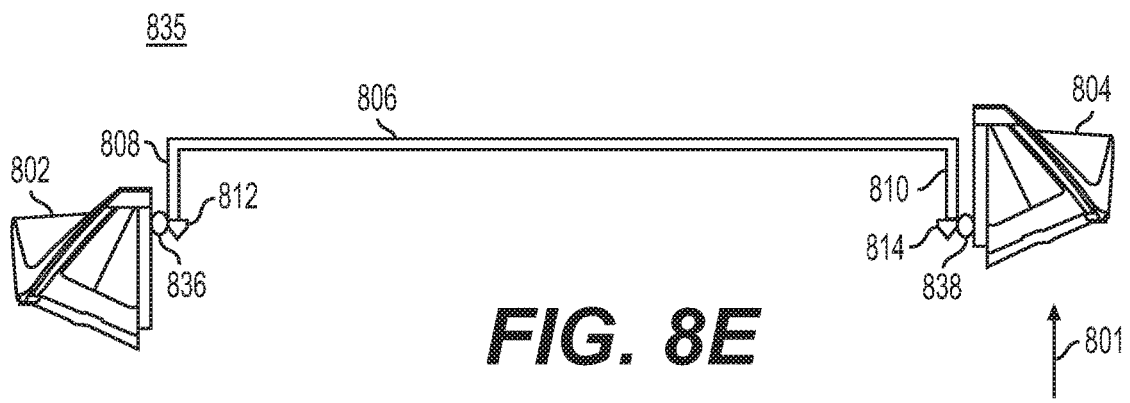

FIG. 8E illustrates another exemplary sealing configuration 835. Unlike configuration 820, in configuration 835 may include a first seal 836 and a second seal 838 that are fixed to the end plates 808, 810. Sponsons 802, 804 may move relative to seals 836, 838 and ground effect wing 806, for example, when second sponson 804 moves in heave and/or pitch, as shown in FIG. 8E.

Figure 8F:
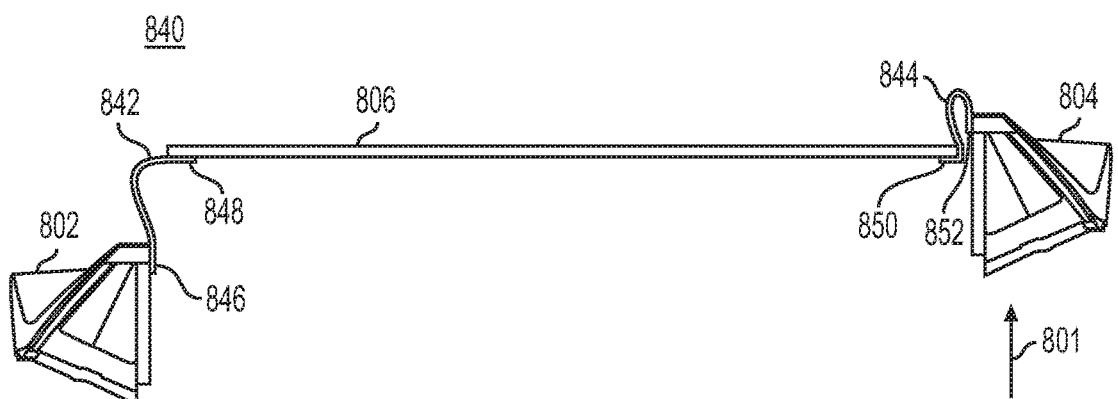

FIG. 8F illustrates another exemplary sealing configuration 840. Configuration 840 may include a first membrane 842 and a second membrane 844. First and second membranes 842, 844 may be connected to first and second sponsons 802, 804, respectively, and ground effect wing 806. As shown in FIG. 8F, ground effect wing 806 may not include end plates 808, 810 for connecting to membranes 842, 844. First and second membranes 842, 844 may be flexible to allow movement of first and second sponsons 802, 804, relative to ground effect wing 806 and each other without the friction or resistance associated with other types of seals, such as in configurations 820 and 835, such as when sponson 804 moves in heave and/or pitch, as shown in FIG. 8D. The entrapped air along the surfaces of ground effect wing 806 and first and second membranes 842, 844 may generate aerodynamic lift and/or reduce drag.

Figure 8G:
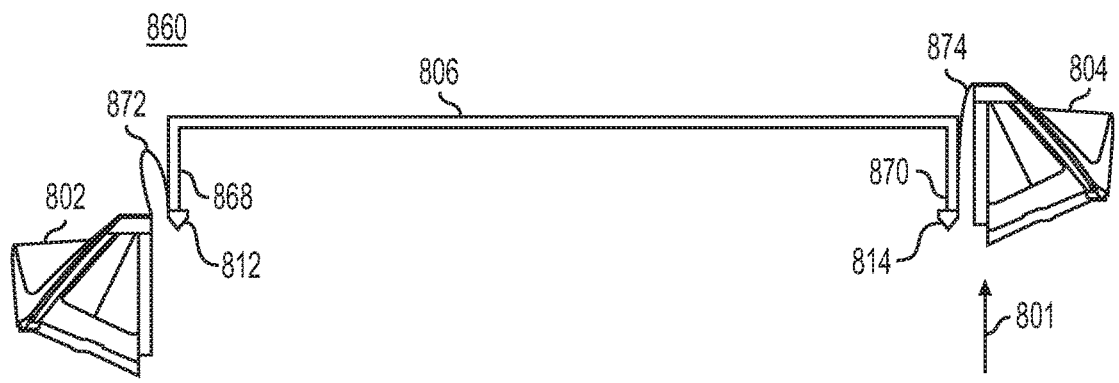

FIG. 8G illustrates another exemplary sealing configuration 860. Configuration 860 may include a first endplate 868, a first membrane 872, a second endplate 870, and a second membrane 874. First and second membranes 872, 874 may be configured to connect first and second endplates 868, 870 to first and second sponsons 802, 804. Ground effect wing 806, first endplate 868, first membrane 872, second endplate 870, and second membrane 874 may be configured to entrap air below ground effect wing 806. The entrapped air along the surfaces of the ground effect wing and the first and second membranes may generate aerodynamic lift and/or reduce drag.

In some embodiments, a membrane seal (such as the examples in FIGS. 8F and 8G) may comprise a break-away connection, such as, for example hook and loop fasteners or break-away stitching, configured to detach the membrane from the sponson and/or ground effect wing at certain angles or rotations. Such detachment, for example, may prevent a pitched sponson from pitching the ground effect wing when the membrane seal is at the limits of travel and/or fully taut.

In some embodiments, a skirt (not shown) may be attached to sponsons 802, 804 and/or ground effect wing 806 and may enclose and/or partially enclose the air chamber beneath ground effect wing 806. In some embodiments, the skirt may be inflatable. In some embodiments, the skirt may retract when the ground effect craft is in motion. In some embodiments, the skirt may maintain and/or increase air pressure beneath ground effect wing 806.

FIGS. 9A-9D illustrate an exemplary embodiment of sponson 900 of a ground effect craft. In some embodiments, it is contemplated that FIG. 9 is non-limiting example that applies to sponsons 102, 104 and other sponsons discussed herein. Certain features of ground effect craft discussed herein are not shown or discussed in these examples where such features may be similar to those discussed for other embodiments.

Sponson 900 may include bottom surfaces that include deadrise that varies along the length of sponson 900. Deadrise is angle formed between the bottom of a hull of sponson 900 and a horizontal plane. Sponson 900 may include bottom surfaces with varying deadrise to reduce hydrodynamic impact loads. Higher deadrise angles increase hydrodynamic drag but reduce hydrodynamic impact loads. Lower deadrise angles reduce hydrodynamic drag but increase hydrodynamic impact loads. In some embodiments, deadrise may change along the length of sponson 900. In some embodiments, the lowest deadrise angle is at or about the overall ground effect craft longitudinal center of gravity and increases both fore and aft of the longitudinal center of gravity. In some embodiments, sponson 900 has an increased deadrise where the pitching moments have increased leverage about the longitudinal center of gravity and thereby increases longitudinal stability. In some embodiments, sponson 900 may include transverse and longitudinal steps along its length. In some embodiments, the sponson may include a lateral profile that minimizes a lateral surface area towards the fore of sponson 900. In some embodiments, the sponson may include a lateral profile that maximizes a lateral surface area towards the aft of sponson 900. In some embodiments, the sponson may have a lateral profile that minimizes the fore lateral surface area and maximizes the aft lateral surface area, thereby providing a center of lateral resistance of the sponson is proximate to the center of gravity of the sponson. The center of gravity of the sponson may be associated with the mass the sponson, including the mass or weight of an engine or other propulsion device.

Figure 9A:
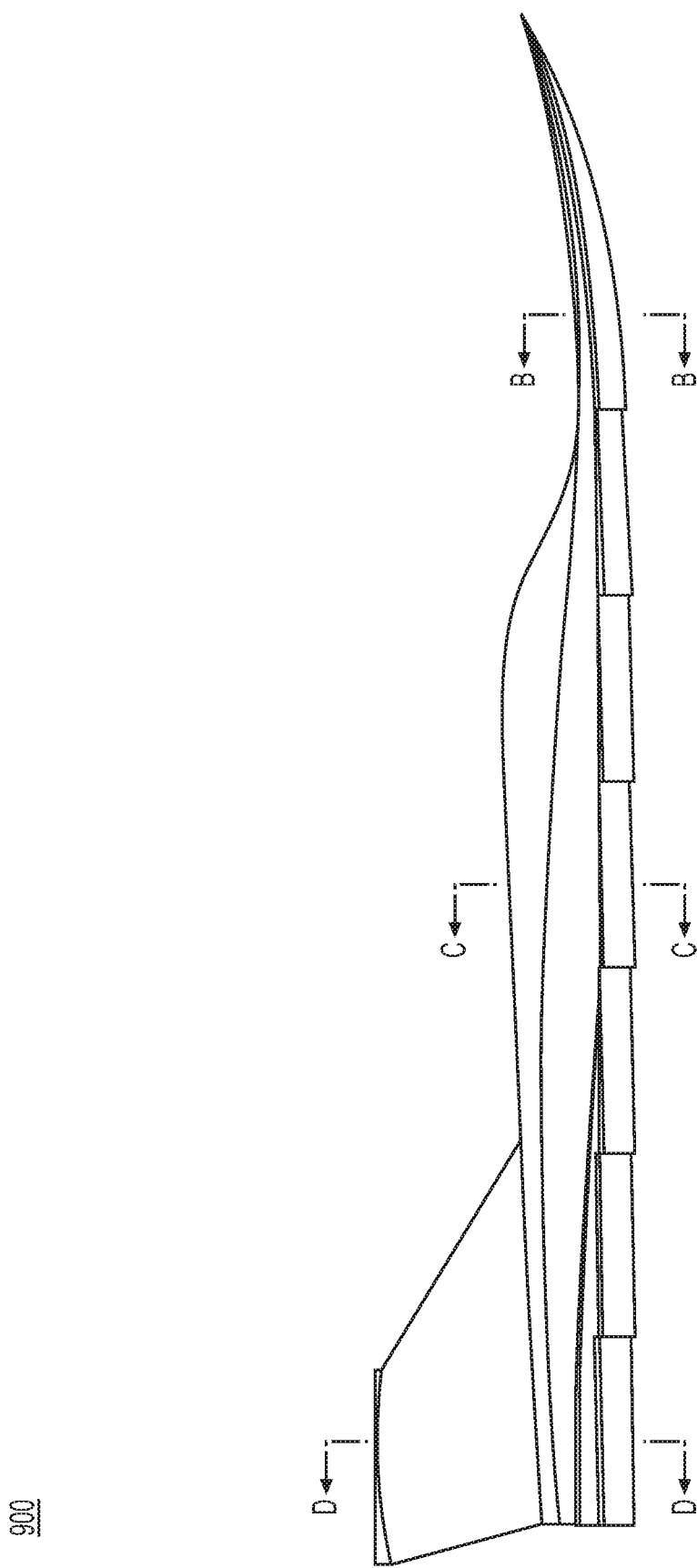
FIGS. 9A-9D illustrate exemplary embodiments of a sponson.
Figure 9D:
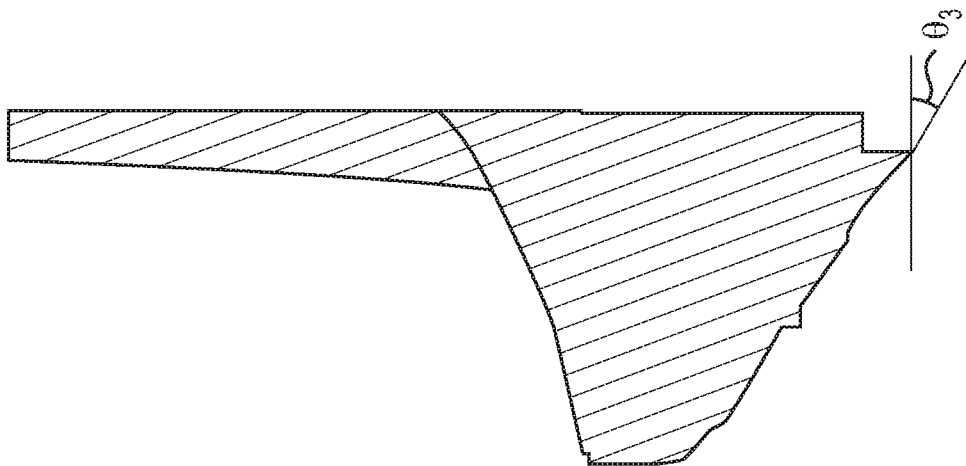
Figure 9C:
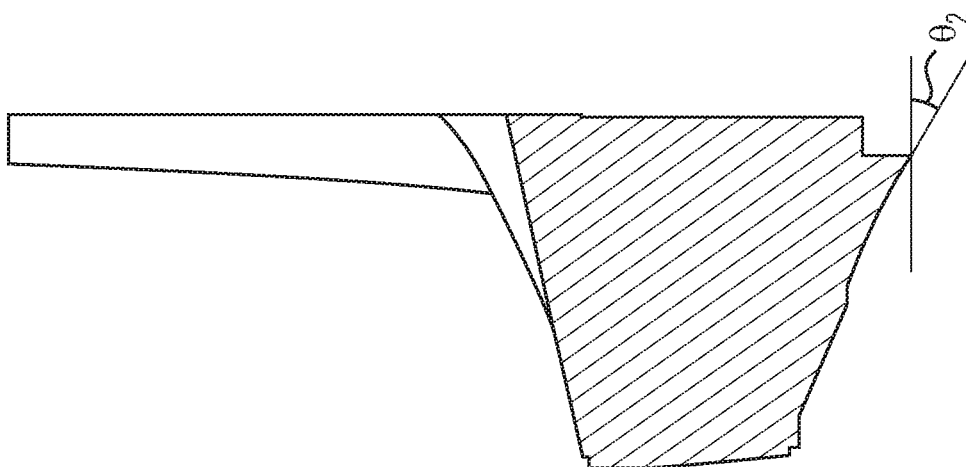
Figure 9B:
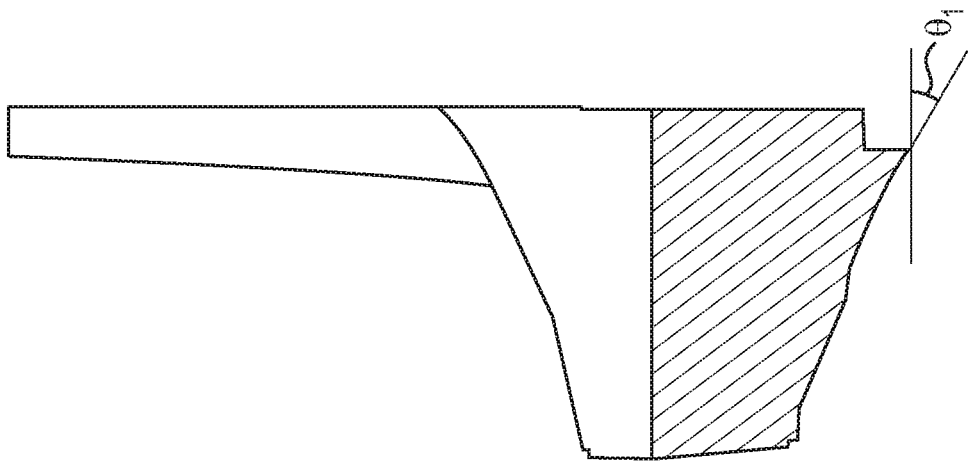

FIG. 9B shows a cross section B-B of sponson 900. In some embodiments, sponson 900 may have an increased deadrise 81 towards the front of the sponson, such as at cross section B-B. FIG. 9C shows a cross section C-C of sponson 900. In some embodiments, sponson 900 may have a decreased deadrise 82 towards the center of sponson 900, such as at cross section C-C. FIG. 9D shows a cross section D-D of sponson 900. In some embodiments, sponson 900 may have an increased deadrise 83 towards the rear of sponson 900, such as at cross section D-D. It is also contemplated that, in some embodiments, deadrise may increase or decrease from front to rear of sponson 900 such as from cross-section B-B to cross-section D-D.

Figure 10A:
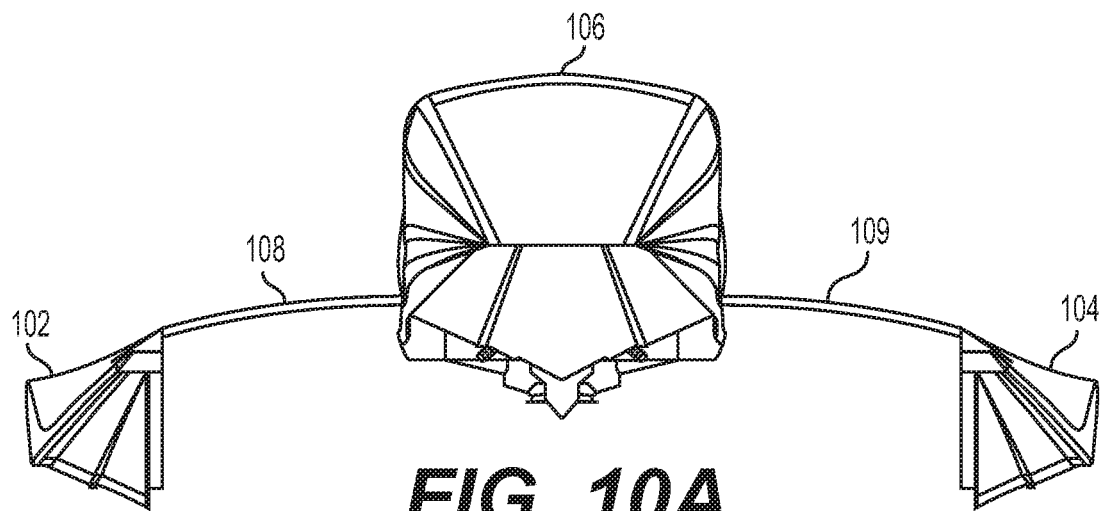
FIGS. 10A-10C illustrate other exemplary embodiments of a ground effect craft.
Figure 10B:
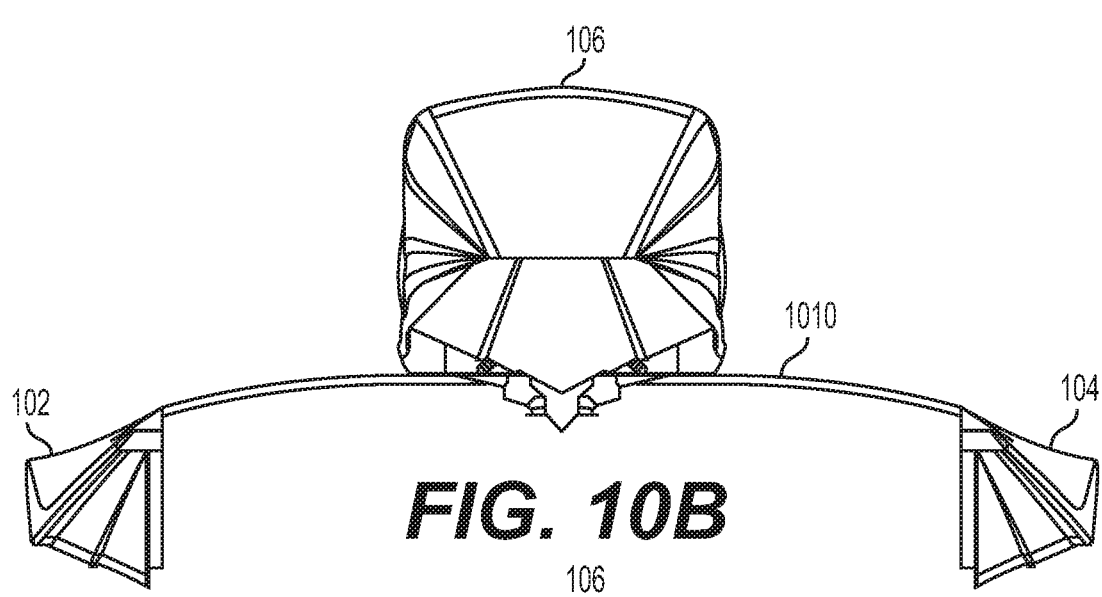
Figure 10C:
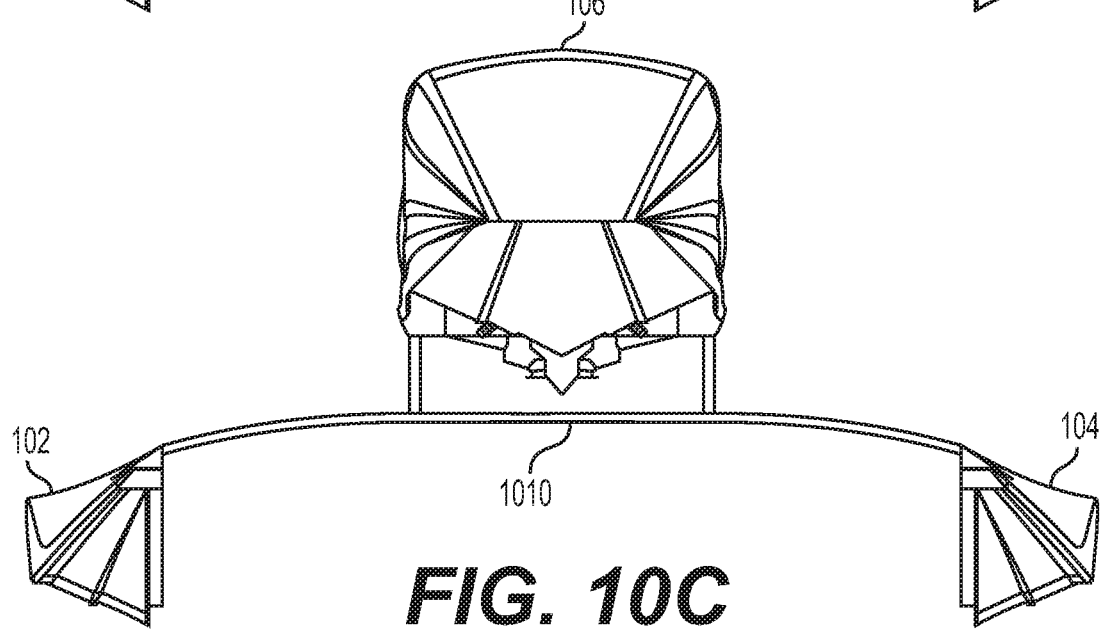

FIGS. 10A-10C illustrate exemplary embodiments of a ground effect craft. Certain features of ground effect craft discussed herein are not shown or discussed in these examples where such features may be similar to those discussed for other embodiments. FIG. 10A illustrates ground effect wings 108, 109 connecting to a first side and a second side of body 106. FIG. 10B illustrates ground effect wing 1010 connected to the bottom of body 106. FIG. 10C illustrates ground effect wing 1010 substantially below body 106.

Figure 11A:
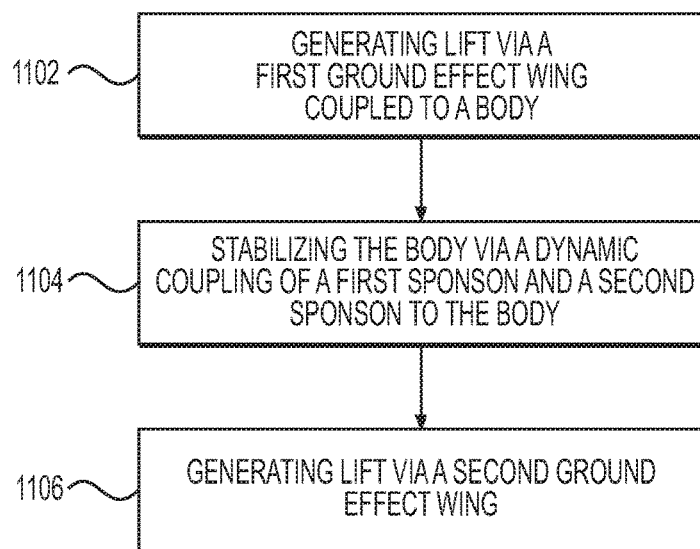
FIGS. 11A-11B illustrate exemplary embodiments of a method of stabilizing a ground effect craft.
Figure 11B:
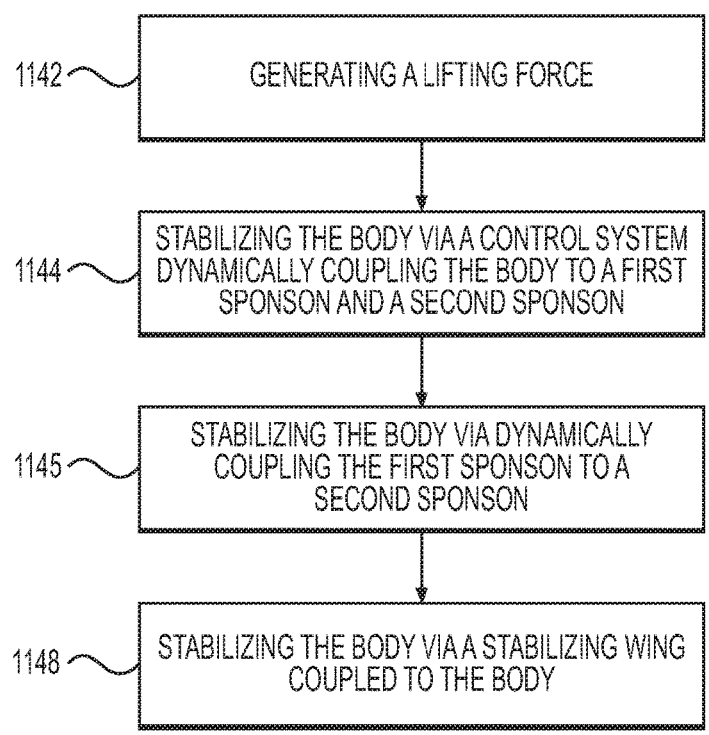
Figure 12A:
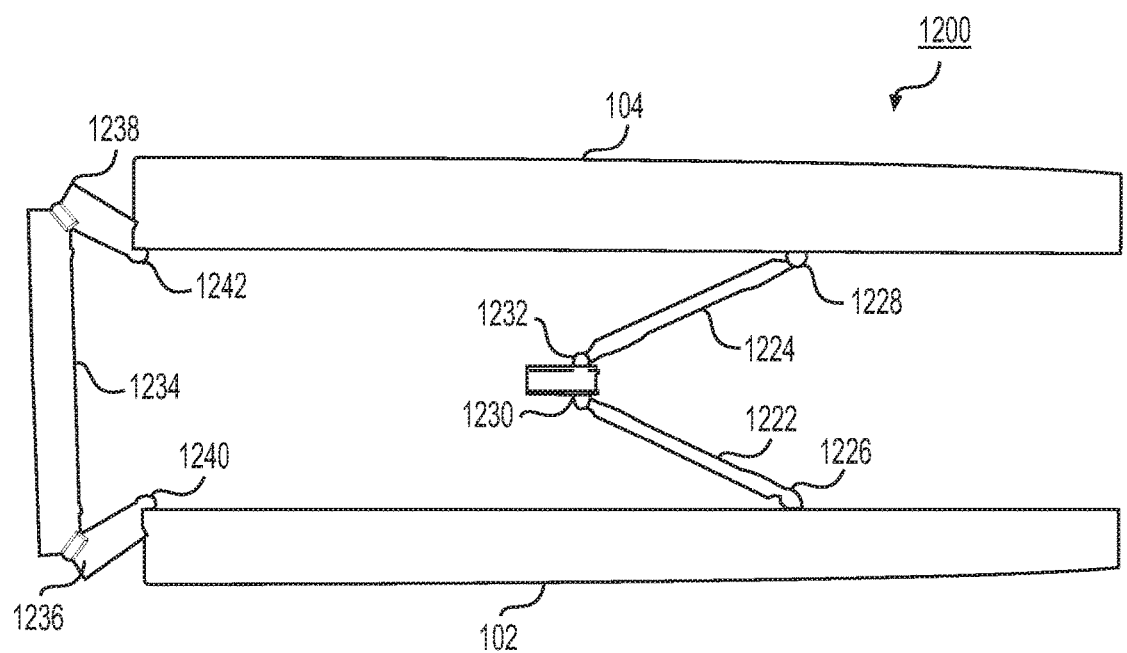
FIGS. 12A-12C illustrate exemplary embodiments of folding mechanisms of an embodiment of a ground effect craft.
Figure 12B:
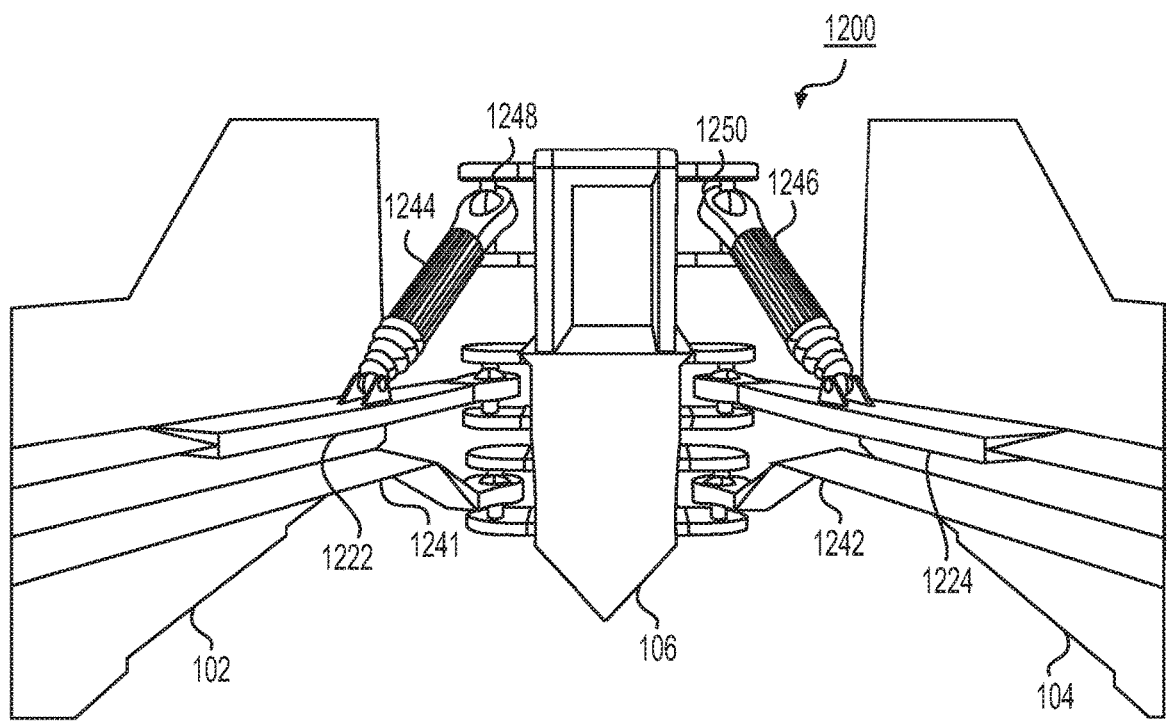
Figure 12C:
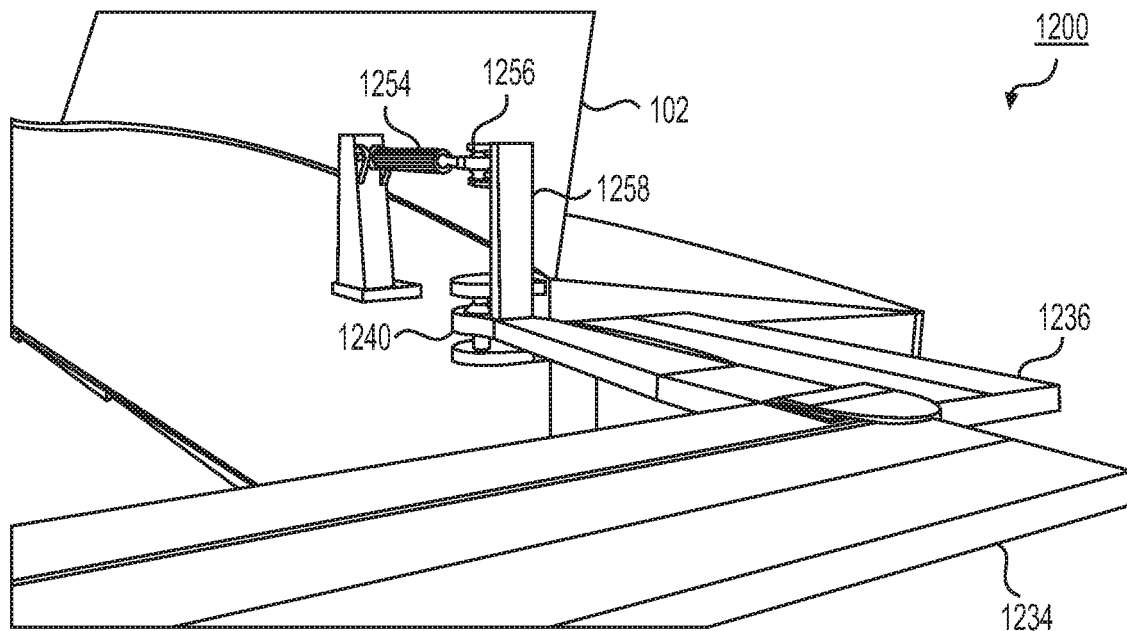

FIGS. 11A-11B show exemplary methods of stabilizing a ground effect craft. The order and arrangement of steps in methods 1100 and 1140 are provided for purposes of illustration. As will be appreciated from this disclosure, modifications may be made to method 1100 and 1140 by, for example, adding, combining, removing, and/or rearranging the steps for methods 1100 and 1140.

FIG. 11A shows a method of stabilizing a ground effect craft, method 1100. Method 1100 may include a step 1102 of generating lift via a first ground effect wing. For example, the ground effect craft may move across a planetary surface and generate lift under the first ground effect wing, such as fore ground effect wings 108, 109. Generating lift via a first ground effect wing may be substantially independent of heave and/or pitch movement of a plurality of sponsons of the ground effect craft. In some embodiments, method 1100 may include a step 1104 of stabilizing the body by dynamically coupling of a first sponson and a second sponson to the body. For example, the ground effect craft may include a fore control system 128, that dynamically couples the body to a plurality of sponsons. In some embodiments, the sponsons may be dynamically coupled to each other by an aft control system 130. In some embodiments, the first ground effect wing may be a fore ground effect wing. In some embodiments, the stabilizing via dynamic coupling may include at least partially isolating the movement of one sponson from the movement of the body and/or the other sponson. In some embodiments, this may include dynamic coupling such that a force imparted on one sponson is not substantially transferred to the body or the other sponson. In some embodiments, method 1100 may include a step 1106 of generating lift via a second ground effect wing, such as an aft ground effect wing. In some embodiments, the first ground effect wing may substantially restrict airflow and/or direct airflow towards the second ground effect wing. In some embodiments, the second ground effect wing may be configured to generate lift when the first ground effect wing moves to a height above a planetary surface that, for example, allows airflow to reach the second ground effect wing. For example, the first ground effect wing may move to a height above the planetary surface via an actuating mechanism, flexure of the wing and/or flap, increased aerodynamically induced pressure, and/or an attitude of a ground effect craft. In some embodiments, airflow is directed towards the second ground effect wing when the first ground effect wing increases a height of a flap of the first ground effect wing, which deflects (for example, by flexure of the flap, an actuating movement, and/or aerodynamically induced pressure acting upon the wing, flap, and/or flap reinforcing members), to generate increased lift of the second ground effect wing. In some embodiments, the second ground effect wing may be configured to provide lift to the plurality of sponsons. In some embodiments, the second lifting force may be configured to provide lift at a location aft of a longitudinal center of gravity of the ground effect craft and a longitudinal center of gravity of the sponsons, thereby creating a stabilizing downwards pitching moment upon the sponsons. The second lifting force may be configured to counteract an unstable moment of the ground effect craft. Method 1100 may optionally include a step (not shown) of stabilizing the ground effect craft via a stabilizing surface (not shown) configured to overcome an unstable moment of the ground effect craft.

FIG. 11B shows a method of stabilizing a ground effect craft, method 1140. Method 1140 may include a step of generating a lifting force 1142. For example, ground effect craft 100 may move across a planetary surface and generate lift under the ground effect wing, such as fore ground effect wings 108, 109. In some embodiments, fore ground effect wings 108, 109 may be configured to lift body 106 to reduce drag. In some embodiments, fore ground effect wings 108, 109 may be configured to lift body 106 to stabilize the ground effect craft such that movement of sponsons 102, 104 are not substantially transmitted to body 106. In some embodiments, method 1140 may include a step of stabilizing a body via a control system dynamically coupling the body to the first sponson and the second sponson 1144. For example, ground effect craft 100 may include fore control system 128 that operates to dynamically couple body 106 to sponsons 102, 104, thereby allowing the pitch and heave of sponsons 102, 104 relative to each other and body 106. In some embodiments, method 1140 may include a step of stabilizing a body via dynamically coupling the first sponson to the second sponson 1145. For example, ground effect craft 100 may include aft control system 130 that operates to dynamically couple sponsons 102, 104, thereby allowing the pitch and heave of sponsons 102, 104 relative to each other. In some embodiments, method 1140 may include a step of deflecting a first sponson in the plurality of sponsons in response to a force imparted by a planetary surface 1148. For example, fore and aft control systems 128, 130 may be configured to allow substantial movement of a sponson, such as sponson 102, relative to body 106 and sponson 104 without substantially transmitting the motion of sponson 102 to body 106 and sponson 104. In some embodiments, method 1140 may include stabilizing the body via a stabilizing wing coupled to the body. For example, the ground effect craft may include a stabilizing wing, such as stabilizing wing 310. In some embodiments, stabilizing wing 310 may include control surfaces, such as control surfaces 320, 322, 324, 326, 336, 338, and 340 to substantially direct airflow to counteract an unstable moment on body 106. In some embodiments, stabilizing wing 310 may be configured to generate lift, thereby reducing the impact on body 106 of sponsons 102, 104 striking an obstacle, a perturbation, and/or a planetary surface.

FIGS. 12A-12C show non-limiting examples of a folding feature of a ground effect craft 1200. The exemplary folding features 1200 of the ground effect craft may be configured to reduce a footprint or width of ground effect craft 1200, such as by folding, retracting, and/or collapsing one or more components. Some features of ground effect craft 1200, such as body 106 and ground effect wings 108, 109, are not shown or discussed in these examples where such features may be similar to those discussed for other embodiments.

FIG. 12A illustrates an exemplary folding feature 1200 of a ground effect craft. In some embodiments, control systems of the ground effect craft may be similar to the disclosure of control system 128, or any other control system disclosed herein. The ground effect craft may include first sponson 102 and second sponson 104 coupled to the body (not shown) by a first lateral control link 1222 and a second lateral control link 1224. First lateral control link 1222 may be connected to first sponson 102 at a first sponson connection 1226 and at the body at a first body connection 1230. First lateral control link 1222 and second lateral control link 1224 may be configured to move about first sponson connection 1226, first body connection 1230, second sponson connection 1228, and second body connection 1232, thereby causing first and second sponsons 102, 104 to move inwardly towards the centerline of body 106 and thereby reduce a lateral footprint of the ground effect craft. In some embodiments, the movement of first and second sponsons 102, 104 may be independent of each other, such that they may be moved relatively closer to the centerline of body 106 by different amounts. In some embodiments, actuating mechanisms (not shown) may be configured to move and/or allow movement of first and second lateral control links 1222, 1224 about first and second sponsons connections 1226, 1228, and first and second body connections 1230, 1232.

In some embodiments first and second lateral control links 1222, 1224 may be part of fore control system 128.

In some embodiments, sponsons 102, 104 may be coupled by an aft lateral control link 1234. Aft lateral control link 1234 may be connected to first sponson 102 and second sponson 104 at a first aft sponson connection 1240 and a second aft sponson connection 1242, respectively. Aft lateral control link 1234 may be configured move about aft sponsons connections 1240, 1242 to allow first and second sponsons 102, 104 to move inwardly towards the centerline of body 106 and thereby reduce a lateral footprint of ground effect craft 1200. In some embodiments, aft lateral control link 1234 may include one or more movable links, such as a first movable link 1236 and a second movable link 1238, shown on FIG. 12A. First and second movable links 1236, 1238 may be configured to allow portions of aft lateral control link 1234 to fold inwardly so as to allow first and second sponsons 102, 104 to move inwardly towards the centerline of body 106 and thereby reduce a lateral footprint of ground effect craft 1200. In some embodiments, actuating mechanisms (not shown) may be configured to move and/or allow movement of aft lateral control link 1234 about first and second aft sponson connections 1242, 1240 and/or first and second movable links 1236, 1238 relative to aft link 1234.

In some embodiments, aft lateral control link 1234 may be part of aft control system 130.

FIG. 12B illustrates a more detailed embodiment of a portion of a fore control system of a ground effect craft. In some embodiments, the fore control systems of the ground effect craft may be similar to fore control system 128, or any other control system disclosed herein. The fore control system may include first lateral control link 1222, second lateral control link 1224, a third lateral control link 1241, and a fourth lateral control link 1242 connecting sponsons 102, 104 to body 106. In some embodiments, a first fore actuator 1244 and a second fore actuator 1246 may connect first and second lateral control links 1222, 1224 to body 106. First and second actuators 1244, 1246 may be configured to allow movement of lateral control links 1222, 1224 so as to allow first and second sponsons 102, 104 to move inwardly towards the centerline of body 106 and thereby reduce a lateral footprint of the ground effect craft. In some embodiments, the movement of fore actuators 1244, 1246 around first and second connections 1248, 1250 may allow first and second sponsons 102, 104 to move inwardly towards the centerline of body 106 without removing or disconnecting fore actuators 1244, 1246.

In some embodiments lateral control links 1222, 1224, 1241, and 1242 may be part of control system 128. In some embodiments, actuators 1244, 1246 may be similar to actuators 628, 630 described herein.

FIG. 12C illustrates a more detailed embodiment of a portion of an aft control system of a ground effect craft. In some embodiments, the aft control systems of the ground effect craft may be similar to aft control system 130, or any other control system disclosed herein. FIG. 12C illustrates one side of an aft control system, such as described in FIG. 12A, relating to sponson 102. In some embodiments, aft lateral control link 1234 may include an aft actuator 1254 coupling sponson 102 to aft lateral control link 1234, for example, via aft actuator mount 1258. In some embodiments, aft actuator mount 1258 may include movable connection 1256 configured to allow aft actuator mount 1258 to rotate as aft actuator link 1234 moves, for example, about aft sponson connection 1240 of FIG. 12A. The movement of aft actuators 1254 around movable connection 1256 allows first sponson 102 to move inwardly towards the centerline of body 106 without removing or disconnecting aft actuator 1254. In some embodiments, sponson 104 may include a similar folding feature with similar components.

In some embodiments, aft lateral control link 1234 may be part of aft control system 130. In some embodiments, aft actuator 1254 may be similar to aft actuator 741 described herein. It is contemplated that other actuating methods may be used, such as a rotary actuator.

FIGS. 13A-13F show example embodiments of folding features of a ground effect craft. Certain features of the ground effect craft hereinare not shown or discussed in these examples where such features may be similar to those discussed for other embodiments. The exemplary folding features of ground effect craft discussed in FIGS. 13A-13F may be configured to reduce a footprint, such as a length, and/or a width of the ground effect craft, such as by folding, retracting, and/or collapsing one or more components. Some features of ground effect craft discussed in FIGS. 13A-13F, such as body 106 and ground effect wings 108, 109, may not be shown or described where such features may be similar to those of ground effect craft 100, 150, 200, 300, 400, 1200, or other ground effect craft discussed herein.

Figure 13A:
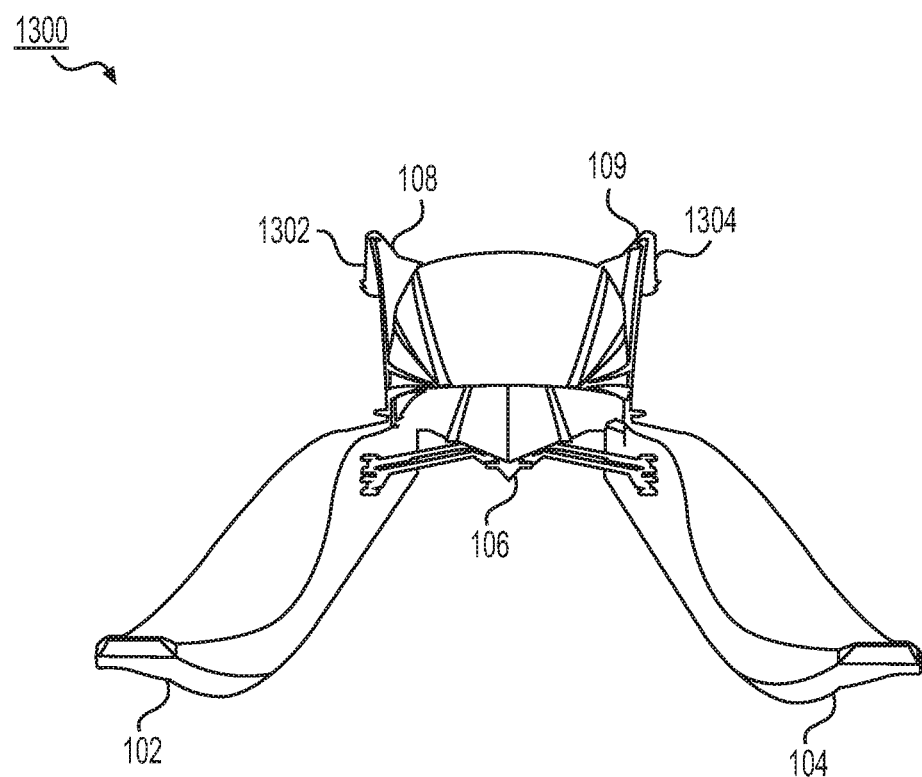
FIGS. 13A-13G illustrate exemplary embodiments of folding mechanisms of an exemplary embodiments of a ground effect craft.

FIG. 13A illustrates an exemplary folding feature 1300 of an embodiment of a ground effect craft. The ground effect craft may include a folding feature 1300 for folding, moving, and/or retracting first ground effect wing 108 and second ground effect wing 109. As shown in FIG. 13A, ground effect wings 108, 109 may be configured to retract or fold towards body 106 as sponsons 102, 104 move towards the centerline of body 106, thereby reducing a lateral footprint of the ground effect craft. For example, ground effect wings 108, 109 may include spars (not shown) that allow ground effect wings 108, 109 to fold about a hinge, bearing, pivot, or joint (such as a ball joint), such as when ground effect wings 108, 109 include rigid or semi-rigid structures. In some embodiments, such as when ground effect wings include flexible or semi-flexible structures, such as a membrane, spars and joints or pivots may not be necessary because the flexible nature of the ground effect wings allows for folding. In some embodiments, a flexible or semi-flexible membrane wing may be connected to structures via a detachable fastener, such as a hook and loop fastener, a zipper, break-away connections, and/or other fastening method to allow simplified folding.

In some embodiments, first ground effect wing 108 and second ground effect wing 109 may include first endplate 1302 and second endplate 1304, respectively. In some embodiments, first and second endplates 1301, 1303 may include rigid or semi-rigid structures that hinge, fold, rotate, or pivot around an edge of ground effect wings 108, 109, thereby reducing a lateral footprint of the ground effect craft. First and second endplates 1301, 1303 may be similar to endplates first and second endplates 808, 810 of FIGS. 8A-8E and 8G.

Figure 13B:
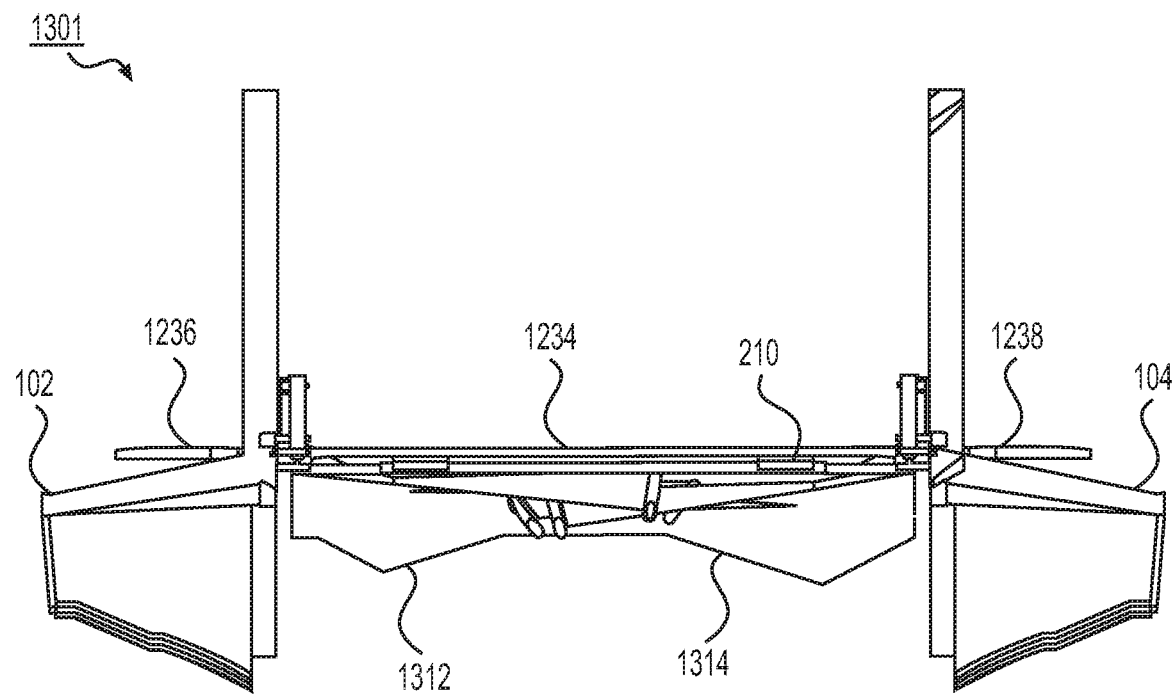

FIG. 13B illustrates an exemplary folding feature 1301 of an embodiment of a ground effect craft. The ground effect craft may include a folding feature 1301 for folding aft ground effect wing 210. FIG. 13B illustrates an exemplary aft ground effect wing 210 that may be configured to fold and/or retract as sponsons 102, 104 move towards the centerline of body 106, thereby reducing a lateral footprint of the ground effect craft. In some embodiments, ground effect wing 210 may include first and second end portions 1312, 1314. In some embodiments, first and second end portions 1312, 1314 may fold and/or retract towards aft ground effect wing 210.

Figure 13C:
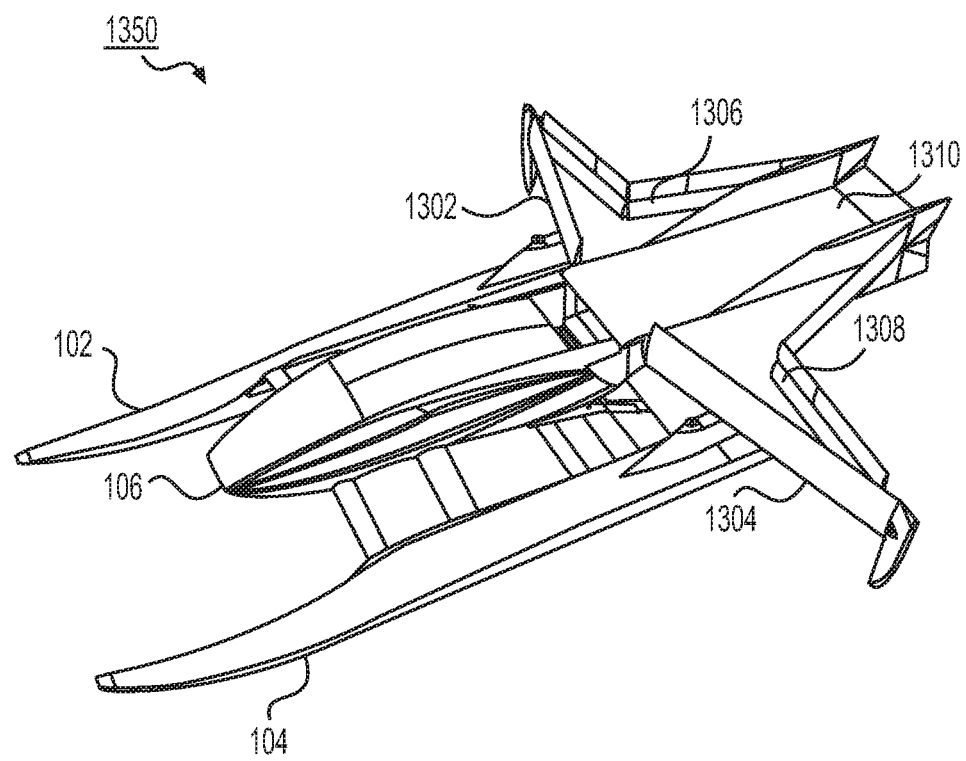

FIG. 13C illustrates an exemplary folding feature 1350 of an embodiment of a ground effect craft. FIG. 13C illustrates exemplary ground effect craft in a partially folded position. The ground effect craft may include, for example, stabilizing wing 1310. The ground effect craft may include a folding feature 1350 for folding and/or retracting stabilizing wing 1310. In some embodiments, stabilizing wing 1310 may include a first leading edge 1302 and a second leading edge 1304. First and second leading edges 1302, 1304 may be configured rotate relative to body 106 so as to allow stabilizing wing 1310 to retract and/or fold towards the centerline of body 106, thereby reducing a lateral footprint of the ground effect craft. In some embodiments, as shown in FIG. 13C, stabilizing wing 1310 may include a first trailing spar 1306 and a second trailing spar 1308 near a trailing edge of stabilizing wing 1310 configured to fold the trailing edge. For example, as the outer tips of leading edges 1302, 1304 may be configured to fold or swing backwards towards the rear of stabilizing wing 1310. To accommodate this movement, trailing spars 1306, 1308 may be configured to fold so that leading edges 1302, 1304 can approach body 106 as folding occurs. In such embodiments, a surface of stabilizing wing 1310 may be a flexible or semi-flexible material so as to permit folding of the wing surface. In embodiments in which a surface of stabilizing wing 1310 is a rigid or semi-rigid material, the wing surface may be segmented, creased, or configured to fold so as to accommodate the folding of the wing surface.

Figure 13D:
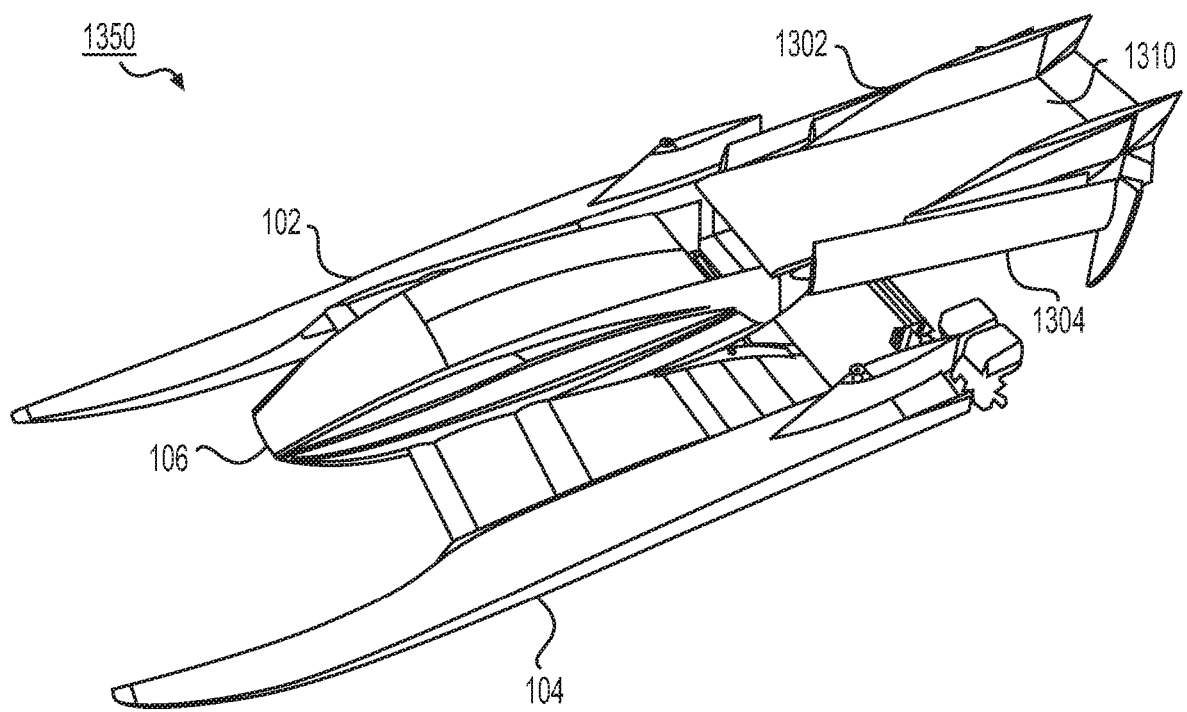

FIG. 13D illustrates an exemplary folding feature 1350 of an embodiment of a ground effect craft. FIG. 13D illustrates exemplary ground effect craft in a partially-folded position subsequent to the position illustrated in FIG. 13C. In some embodiments, leading edges 1302, 1304 may be positioned near or within the lateral width of sponsons 102, 104 and/or body 106, thereby reducing a lateral footprint of the ground effect craft. In some embodiments, leading edges 1302, 1304 may move to a position substantially parallel to body 106. It is further contemplated that portions of leading edges 1302, 1304 may connect and/or lock with portions of stabilizing wing 1310 so that, for example, the leading edges 1302, 1304 cannot be disturbed in a way that may inflict damage on the ground effect craft.

Figure 13E:
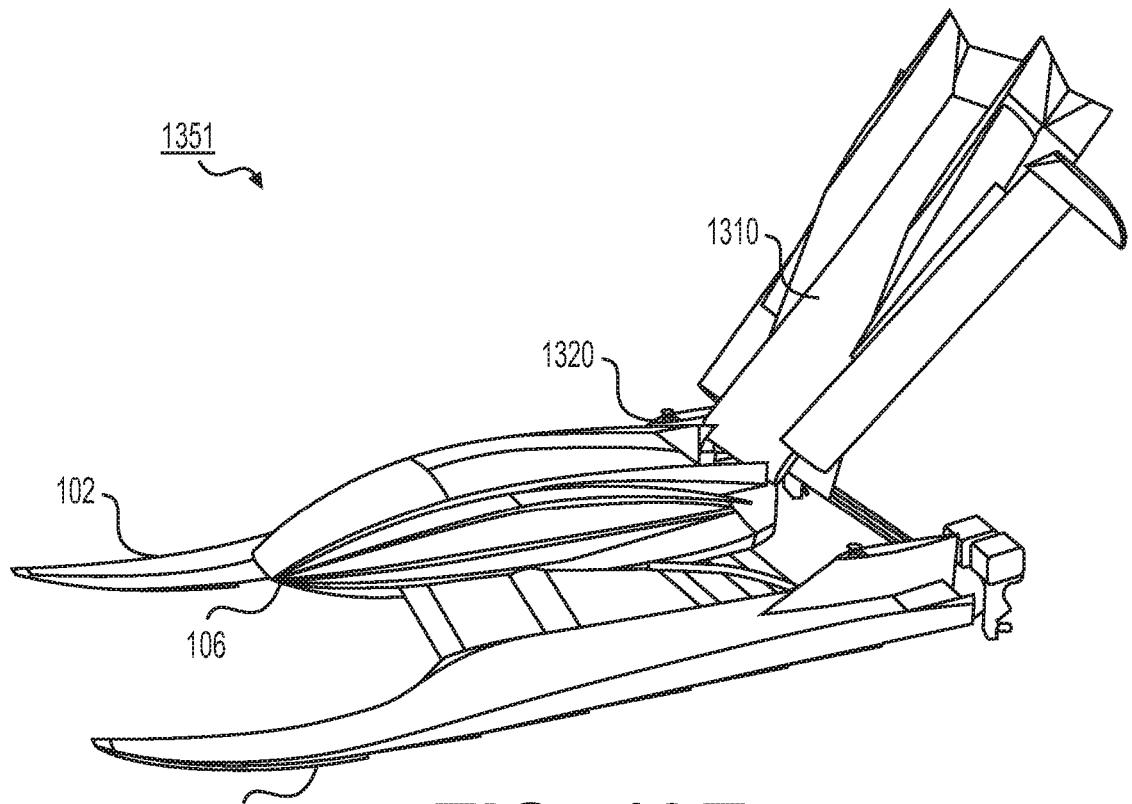

FIG. 13E illustrates an exemplary folding feature 1351 of an embodiment of a ground effect craft. FIG. 13E illustrates an exemplary ground effect craft in another partially folded position. The ground effect craft may include a folding feature 1351 for folding, moving, and/or retracting stabilizing wing 1310. In some embodiments, stabilizing wing 1310 may include a connection 1320 that connects stabilizing wing 1310 to body 106, such that stabilizing wing 1310 may move and/or rotate about connection 1320. In such embodiments, the rotation may thereby reduce the longitudinal footprint of the ground effect craft. In some embodiments, body 106 may include at least one actuating mechanism configured to rotate stabilizing wing 1310 about connection 1320.

Figure 13F:
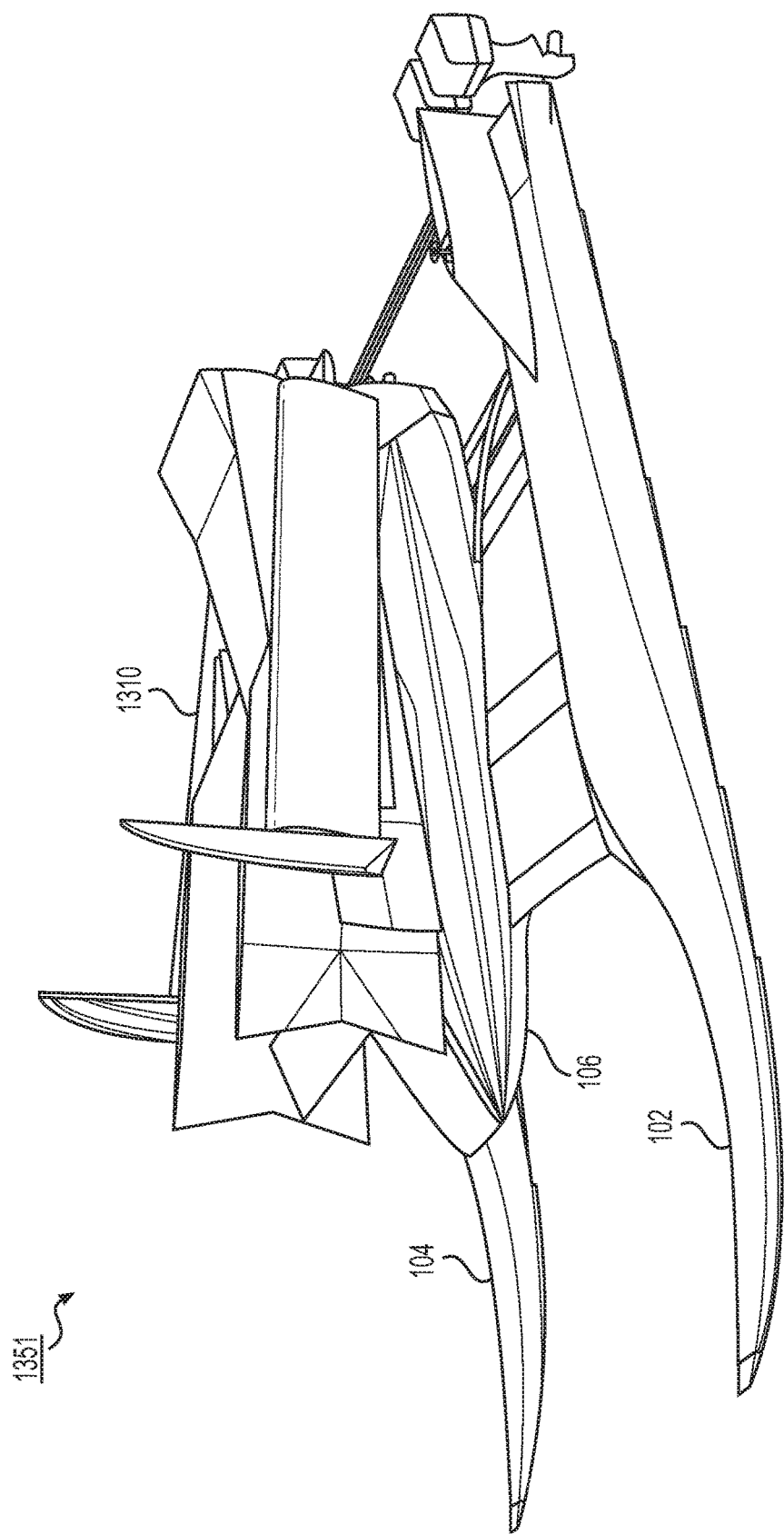

FIG. 13F illustrates an exemplary folding feature 1351 of an embodiment of a ground effect craft. FIG. 13F illustrates an exemplary ground effect craft in a folded position subsequent to the position illustrated in FIG. 13E. In some embodiments, stabilizing wing 1310 may be configured to move to a position substantially adjacent to body 106, so as to reduce a longitudinal footprint of the ground effect craft. In some embodiments, leading edges 1302, 1304 may be configured to move to a position substantially parallel to body 106 so as to reduce a lateral and/or longitudinal footprint of the ground effect craft. It is further contemplated that portions of stabilizing wing 1310 may connect and/or lock with portions of body 106 and/or sponsons 102/104 so that, for example, the stabilizing wing cannot be moved in a way that may inflict damage on the ground effect craft.

Figure 13G:
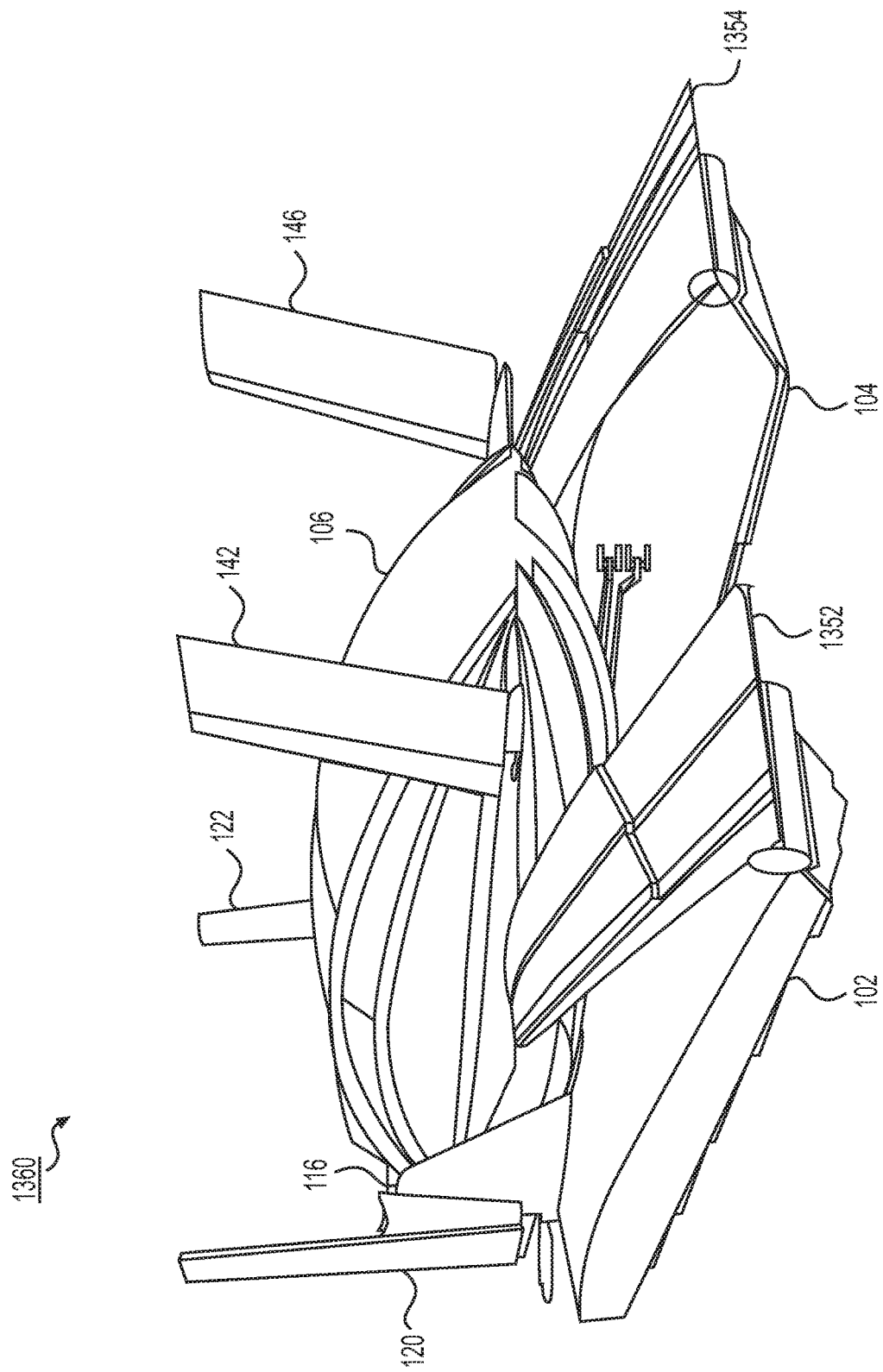

FIG. 13G illustrates an exemplary folding feature 1360 of an embodiment of a ground effect craft. Folding feature 1360 may include a mechanism for folding and/or retracting sponsons 102, 104. For example, in some embodiments, first and second sponsons 102, 104 may include a first pivot portion 1352 and a second pivot portion 1354. Pivot portions 1352, 1354 may be configured to permit a portion of sponsons 102, 104 to rotate in a way that reduces a longitudinal footprint of the ground effect craft. For example, a front portion of sponsons 102, 104 may rotate towards the aft of the ground effect craft, such as towards body 106. In some embodiments, sponsons 102, 104 may include at least one actuating mechanism configured to rotate the portion of the sponsons about pivot portions 1352, 1354. Folding feature 1360 may include a mechanism for folding, moving, and/or retracting canards 142, 146. In some embodiments, first and second canards 142, 146 may include a first and a second pivot portion (not numbered in FIG. 13G). The pivot portions of canards 142, 146 may be configured to permit a portion of canards 142, 146 to rotate, thereby reducing a lateral footprint of the ground effect craft. In some embodiments, body 106 may include at least one actuating mechanism configured to rotate the canard pivot portions. Folding feature 1360 may include a mechanism for folding, moving, and/or horizontal stabilizer wings 120, 122. In some embodiments, first and second horizontal stabilizer wings 120, 122 may include a third and a fourth pivot portion (not numbered in FIG. 13G). The pivot portions of horizontal stabilizer wings 120, 122 may be configured to permit a portion of the stabilizer wings to rotate, thereby reducing a lateral footprint of the ground effect craft. In some embodiments, body 106 may include at least one actuating mechanism configured to rotate the canard stabilizer wing pivot portions.

It is understood that while certain embodiments are discussed to facilitate understanding of various principles and aspects of this disclosure, the embodiments are not described in isolation and the descriptions are not necessarily mutually exclusive. Thus, it is contemplated and understood that described features of principles of any embodiment may be incorporated into other embodiments.

It will be apparent to those skilled in the art that various modifications and variations can be made to the disclosed ground effect craft, forward ground effect wing, aft ground effect wing, stabilizing wing, and control system, method of stabilizing a ground effect craft, and method of generating lift for a ground effect craft. While illustrative embodiments have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

The invention claimed is:

1. A ground effect craft comprising:
    a first sponson;
    a second sponson;
    a fore aerodynamic lift surface configured to generate lift substantially independent of pitch movement of the first sponson and the second sponson;
    a body dynamically coupled to the first sponson and the second sponson; and
    an aft aerodynamic lift surface connected to at least one of the first sponson and the second sponson, wherein the aft aerodynamic lift surface is configured to move substantially independent of the fore aerodynamic lift surface.

2. The ground effect craft of claim 1, further comprising:
    wherein the aft aerodynamic lift surface is configured to generate increased lift when the fore aerodynamic lift surface directs air to the aft aerodynamic lift surface, or
    wherein the aft aerodynamic lift surface is configured to generate decreased lift when the fore aerodynamic lift surface restricts air to the aft aerodynamic lift surface.

3. The ground effect craft of claim 1, further comprising a flap configured to extend from the fore aerodynamic lift surface between a leading edge of the fore aerodynamic lift surface and a trailing edge of the fore aerodynamic lift surface.

4. The ground effect craft of claim 1, further comprising a stabilizing wing coupled to the body.

5. The ground effect craft of claim 4, wherein at least one of the stabilizing wing, the fore aerodynamic lift surface, and the aft aerodynamic lift surface comprises an anhedral shape.

6. The ground effect craft of claim 4, wherein the stabilizing wing comprises a wingtip spoiler.

7. The ground effect craft of claim 1, wherein the fore aerodynamic lift surface comprises a membrane.

8. The ground effect craft of claim 1, wherein the fore aerodynamic lift surface comprises a flap positioned proximate a trailing edge of the fore aerodynamic lift surface.

9. The ground effect craft of claim 1, wherein the aft aerodynamic lift surface comprises a flap.

10. The ground effect craft of claim 1, wherein the fore aerodynamic lift surface is configured to deflect responsive to an aerodynamic pressure change on the fore aerodynamic lift surface.

11. The ground effect craft of claim 1, wherein at least one of the aft aerodynamic lift surface, an aft aerodynamic lift surface flap, and a fore aerodynamic lift surface flap comprises an overlapping panel.

12. The ground effect craft of claim 1, wherein the first sponson and the second sponson are configured to move inwardly towards a centerline of the ground effect craft to reduce a lateral footprint.

13. A ground effect craft comprising:
    a first sponson;
    a second sponson;
    a fore aerodynamic lift surface configured to entrap air beneath the fore aerodynamic lift surface and between the first sponson and the second sponson, wherein the fore aerodynamic lift surface is configured to move independent of pitch movement of the first sponson and the second sponson;

a body dynamically coupled to the first sponson and the second sponson; and an aft aerodynamic lift surface connected to at least one of the first sponson and the second sponson and is between the first sponson and the second sponson, wherein the aft aerodynamic lift surface is configured to move independent of pitch movement of the fore aerodynamic lift surface.

14. The ground effect craft of claim 13, further comprising:

the aft aerodynamic lift surface is configured to generate increased lift when the fore aerodynamic lift surface directs air to the aft aerodynamic lift surface, or wherein the aft aerodynamic lift surface is configured to generate decreased lift when the fore aerodynamic lift surface restricts air to the aft aerodynamic lift surface.

15. The ground effect craft of claim 13, further comprising a flap configured to extend from the fore aerodynamic lift surface between a leading edge of the fore aerodynamic lift surface and a trailing edge of the fore aerodynamic lift surface.

16. The ground effect craft of claim 13, further comprising a stabilizing wing coupled to the body.

17. The ground effect craft of claim 16, wherein at least one of the stabilizing wing, the fore aerodynamic lift surface, and the aft aerodynamic lift surface comprises an anhedral shape.

18. The ground effect craft of claim 16, wherein the stabilizing wing comprises a wingtip spoiler.

19. The ground effect craft of claim 13, wherein the fore aerodynamic lift surface comprises a membrane.

20. The ground effect craft of claim 13, wherein the fore aerodynamic lift surface comprises a flap positioned proximate a trailing edge of the fore aerodynamic lift surface.

21. The ground effect craft of claim 13, wherein the aft aerodynamic lift surface comprises a flap.

22. The ground effect craft of claim 13, wherein the fore aerodynamic lift surface is configured to deflect responsive to an aerodynamic pressure change on the fore aerodynamic lift surface.

23. The ground effect craft of claim 13, wherein at least one of the aft aerodynamic lift surface, an aft aerodynamic lift surface flap, and a fore aerodynamic lift surface flap comprises an overlapping panel.

24. The ground effect craft of claim 13, wherein the first sponson and the second sponson are configured to move inwardly towards a centerline of the ground effect craft to reduce a lateral footprint.

25. A ground effect craft comprising:
a first sponson;
a second sponson;
a fore aerodynamic lift surface configured to generate lift substantially independent of pitch movement of the first sponson and the second sponson, wherein the fore aerodynamic lift surface is configured to move independent of pitch movement of the first sponson and the second sponson;
a body configured to move relatively independent of the first sponson and the second sponson, wherein the body is connected to the first sponson and the second sponson; and
an aft aerodynamic lift surface connected to at least one of the first sponson and the second sponson and is between the first sponson and the second sponson, wherein the aft aerodynamic lift surface is configured to move independent of pitch movement of the fore aerodynamic lift surface.

26. The ground effect craft of claim 25, further comprising:

wherein the aft aerodynamic lift surface is configured to generate increased lift when the fore aerodynamic lift surface directs air to the aft aerodynamic lift surface, or wherein the aft aerodynamic lift surface is configured to generate decreased lift when the fore aerodynamic lift surface restricts air to the aft aerodynamic lift surface.

27. The ground effect craft of claim 25, further comprising a flap configured to extend from the fore aerodynamic lift surface between a leading edge of the fore aerodynamic lift surface and a trailing edge of the fore aerodynamic lift surface.

28. The ground effect craft of claim 25, further comprising a stabilizing wing coupled to the body.

29. The ground effect craft of claim 28, wherein at least one of the stabilizing wing, the fore aerodynamic lift surface, and the aft aerodynamic lift surface comprises an anhedral shape.

30. The ground effect craft of claim 28, wherein the stabilizing wing comprises a wingtip spoiler.

31. The ground effect craft of claim 25, wherein the fore aerodynamic lift surface comprises a membrane.

32. The ground effect craft of claim 25, wherein the fore aerodynamic lift surface comprises a flap positioned proximate a trailing edge of the fore aerodynamic lift surface.

33. The ground effect craft of claim 25, wherein the aft aerodynamic lift surface comprises a flap.

34. The ground effect craft of claim 25, wherein the fore aerodynamic lift surface is configured to deflect responsive to an aerodynamic pressure change on the fore aerodynamic lift surface.

35. The ground effect craft of claim 25, wherein at least one of the aft aerodynamic lift surface, an aft aerodynamic lift surface flap, and a fore aerodynamic lift surface flap comprises an overlapping panel.

36. The ground effect craft of claim 25, wherein the first sponson and the second sponson are configured to move inwardly towards a centerline of the ground effect craft to reduce a lateral footprint.

37. A ground effect craft comprising:
a first sponson;
a second sponson;
a fore ground effect surface configured to generate lift substantially independent of pitch movement of the first sponson and the second sponson,
a body comprising the fore ground effect surface, the body dynamically coupled to the first sponson and the second sponson; and
an aft ground effect surface connected to at least one of the first sponson and the second sponson and is between the first sponson and the second sponson, wherein the aft ground effect surface is configured to move independent of pitch movement of the fore ground effect surface.

38. The ground effect craft of claim 37, further comprising:

wherein the aft ground effect surface is configured to generate increased lift when the fore ground effect surface directs air to the aft ground effect surface, or wherein the aft ground effect surface is configured to generate decreased lift when the fore ground effect surface restricts air to the aft ground effect surface.

39. The ground effect craft of claim 37, further comprising a flap configured to extend from the fore ground effect surface between a leading edge of the fore ground effect surface and a trailing edge of the fore ground effect surface.

40. The ground effect craft of claim 37, further comprising a stabilizing wing coupled to the body.

41. The ground effect craft of claim 40, wherein at least one of the stabilizing wing, the fore ground effect surface, and the aft ground effect surface comprises an anhedral shape.

42. The ground effect craft of claim 40, wherein the stabilizing wing comprises a wingtip spoiler.

43. The ground effect craft of claim 37, wherein the fore ground effect surface comprises a membrane.

44. The ground effect craft of claim 37, wherein the fore ground effect surface comprises a flap positioned proximate a trailing edge of the fore ground effect surface.

45. The ground effect craft of claim 37, wherein the aft ground effect surface comprises a flap.

46. The ground effect craft of claim 37, wherein the fore ground effect surface is configured to deflect responsive to an aerodynamic pressure change on the fore aerodynamic lift surface.

47. The ground effect craft of claim 37, wherein at least one of the aft ground effect surface, an aft ground effect surface flap, and a fore ground effect surface flap comprises an overlapping panel.

48. The ground effect craft of claim 37, wherein the first sponson and the second sponson are configured to move inwardly towards a centerline of the ground effect craft to reduce a lateral footprint.

\* \* \* \* \*